US011838898B2

(12) United States Patent
Yang

(10) Patent No.: US 11,838,898 B2
(45) Date of Patent: Dec. 5, 2023

(54) METHOD AND APPARATUS FOR CONFIGURATION OF SIDELINK CHANNEL RESOURCE UNITS

(71) Applicant: ZTE Corporation, Shenzhen (CN)

(72) Inventor: Jin Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 401 days.

(21) Appl. No.: 17/241,243

(22) Filed: Apr. 27, 2021

(65) Prior Publication Data
US 2021/0250931 A1  Aug. 12, 2021

Related U.S. Application Data

(63) Continuation of application No. PCT/CN2018/108036, filed on Sep. 27, 2018.

(51) Int. Cl.
*H04W 72/04* (2023.01)
*H04W 72/044* (2023.01)
*H04W 92/18* (2009.01)

(52) U.S. Cl.
CPC .......... *H04W 72/044* (2013.01); *H04W 92/18* (2013.01)

(58) Field of Classification Search
CPC . H04L 5/0053; H04L 5/0094; H04L 27/2601; H04L 5/003; H04L 5/0005; H04L 5/0055; H04L 5/005; H04W 72/20; H04W 72/044; H04W 72/02; H04W 92/18; H04W 4/40–46
See application file for complete search history.

(56) References Cited

U.S. PATENT DOCUMENTS

| | | | |
|---|---|---|---|
| 2017/0230956 A1 | 8/2017 | Kim et al. | |
| 2017/0257876 A1 | 9/2017 | Loehr et al. | |
| 2017/0289733 A1 | 10/2017 | Rajagopal et al. | |
| 2017/0303240 A1* | 10/2017 | Basu Mallick | H04W 72/02 |
| 2017/0303291 A1* | 10/2017 | Chae | H04W 72/12 |
| 2018/0255444 A1 | 9/2018 | Chae et al. | |

(Continued)

FOREIGN PATENT DOCUMENTS

| | | |
|---|---|---|
| CN | 104938014 A | 9/2015 |
| CN | 106304360 A | 1/2017 |

(Continued)

OTHER PUBLICATIONS

Clarivate Analytics, "English Translation of CN 111385765 B" 2023 (Year: 2023).*

(Continued)

*Primary Examiner* — Maharishi V Khirodhar
*Assistant Examiner* — Kenneth P Hunt
(74) *Attorney, Agent, or Firm* — Crowell & Moring LLP

(57) ABSTRACT

A method and apparatus for configuration of sidelink channel resource units for sidelink communications in a wireless communication network is disclosed. In one embodiment, a method performed by a wireless communication device, comprising: determining a sidelink channel resource unit of a sidelink channel according to a sidelink channel resource pattern table; and performing sidelink communications on the sidelink channel resource unit, wherein the sidelink channel resource pattern table comprises a plurality of sidelink channel resource configuration patterns.

20 Claims, 37 Drawing Sheets

| Pattern index | #0 | #1 | #2 | #3 | #4 | #5 | #6 | #7 | #8 | #9 | #10 | #11 | #12 | #13 |
|---|---|---|---|---|---|---|---|---|---|---|---|---|---|---|
| 0 | N | N | N | N | N | N | N | N | N | N | C | C | R | C |
| 1 | N | N | N | N | N | N | N | N | C | C | R | C | C | G |
| 2 | N | N | N | N | N | N | N | N | A | C | C | R | C | C |
| 3 | N | N | N | N | N | N | A | A | C | C | R | C | C | G |
| 4 | N | N | N | N | N | A | C | C | R | C | C | R | S | S |
| 5 | N | N | N | N | A | A | C | R | C | C | S | R | S | G |
| 6 | N | N | N | N | A | C | R | C | C | R | S | S | S | S |
| ... | | | | | | | | | | | | | | |
| i-2 | A | C | R | C | C | C | R | S | S | S | R | S | S | G |
| i-1 | | | | | | | Reserved | | | | | | | |

(56) References Cited

U.S. PATENT DOCUMENTS

| | | | | |
|---|---|---|---|---|
| 2019/0356451 A1* | 11/2019 | Zhang | ............ | H04W 72/23 |
| 2021/0136699 A1* | 5/2021 | Scholand | ............ | H04W 4/40 |
| 2021/0360647 A1* | 11/2021 | Xu | ............ | H04W 72/56 |
| 2021/0400632 A1* | 12/2021 | Yang | ............ | H04W 76/15 |

FOREIGN PATENT DOCUMENTS

| | | | | |
|---|---|---|---|---|
| CN | 106686551 A | | 5/2017 | |
| CN | 111385765 B | * | 7/2022 | ............ H04W 4/06 |
| WO | WO2017171897 A1 | | 10/2017 | |
| WO | WO2018027528 A1 | | 2/2018 | |

OTHER PUBLICATIONS

Chinese Office Action with English translation regarding 201880097571.8 dated Aug. 3, 2022, 15 pages.
International Search Report and Written Opinion regarding PCT/CN2018/108036 dated Apr. 28, 2019, 6 gages.
Extended European Search Report regarding EP18930339 dated Sep. 30, 2021.
Garcia et al., "A Tutorial on 5G NR V2X Communications," IEEE Communications Surveys and Tutorials, IEEE, USA, vol. 23, No. 3, Feb. 3, 2021, pp. 1972-2026.

* cited by examiner

| SCS | PSCCH n/k | PSSCH n/k | PSBCH n/k | PSDCH n/k |
|---|---|---|---|---|
| 15 kHz | 4/5 | 8/5 | 4/20 | 6/5 |
| 30 kHz | 4/5 | 8/5 | 4/20 | 6/5 |
| 60 kHz | 8/3 | 14/3 | 6/20 | 6/8 |
| 120 kHz | 8/3 | 14/3 | 6/20 | 6/8 |

| index | SCS | #N |
|---|---|---|
| 0 | 15 kHz | 0 |
| | 60 kHz | 1 |
| 1 | 15 kHz | 1 |
| | 60 kHz | 2 |
| 2 | 15 kHz | 2 |
| | 60 kHz | 2 |
| 3 | 15 kHz | 4 |
| | 60 kHz | 6 |

| index | #N1 | #N2 |
|---|---|---|
| 0 | 0 | 0 |
| 1 | 0 | 4 |
| 2 | 2 | 2 |
| 3 | 2 | 6 |
| 4 | -- | 7 |
| 5 | 10 | -- |
| 6-7 | Reserved | Reserved |

FIG. 18

| n1 | n2 |
|----|----|
| 8  | 4  |
| 10 | 6  |
| 12 | 8  |
| 14 | 10 |

| index | #N | #K | k |
|---|---|---|---|
| 0 | N1 | K1+k1 | 8 |
| 1 | N1+n1 | K1 | 8 |
| 2 | N1 | K1+k1 | 10 |
| 3 | N1+n1 | K1 | 10 |
| 4 | 0 | K1+k1 | 8 |
| 5 | 4 | K1+k1 | 12 |
| 6 | 7 | K1 | 8 |
| 7-15 | Reserved | Reserved | Reserved |

FIG. 27

METHOD AND APPARATUS FOR CONFIGURATION OF SIDELINK CHANNEL RESOURCE UNITS

CROSS-REFERENCE TO RELATED APPLICATION

This application is a continuation application of PCT International Patent Application No. PCT/CN2018/108036, filed with the China National Intellectual Property Administration, PRC on Sep. 27, 2018, which is herein incorporated by reference in its entirety.

TECHNICAL FIELD

This disclosure relates generally to wireless communications and, more particularly, to a method and apparatus for configuration of sidelink channel resource units for sidelink communications in a wireless communication network.

BACKGROUND

Sidelink (SL) communication is a wireless radio communication directly between two or more user equipment devices (hereinafter "UE"). In this type of communication, two or more UEs that are geographically proximate to each other can directly communicate without going through a base station (e.g., an eNB in an long-term evolution (LTE) system or a gNB in New Radio), or a core network. Data transmission in sidelink communications is thus different from typical cellular network communications, in which a UE transmits data to an eNB or a gNB (i.e., uplink transmissions) or receives data from an eNB or a gNB (i.e., downlink transmissions). In sidelink communications, data is transmitted directly from a source UE to a target UE through the Unified Air Interface, e.g., PC5 interface. Sidelink communications can provide several advantages, for example reducing data transmission load on a core network, system resource consumption, transmission power consumption, and network operation costs, saving wireless spectrum resources, and increasing spectrum efficiency of a cellular wireless communication system.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In the 5G wireless communication system, a resource granularity with a finer and more flexible configuration in the time and frequency domain are utilized. Accordingly, a flexible resource scheduling indication method is developed. Based on the flexible resource granularity, a definition and management of corresponding sidelink channel resources are proposed for sidelink communications. Further, current sidelink channel resource schemes cannot be directly applied to such flexible resource configuration and scheduling method in the 5G wireless communication system. Therefore, a method and apparatus for configuration of sidelink channel resource units in the present disclosure can achieve effective utilization of resources, improve resource allocation flexibility, reduce signaling overhead, and processing complexity, etc. As used herein, a "sidelink channel resource unit" refers to a resource set in the time and frequency domain on which sidelink communications can be performed on a respective sidelink channel.

In one embodiment, a method performed by a wireless communication device, includes: determining a sidelink channel resource unit of a sidelink channel according to a sidelink channel resource pattern table; and performing sidelink communications on the sidelink channel resource unit, wherein the sidelink channel resource pattern table comprises a plurality of sidelink channel resource configuration patterns.

In another embodiment, a method performed by a wireless communication node, includes: indicating a sidelink channel resource pattern table to a wireless communication devices; and wherein the sidelink channel resource pattern table comprises a plurality of sidelink channel resource configuration patterns.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

FIG. 4A illustrates a table showing a mapping relationship between a SCS in sidelink communications and n/k values of a sidelink channel resource unit for a sidelink channel, in accordance with some embodiments of the present disclosure.

FIG. 17 illustrates a table showing a mapping relationship between a SCS in sidelink communications and N values of a sidelink channel resource unit for a sidelink channel, in accordance with some embodiments of the present disclosure.

FIG. 18 illustrates a table indicating a plurality of position configurations of sidelink channel resource units in the time domain for 2 sidelink channels, in accordance with some embodiments of the present disclosure.

FIG. 20 illustrates a table showing a mapping relationship between n1 and n2 in two corresponding sidelink channel resource units for two respective sidelink channels in a correlated sidelink channel couple, in accordance with some embodiments of the present disclosure.

FIG. 27 illustrates a table indicating a plurality of configurations of sidelink channel resource units in the time and frequency domain for a PSSCH, in accordance with some embodiments of the present disclosure.

DETAILED DESCRIPTION OF EXEMPLARY EMBODIMENTS

Figure 1A:
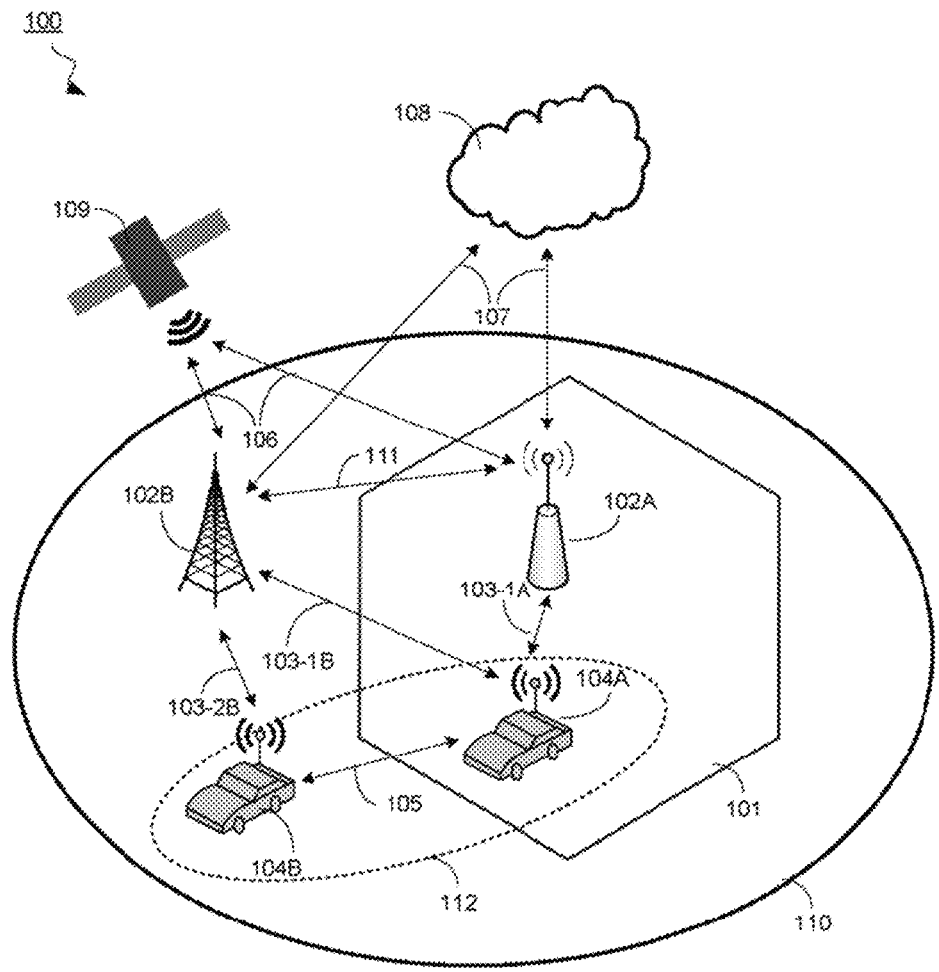
FIG. 1A illustrates an exemplary wireless communication network illustrating achievable modulation as a function of distance from a BS, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network-side wireless communication node can be a node B, an E-utran Node B (also known as Evolved Node B, eNodeB or eNB), a gNodeB (also known as gNB) in new radio (NR) technology, a pico station, a femto station, or the like. In some embodiments, a network-side wireless communication node can also comprise a Relay Node (RN), a multicell coordination entity (MCE), a gateway (GW), a sidelink management/control node, a mobility management entity (MME), a EUTRAN Operation/Administration/Maintenance (OAM) device. A terminal-side wireless communication device can be a long range communication system like a mobile phone, a smart phone, a personal digital assistant (PDA), tablet, laptop computer, or a short range communication system such as, for example a wearable device, a vehicle with a vehicular communication system and the like. A network-side wireless communication node and a terminal-side communication device are represented by a base station (BS) 102 and a user equipment (UE) 104, respectively, and in all the embodiments in this disclosure hereafter, and are generally referred to as "communication nodes" herein. Such communication nodes may be capable of wireless and/or wired communications, in accordance with various embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a first BS 102A, a second BS 102B, a first UE 104A, and a second UE 104B. The UE 104A can be a vehicle that is moving in a first cell 101 covered by the BS 102A and a second cell 110 covered by the BS 102B. In some embodiments, the first cell 101 is in the second cell 110. In some embodiments, the UE 104A has direct communication channels 103-A and 103-1B with the BS 102A and the BS 102B, respectively. Similarly, the UE 104B can be also a vehicle that is moving in the same cell 110 covered by the BS 102B, but may not have a direct communication channel with the BS 102A or is out of coverage of the cell 101. Although the UE 104B does not have a direct communication channel with the BS 102A, it forms a direct communication channel 105 with its neighbor UEs, e.g., UE 104A on sidelink (SL). Further, the UE 104B and UE 104A can be within a sidelink (SL) communication group 112. The direct communication channels between the UE 104 and the BS 102 can be through interfaces such as an Uu interface, which is also known as UMTS (Universal Mobile Telecommunication System (UMTS) air interface. The direct communication channels 105 between the UEs 104 can be through a PC5 interface, which is introduced to address high moving speed and high density applications such as Vehicle-to-everything (V2x) and Vehicle-to-Vehicle (V2V) communications. The first and second BS 102-1 and 102-2 each is connected to a core network (CN) 108 through an external interface 107, e.g., an Iu interface, an NG interface, and an S1 interface according to types of the first BS 102-1 and the second BS 102-2. A direct communication channel 111 between the first and second BS 102-1 and 102-2 is through an X2 or Xn interface.

The UE 104A obtains its synchronization reference from the corresponding BS 102A, which obtains its own synchronization reference from the core network 108 through an internet time service, such as a common time NTP (Network Time Protocol) server or a RNC (Radio Frequency Simulation System Network Controller) server. This is known as network-based synchronization. Alternatively, the BS 102A can also obtain synchronization reference from a Global Navigation Satellite System (GNSS) 109 through a satellite signal 106, especially for a large BS in a large cell which has a direct line of sight to the sky, which is known as satellite-based synchronization. The main advantage of the satellite-based synchronization is full independency providing a reliable synchronization signal as long as the station remains locked to a minimum number of GPS (Global Positioning System) satellites. Each GPS satellite contains multiple atomic clocks that contribute very precise time data to the GPS signals. GPS receivers on the BS 102A decode these signals, effectively synchronizing the corresponding BS 102A to the atomic clocks. This enables corresponding BS 102A to determine the time within 100 billionths of a second (i.e., 100 nanoseconds), without the cost of owning and operating atomic clocks.

Similarly, the UE 104B can obtain a synchronization reference from the corresponding BS 102B which further obtains its own synchronization reference from the core network 108 or from a GNSS 109, as discussed in detail above. The UEs 104A can also obtain a synchronization reference through the UE 104B in sidelink communications, wherein the synchronization reference of the UE 104B can be either network-based or satellite-based, as described above.

Figure 1B:
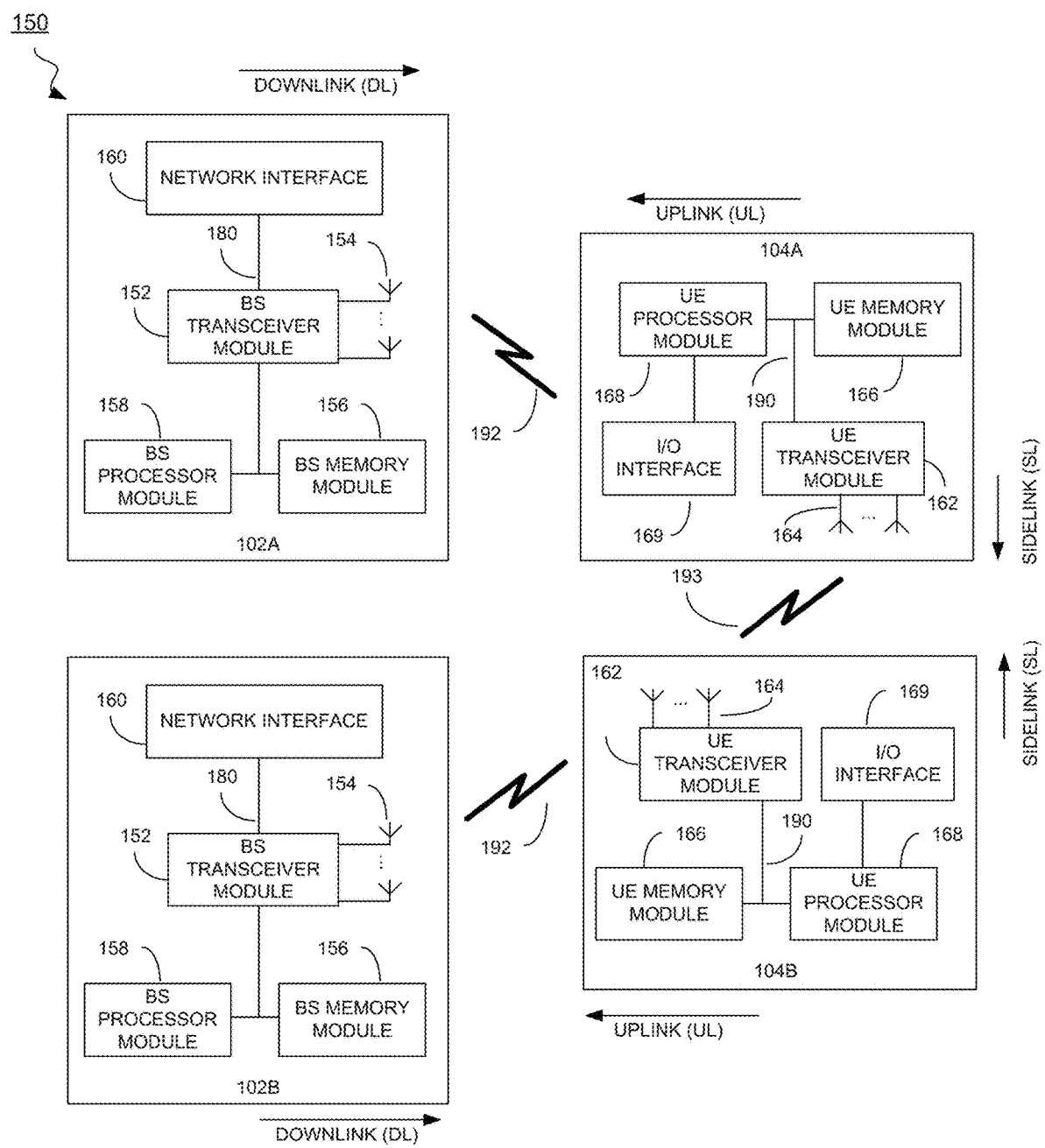
FIG. 1B illustrates a block diagram of an exemplary wireless communication system for a slot structure information indication, in accordance with some embodiments of the present disclosure.

FIG. 1B illustrates a block diagram of an exemplary wireless communication system 150 for transmitting and receiving downlink, uplink and sidelink communication signals, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a first BS 102A, a second 102B, a first UE 104A and a second UE 104B, collectively referred to as BS 102 and UE 104 below for ease of discussion. The BSs 102 each includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and an I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the BS 102 that enable bi-directional communication between BS transceiver 152 and other network components and communication nodes configured to communication with the BS 102. For example, the network interface 160 may be configured to support internet or WiMAX traffic. In a typical deployment, without limitation, the network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell (e.g., 101 for BS 102A and 110 for BS 102B) where the BS 102 is located, and in general, to operate properly within the cell. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid/heterogeneous communication network in which the UE 104 communicates with the BS 102, and with other UEs, e.g., between the UE 104A and 104B. As described in further detail below, the UE 104 supports sidelink communications with other UE's as well as downlink/uplink communications between the BS 102 and the UE 104. As discussed above, sidelink communication allows the UEs 104A and 104B within a sidelink communication group 112 to establish a direct communication link with each other, or with other UEs from different cells, without requiring the BS 102 to relay data between UE's.

Figure 2A:
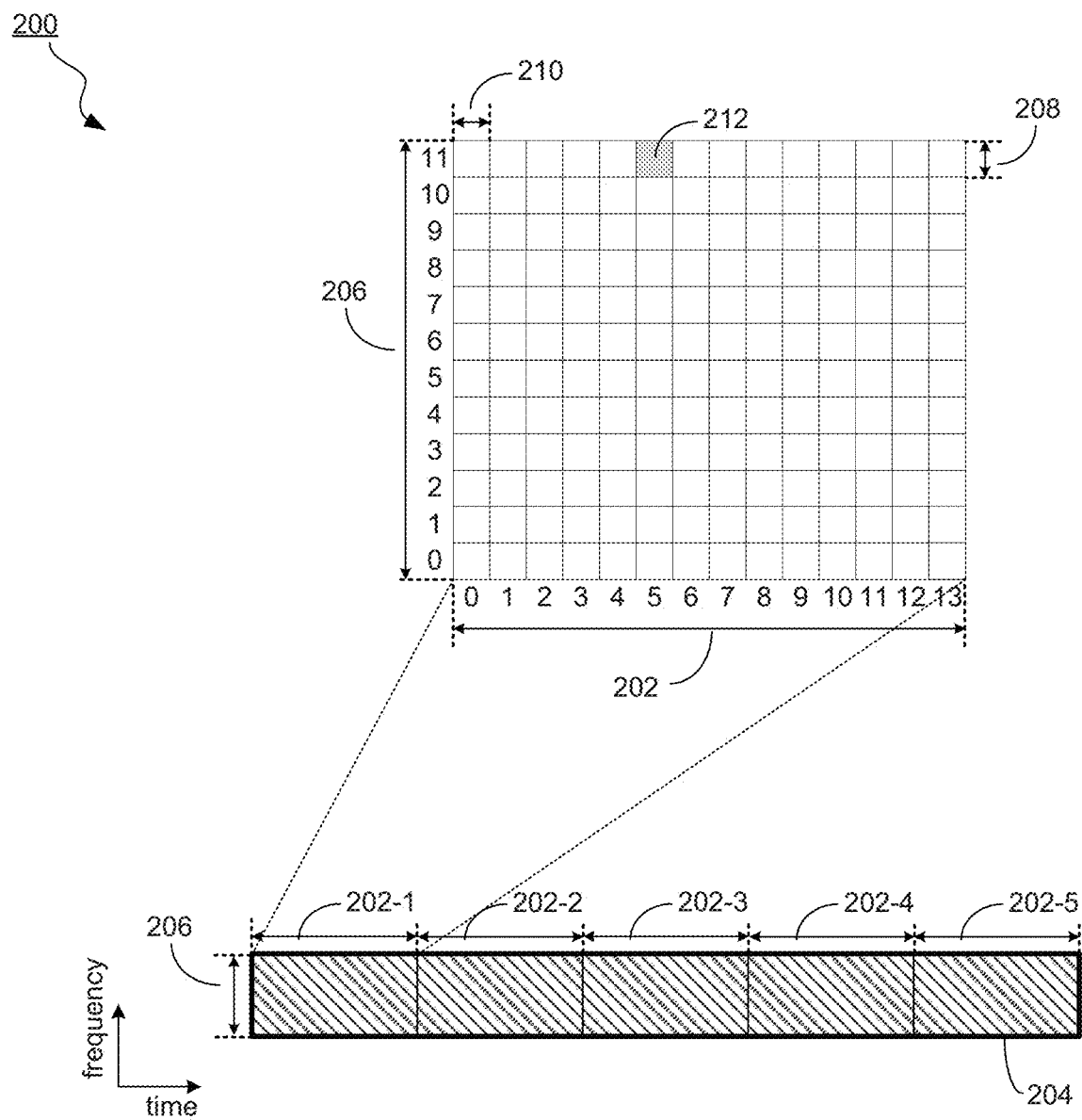
FIG. 2A illustrates a schematic of a radio frame structure in NR wireless communication system with a subcarrier spacing (SCS) of 15 kHz, in accordance with some embodiments of the present disclosure.
Figure 2B:
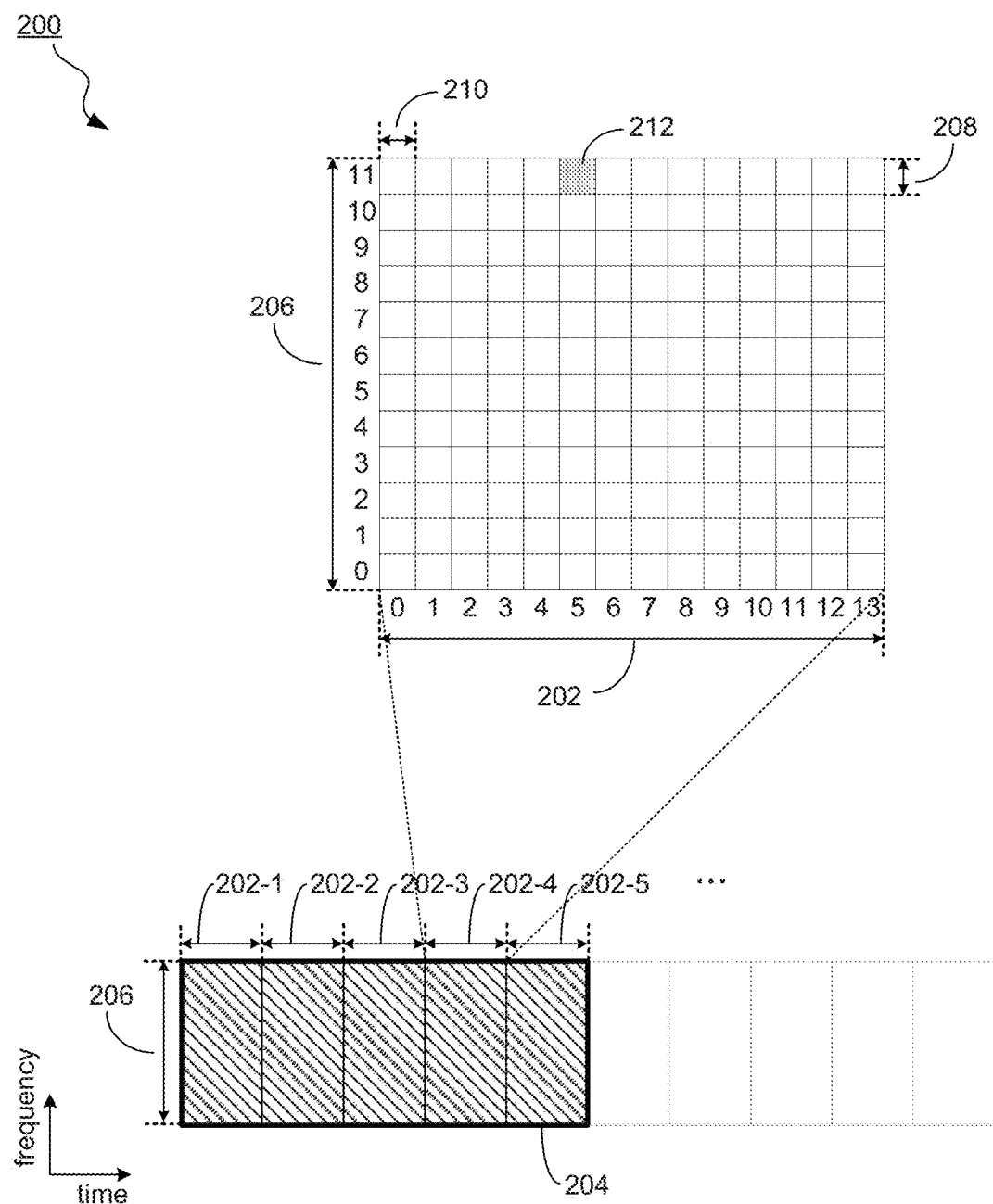
FIG. 2B illustrates a schematic of a radio frame structure in NR wireless communication system with a subcarrier spacing (SCS) of 30 kHz, in accordance with some embodiments of the present disclosure.

FIG. 2A illustrates a schematic of a radio frame structure 200 in NR wireless communication system with a subcarrier spacing (SCS) of 15 kHz, in accordance with some embodiments of the present disclosure. It should be noted FIG. 2A is for illustration purposes and is not intended to be limiting. In some embodiments, the sidelink resource set 204 comprises 5 time slots 202 in the time domain, i.e., 202-1, 202-2, 202-3, 202-4 and 202-5, and at least one resource block (RB) 206 in the frequency domain. In the illustrated embodiment, the 5 time slots 202 each comprises 14 symbols 210 in the time domain with normal Cyclic Prefix (CP), and one RB 206 comprises 12 subcarriers 208 in the frequency domain. The 12 subcarriers 208 each occupies 15 kHz in the frequency domain, i.e., SCS=15 kilohertz (kHz), and one RB 206 comprises 180 kHz in the frequency domain. In some other embodiments, the time slot 202 comprises 12 symbols in the time domain with extended CP. A resource elements (RE) 212 occupies 1 symbol in the time domain and 1 subcarrier in the frequency domain FIG. 2B illustrates a schematic of a radio frame structure 200 in NR wireless communication system with a subcarrier spacing (SCS) of 30 kHz, in accordance with some embodiments of the present disclosure. It should be noted FIG. 2B is for illustration purposes and is not intended to be limiting.

In some embodiments, the sidelink resource set 204 comprises 5 time slots 202 in the time domain, i.e., 202-1, 202-2, 202-3, 202-4 and 202-5, and at least one RB 206 in the frequency domain. In the illustrated embodiment, the 5 time slots 202 each comprises 14 symbols 210 in the time domain with normal CP, and one RB 206 comprises 12 subcarriers 208 in the frequency domain. The 12 subcarriers 208 each occupies 30 kHz in the frequency domain, i.e., SCS=30 kHz, and one RB 206 comprises 360 kHz in the frequency domain. In some other embodiments, the time slot 202 each comprises 12 symbols in the time domain with extended CP.

Figure 2C:
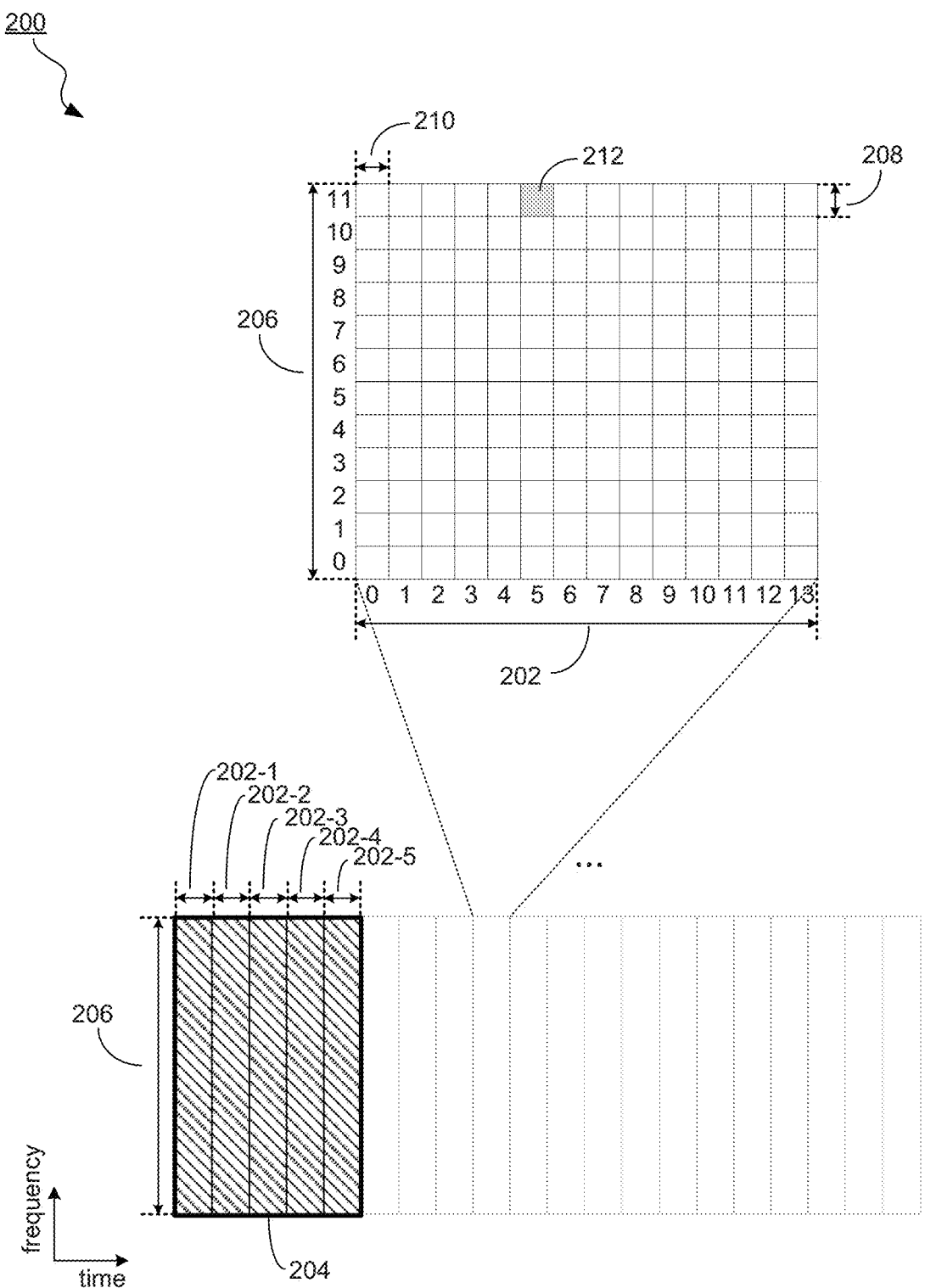
FIG. 2C illustrates a schematic of a radio frame structure in NR wireless communication system with a subcarrier spacing (SCS) of 60 kHz, in accordance with some embodiments of the present disclosure.

FIG. 2C illustrates a schematic of a radio frame structure 200 in NR wireless communication system with a subcarrier spacing (SCS) of 60 kHz, in accordance with some embodiments of the present disclosure. It should be noted FIG. 2C is for illustration purposes and is not intended to be limiting. In some embodiments, the sidelink resource set 204 comprises 5 time slots 202 in the time domain, i.e., 202-1, 202-2, 202-3, 202-4 and 202-5, and at least one RB 206 in the frequency domain. In the illustrated embodiment, the 5 time slots 202 each comprises 14 symbols 210 in the time domain with normal CP, and one RB 206 comprises 12 subcarriers 208 in the frequency domain. The 12 subcarriers 208 each occupies 60 kHz in the frequency domain, i.e., SCS=60 kHz, and one RB 206 comprises 720 kHz in the frequency domain. In some other embodiments, the time slot 202 each comprises 12 symbols in the time domain with extended CP.

Figure 2D:
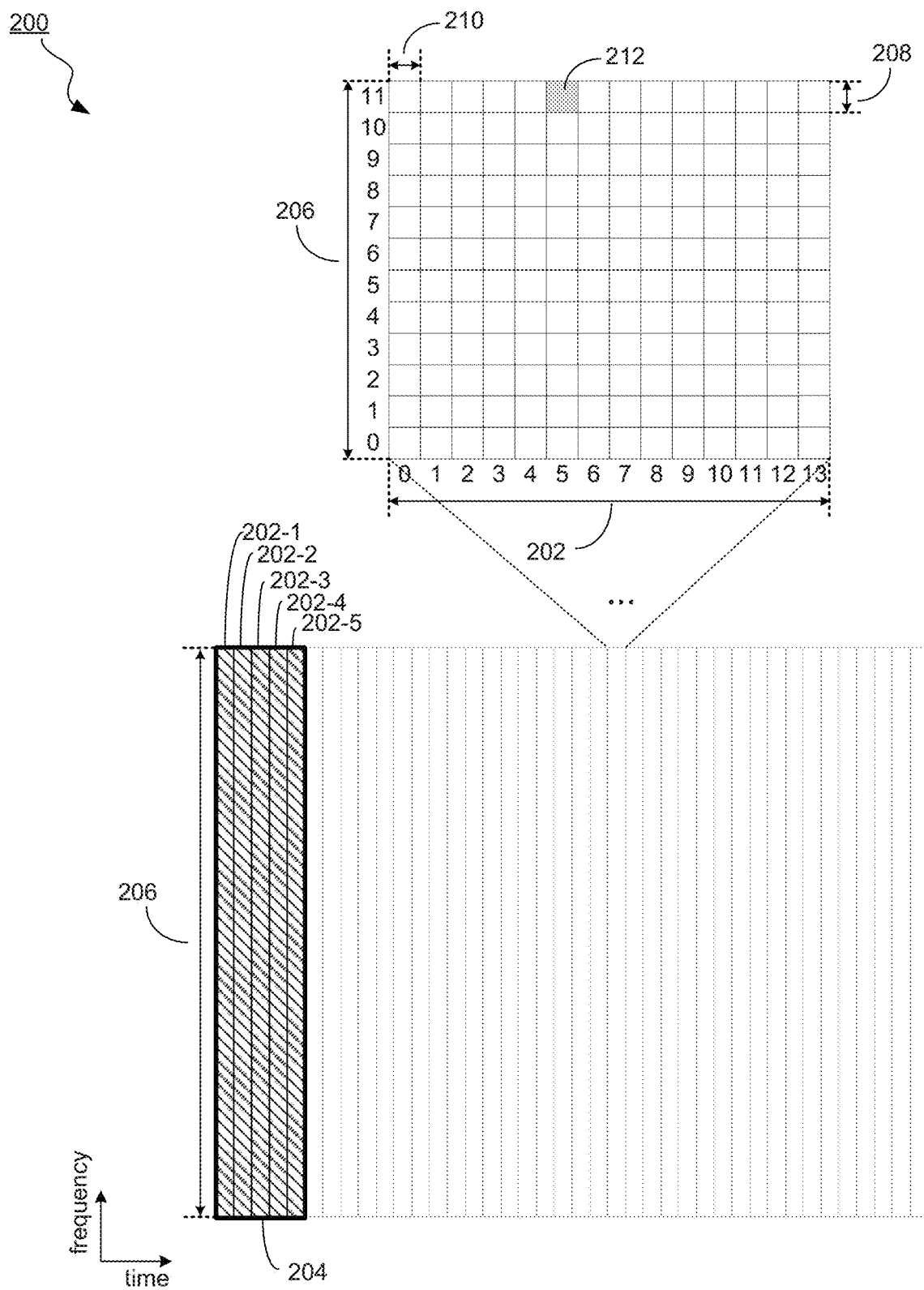
FIG. 2D illustrates a schematic of a radio frame structure in NR wireless communication system with a subcarrier spacing (SCS) of 120 kHz, in accordance with some embodiments of the present disclosure.

FIG. 2D illustrates a schematic of a radio frame structure 200 in NR wireless communication system with a subcarrier spacing (SCS) of 120 kHz, in accordance with some embodiments of the present disclosure. It should be noted FIG. 2D is for illustration purposes and is not intended to be limiting. In some embodiments, the sidelink resource set 204 comprises 5 time slots 202 in the time domain, i.e., 202-1, 202-2, 202-3, 202-4 and 202-5, and at least one RB 206 in the frequency domain. In the illustrated embodiment, the 5 time slots 202 each comprises 14 symbols 210 in the time domain with normal Cyclic Prefix (CP), and one RB 206 comprises 12 subcarriers 208 in the frequency domain. The 12 subcarriers 208 each occupies 120 kHz in the frequency domain, i.e., SCS=120 kHz, and one RB 206 comprises 1440 kHz in the frequency domain. In some other embodiments, the time slot 202 each comprises 12 symbols in the time domain with extended CP.

In some embodiments, a sidelink channel can be at least one of the following: a Physical Sidelink Control Channel (PSCCH), a Physical Sidelink Shared Channel (PSSCH), a Physical Sidelink Broadcast Channel (PSBCH), and a Physical Sidelink Discovery Channel (PSDCH). Specifically, a PSCCH resource is used to carry sidelink control information (SCI), wherein the SCI comprises at least one of the following: sidelink scheduling control information, sidelink feedback control information (e.g., ACK/NACK), and channel measurement feedback information (e.g., Channel State Information (CSI)); a PSSCH resource is used to carry sidelink data; a PSBCH resource is used to carry sidelink broadcast information; and a PSDCH resource is used to carry a sidelink discovery signal.

A sidelink channel resource unit comprises a first number (n) of first resource units in the time domain and a second number (k) of second resource units in the frequency domain, wherein n and k are non-negative integers. In some embodiments, the first resource unit in the time domain can be one of the following: a symbol, a time slot, and a mini-slot. In some embodiments, a symbol can be one of the following: a cyclic-prefix-Orthogonal Frequency Division Multiplex (CP-OFDM) symbol and a Discrete Fourier Transform Spread (DFT-S)-OFDM symbol. In some embodiments, a mini-slot occupies i symbols in a time slot and wherein i is a non-negative integer, and smaller than or equal to 7 in a time slot with 14 symbols. In some embodiments, the second resource unit in the frequency domain is a RB.

In some embodiments, n and/or k values of the at least one sidelink channel resource unit for a respective sidelink channel can be pre-defined by the system to a UE 104. In some embodiments, n and/or k values are fixed. In some embodiments, the first resource unit in the time domain and the second resource unit in the frequency domain of a respective sidelink channel is defined independently. In some embodiments, n and/or k values of different sidelink channel resource units for different respective sidelink channels can be the same or different.

For example, using a PSCCH as an exemplary sidelink channel, n and/or k values of one PSCCH resource unit is pre-configured by the system. The PSCCH resource unit each comprises n first resource units in the time domain and k second resource units in the frequency domain. The at least one PSCCH resource unit is used by a UE 104 for transmitting or receiving respective SCI in sidelink communications. It should be noted that a time period and a frequency range of one PSCCH resource unit are determined by the subcarrier spacing (SCS) as discussed above in FIGS. 2A-2D.

This method, in which a configuration of at least one sidelink channel resource unit for a respective sidelink channel with pre-configured n and/or k values has a few advantages. For example, it can reduce signaling overhead and complexity in sidelink communications; and it provides a simplified resource allocation process for sidelink communications in various scenarios and environment conditions.

In some embodiments, n and/or k values of one sidelink channel resource unit for a respective sidelink channel can be configured by a BS 102. In some embodiments, the n and/or k values can be directly indicated through a signaling from the BS 102, e.g., a higher layer signaling or a physical layer signaling. In some embodiments, the first resource unit in the time domain and the second resource unit in the frequency domain of a respective sidelink channel is defined independently. In some embodiments, n and/or k values of different sidelink channel resource units for different respective sidelink channels can be the same or different.

In some embodiments, when a signaling is used for the indication of the configuration of the at least one sidelink channel resource unit for a respective sidelink channel, the signaling can directly indicate the n and/or k value. In some other embodiments, the signaling can also indicate an index in a configuration table, wherein the configuration table is pre-configured or configured by a BS 102 and comprises a plurality of indices. The plurality of indices each corresponds to an n value and/or a k value.

For example, in a configuration table, index 0 corresponds to an n value of 5 and a k value of 4; index 1 corresponds to an n value of 4 and a k value of 5; index 2 corresponds to an n value of 8 and a k value of 3; and index 3 corresponds to an n value of 10 and a k value of 2. For another example, in a different configuration table, index 0 corresponds to an n value of 5; index 1 corresponds to an n value of 4; index 2 corresponds to an n value of 8; and index 3 corresponds to an n value of 10. In this case, the k value of the sidelink channel resource unit can be determined using a different approach, which will be discussed in further detail later.

In some embodiments, the BS 102 can indicate n and/or k values of sidelink channel resource units for different sidelink channels. For example, the BS 102 indicates configurations of at least one PSCCH resource unit and at least one PSSCH resource unit. In some embodiments, the at least one PSCCH resource unit each comprises n1 first resource units in the time domain and k1 second resource units in the frequency domain. Further, the at least one PSSCH resource unit each comprises n2 first resource unit in the time domain and k2 second resource unit in the frequency domain, wherein n1, n2, k1 and k2 are non-negative integers. In some embodiments, the BS 102 indicates the configurations to the UE 104 through a system broadcast message. In some embodiments, the BS 102 indicates the configurations of the first resource unit in the time domain and the second resource unit in the frequency domain to the UE 104. The at least one PSCCH resource is used for receiving or transmitting SCI and the at least one PSSCH resource unit is used for receiving or transmitting sidelink data between the UEs 104 in sidelink communications.

Figure 3:
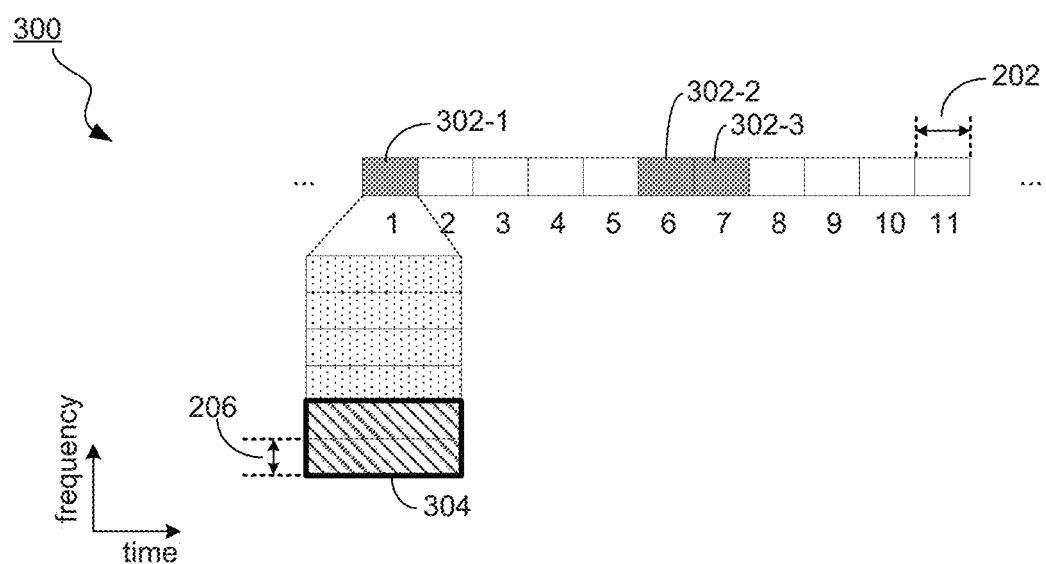
FIG. 3 illustrates a schematic of a radio frame structure of a sidelink channel resource unit, in accordance with some embodiments of the present disclosure

FIG. 3 illustrates a schematic of a radio frame structure 300 of a sidelink channel resource unit 304, in accordance with some embodiments of the present disclosure. It should be noted FIG. 3 is for illustration purposes and is not intended to be limiting. In the illustrated embodiments, the sidelink channel resource unit 304 is pre-configured by the system, which comprises 1 time slot in the time domain and 2 RBs in the frequency domain. In some embodiments, the sidelink channel resource unit 304 is for a sidelink channel. In some embodiments, the sidelink channel resource unit 304 is for a respective PSCCH for receiving or transmitting sidelink control information (SCI). In some embodiments, the SCI comprises one of the following: a modulation and coding scheme (MCS), and Acknowledgment/Negative acknowledgment (A/N) information.

In the illustrated embodiments, the radio frame structure 300 shows a sidelink resource set (or a sidelink resource pool), which can be also pre-configured by the system. Specifically, the sidelink resource pool comprises 302-1, 302-2, and 302-3 slots, wherein slot 302-1 occupies a first time slot 202; slot 302-2 occupies a sixth time slot 202; and slot 302-3 occupies a seventh time slot 202. Further, the sidelink resource pool comprises 6 RBs in each slot. Therefore, a sidelink channel resource unit 304 in slot 302-1 comprises 1 time slot in the time domain and 2 RBs in the frequency domain. In some other embodiments, in slots 302-2/302-3 it can comprise a plurality of sidelink channel resource units 304 according to various methods presented in this disclosure, which are discussed in further detail below.

This method, in which a configuration (n and/or k values) of at least one sidelink channel resource unit for a sidelink channel is indicated by the BS 102 to the UE 104, has a few advantages. For example, it has a high flexibility, adaptivity; and it is efficiency for sidelink resource allocation according to actual requirements for sidelink communications.

In some embodiments, a configuration of at least one sidelink channel resource unit for a respective sidelink channel can be determined by a respective sidelink subcarrier spacing (SCS). In some embodiments, on available resources for sidelink communications, a respective sidelink-specific SCS is configured. Specifically, in a sidelink resource pool, a sidelink-specific SCS can be configured. Alternatively, in some embodiments, when a resource is shared between the sidelink communications and the cellular communications, a SCS in the cellular communications can be also configured as a SCS in sidelink communications. In some other embodiments, a SCS in sidelink communications can be also configured on a sidelink-specific resource or a sidelink-specific bandwidth part (BWP).

In some embodiments, the at least one sidelink channel resource unit for a sidelink channel each is configured with a first number (n) of first resource units in the time domain and a second number (k) of second resource units in the frequency domain, wherein a first resource unit in the time domain can be one of the following: a symbol and a time slot. And wherein a second resource unit in the frequency domain can be a resource block (RB), and wherein n and k are non-negative integers. In some embodiments, a mapping relationship between the SCS in sidelink communications, and n and/or k values of one sidelink channel resource unit for a sidelink channel can be preconfigured by the system or configured by the BS 102. In some embodiments, the first resource unit in the time domain and the second resource unit in the frequency domain of a respective sidelink channel is defined independently. In some embodiments, n and/or k values of different sidelink channel resource units for different respective sidelink channels can be the same or different.

FIG. 4A illustrates a table 400 showing a mapping relationship between a SCS in sidelink communications and n/k values of a sidelink channel resource unit for a sidelink channel, in accordance with some embodiments of the present disclosure. In the illustrated embodiment, the table 400 comprises 4 SCS values 402, i.e. 15 kHz, 30 kHz, 60 kHz and 120 kHz, and 4 configurations of sidelink channel resource units for 4 types of sidelink channels, i.e., a PSCCH 404, a PSSCH 406, a PSBCH 408 and a PSDCH 410. Although only 4 SCS values 402 and 4 sidelink channels are shown in FIG. 4A, it should be noted any numbers of SCS values with any values for any numbers of sidelink channels can be included which are within the scope of this invention.

In the illustrated embodiment, at a SCS value of 15 kHz, a PSCCH resource unit 404 comprises 4 first resource units in the time domain and 5 second resource units in the frequency domain; a PSSCH resource unit 406 comprises 8 first resource unit in the time domain and 5 second resource unit in the frequency domain; a PSBCH resource unit 408 comprises 4 first resource units in the time domain and 20 second resource units in the frequency domain; and a PSDCH resource unit 410 comprises 6 first resource units in the time domain and 5 second resource units in the frequency domain. At a SCS value of 30 kHz, a PSCCH resource unit 404 comprises 4 first resource units in the time domain and 5 second resource units in the frequency domain; a PSSCH resource units 406 comprises 8 first resource unit in the time domain and 5 second resource unit in the frequency domain; a PSBCH resource unit 408 comprises 4 first resource units in the time domain and 20 second resource units in the frequency domain; and a PSDCH resource unit 410 comprises 6 first resource units in the time domain and 5 second resource units in the frequency domain. At a SCS value of 60 kHz, a PSCCH resource unit 404 comprises 8 first resource units in the time domain and 3 second resource units in the frequency domain; a PSSCH resource unit 406 comprises 14 first resource units in the time domain and 3 second resource unit in the frequency domain; a PSBCH resource unit 408 comprises 6 first resource units in the time domain and 20 second resource units in the frequency domain; and a PSDCH resource unit 410 comprises 6 first resource units in the time domain and 8 second resource units in the frequency domain. At a SCS value of 120 kHz, a PSCCH resource unit 404 comprises 8 first resource units in the time domain and 3 second resource units in the frequency domain; a PSSCH resource unit 406 comprises 14 first resource units in the time domain and 3 second resource unit in the frequency domain; a PSBCH resource unit 408 comprises 6 first resource units in the time domain and 20 second resource units in the frequency domain; and a PSDCH resource unit 410 comprises 6 first resource units in the time domain and 8 second resource units in the frequency domain.

In some embodiments, when a transmission of sidelink signals on a sidelink channel is performed by a UE 104, the UE 104 can further determine the n/k values of the resource unit of the sidelink channel according to the SCS of sidelink communications using table 400. For example, the UE 104 can select PSCCH resources in a PSCCH resource pool, when a sidelink SCS is 15 kHz, the PSCCH resource unit comprises 4 symbols on the time domain and 5 RB on the frequency domain. In some embodiments, the UE 104 can further select at least one PSCCH resource for receiving and transmitting the SCI.

Figure 4B:
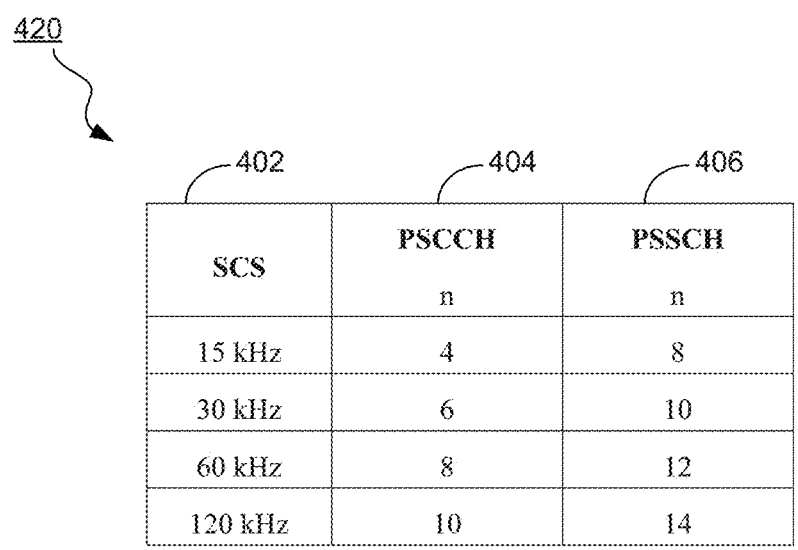
FIG. 4B illustrates a table showing a mapping relationship between a SCS for sidelink communications and n values of a sidelink channel resource unit for a sidelink channel, in accordance with some embodiments of the present disclosure.

FIG. 4B illustrates a table 420 showing a mapping relationship between a SCS for sidelink communications and n values of a sidelink channel resource unit for a sidelink channel, in accordance with some embodiments of the present disclosure. In the illustrated embodiment, the table 420 comprises 4 SCS values 402, i.e. 15 kHz, 30 kHz, 60 kHz and 120 kHz and 2 configurations for 2 sidelink channel resource units of 2 type of sidelink channels, i.e., a PSCCH 404, and a PSSCH 406. Although only 4 SCS values 402 and 2 sidelink channels 404/406 are shown in FIG. 4B, it should be noted any numbers of SCS values with any values for any numbers of sidelink channels can be included which are within the scope of this invention.

In the illustrated embodiment, at a SCS value of 15 kHz, a PSCCH resource unit 404 comprises 4 first resource units in the time domain; and a PSSCH resource unit 406 comprises 8 first resource unit in the time domain. At a SCS value of 30 kHz, a PSCCH resource unit 404 comprises 6 first resource units in the time domain; and a PSSCH resource unit 406 comprises 10 first resource unit in the time domain. At a SCS value of 60 kHz, a PSCCH resource unit 404 comprises 8 first resource units in the time domain; and a PSSCH resource unit 406 comprises 12 first resource unit in the time domain. At a SCS value of 120 kHz, a PSCCH resource unit 404 comprises 10 first resource units in the time domain; and a PSSCH resource unit 406 comprises 14 first resource unit in the time domain.

In some embodiments, the mapping relationship shown in FIG. 4B can be indicated by a higher layer signaling from the BS 102. The UE 104 can determine the n value of a sidelink channel resource unit for a sidelink channel based on the table 420. In some embodiments, the UE 104 can further determine a k value in the sidelink channel resource unit of a sidelink channel and the position of the sidelink channel resource unit of the sidelink channel according to a method discussed in further detail below. Once the n and/or k values and the position of a sidelink channel resource unit of a sidelink channel are determined, the UE 104 can further receive or transmit sidelink information.

In this method, a configuration of at least one sidelink channel resource unit for a sidelink channel is determined according to different properties of sidelink channels, environment conditions for signal transmission. Therefore, this method allows for improved channel transmission performance, improve resource utilization and information transmission reliability.

In some embodiments, a configuration of one sidelink channel resource unit for a sidelink channel can be determined according to available sidelink resource. In some embodiments, the available sidelink resource comprises at least one of the following: resource in the time and frequency domain in a sidelink resource pool; resource on a sidelink-specific band; resource for sidelink communications which may also used for cellular communications; resource in BWP configured for sidelink communications; at least one symbol in a time slot in the time domain for sidelink communications; at least one RB in the frequency domain for sidelink communications.

In some embodiments, a mapping relationship between a configuration (e.g., n and/or k values) of the sidelink channel resource unit of a sidelink channel and the available sidelink resource can be pre-configured by the system or indicated by the BS 102. In some embodiments, when a UE 104 obtains information of the available sidelink resource, the UE 104 can determine the configuration of the sidelink channel resource unit of a respective sidelink channel according to the mapping relationship. In some embodiments, the BS 102 can further indicate positions of the first resource units (e.g., symbols) in the time domain in a sidelink resource pool (e.g., time slot), and/or position of the second resource units (e.g., RBs) in the frequency domain in a sidelink resource pool (e.g., a BWP).

Specifically, when the available sidelink resource (e.g., sidelink resource set, and sidelink resource pool) comprises N symbols in a time slot in the time domain for sidelink communications, the sidelink channel resource unit comprising n first resource units in the time domain can be determined according the N value. In some embodiments, a mapping relationship between the number (N) of available sidelink resources and the number (n) of first resource units in the sidelink channel resource unit is one of the following: pre-configured by the system and indicated by the BS 102, wherein $1 \leq N \leq 14$, $1 \leq n \leq N$ and n, N are non-negative integers. In some embodiments, the n value can be determined according to the N value and one of the following: n equals to N, a mapping relationship between n and N values, and a predefined rule.

Figure 5:
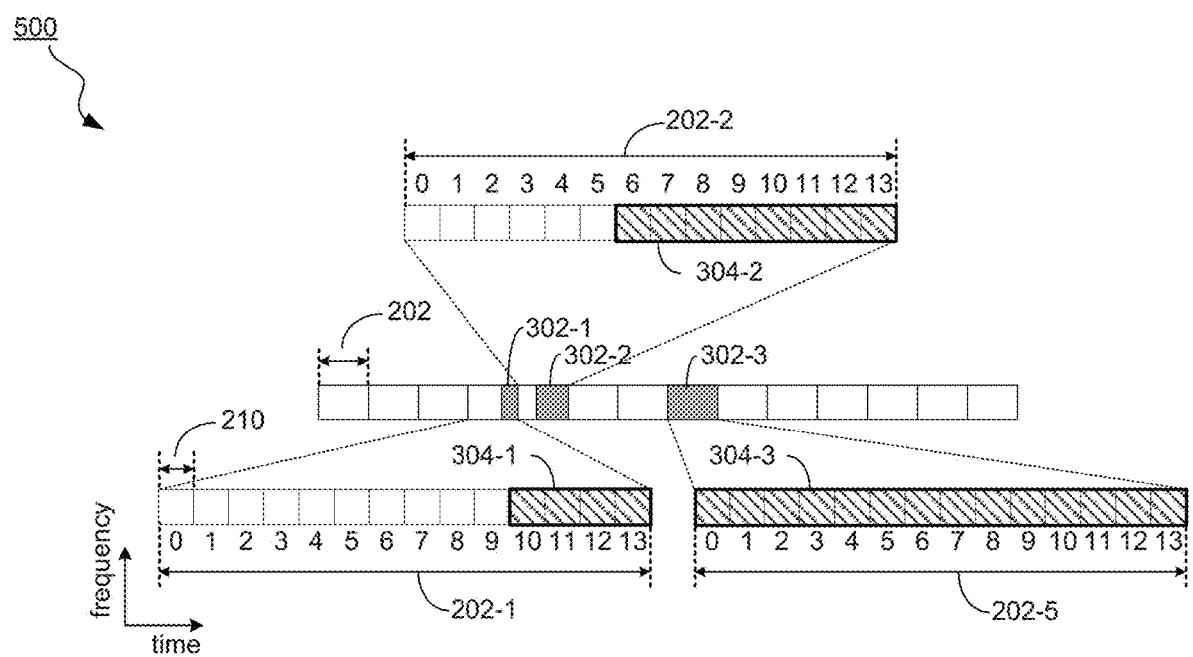
FIG. 5 illustrates a schematics of a radio frame structure with a plurality of sidelink resource pools, in accordance with some embodiments of the present disclosure.

FIG. 5 illustrates a schematics of a radio frame structure 500 with a sidelink resource pool 302, in accordance with some embodiments of the present disclosure. It should be noted FIG. 5 is for illustration purposes and is not intended to be limiting. A sidelink resource pool 302 may comprise any numbers of slots and RBs at any positions in a sidelink resource pool 302.

In the illustrated embodiments, in the radio frame structure 500 the sidelink resource pool 302 is for sidelink channels such as PSCCH. In the illustrated embodiments, the sidelink resource pool 302 comprises 3 slots, i.e., 202-1, 202-2 and 202-5. For the 3 slots in sidelink resource pool 302 each may comprise different or same numbers of symbols for sidelink communications, as shown in 302-1, 302-2, and 302-3. In some embodiments, the UE 104 can determine the number (i.e., n) of symbols in a sidelink channel resource unit 304 according to the number (N) of symbols in a corresponding slot within the sidelink resource pool 302 accordingly. In the illustrated embodiments, when the slot 202-1 in the sidelink resource pool 302 comprises 4 symbols for sidelink communications, a first sidelink channel resource unit 304-1 in slot 202-1 comprises 4 symbols in the time domain; when slot 202-2 comprises 8 symbols for sidelink communications, a second sidelink channel resource unit 304-2 in slot 202-2 comprises 8 symbols in the time domain; and when slot 202-5 comprises 14 symbols for sidelink communications, a third sidelink channel resource unit 304-3 in slot 202-5 comprises 14 symbols in the time domain.

Further, the 4 symbols of the first sidelink channel resource unit 304-1 occupies symbols 10-13 in the first time slot 202-1; the 8 symbols of the second resource unit 304-2 occupies symbols 6-13 in the second time slot 202-2; and the 14 symbols of the third resource unit 304-3 occupies symbols 0-13 in the fifth time slot 202-5. In some embodiments, the mapping relationship comprises: when $N \leq 4$, n=N; when $4 < N \leq 6$, n=4; when $6 < N \leq 10$, n=6; and when $N < 10$, n=8.

In some embodiments, the position of the at least one time slot for sidelink communications that is used as a respective sidelink resource pool can be indicated by the BS 102. The position of the symbols in a time slot is preconfigured by the system or configured by the BS 102.

Figure 6:
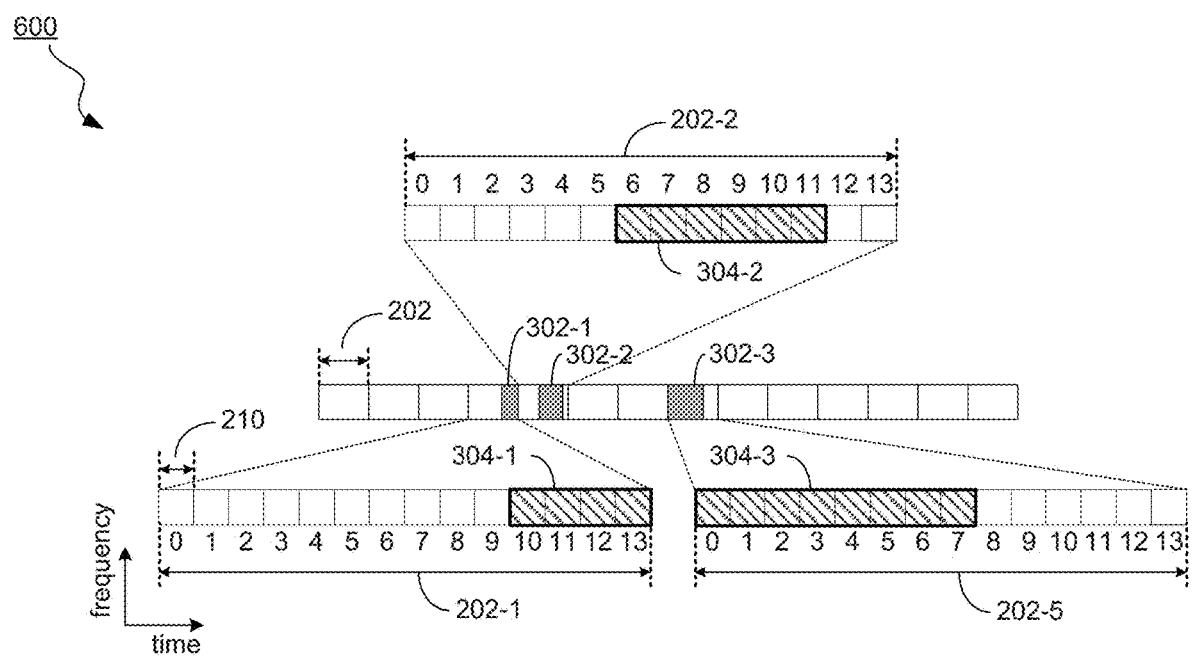
FIG. 6 illustrates a schematics of a radio frame structure with a plurality of sidelink resource pools, in accordance with some embodiments of the present disclosure.

FIG. 6 illustrates a schematics of a radio frame structure 600 with a sidelink resource pool 302, in accordance with some embodiments of the present disclosure. It should be noted FIG. 6 is for illustration purposes and is not intended to be limiting. A sidelink resource pool 302 may comprises any number of slots and RBs at any positions.

In the illustrated embodiments, in the radio frame structure 600, the sidelink resource pools 302 is for sidelink channels such as PSCCH. In the illustrated embodiments, the first sidelink resource pool 302 comprises 3 slots 202, i.e., 202-1, 202-2, and 202-5. For the 3 slots in sidelink resource pool 302 each may comprise different or same numbers of symbols for sidelink communications, as shown in 302-1, 302-2, and 302-3. In some embodiments, the UE 104 can determine the number (i.e., n) of symbols in a sidelink channel resource unit 304 according to the number (N) of symbols in a corresponding slot within the sidelink resource pool 302 and a mapping relationship. In the illustrated embodiments, when slot 202-1 comprises 4 symbols in the time domain for sidelink communications, a first sidelink channel resource unit 304-1 in slot 202-1 comprises 4 symbols in the time domain; when slot 202-2 comprises 6 symbols for sidelink communications, a second sidelink channel resource unit 304-2 in slot 202-2 comprises 6 symbols in the time domain; and when slot 202-5 comprises 8 symbols for sidelink communications, a third sidelink channel resource unit 304-3 in slot 202-5 comprises 8 symbols in the time domain.

Further, the 4 symbols of the first resource unit 304-1 occupies the symbols 10-13 in the first time slot 202-1; the 6 symbols of the second resource unit 304-2 occupies the symbols 6-11 in the second time slot 202-2; and the 8 symbols of the third resource unit 304-3 occupies symbols 0-7 in the fifth time slot 202-5. In some other embodiments, the symbols in a resource pool in a time slot are continuous. In some embodiments, the position of the symbols in a resource unit in a time slot can be determined according to one of the method presented in detail below.

In some embodiments, there is a minimum number ($n_0$) of first resource units (e.g., symbols) in a sidelink channel resource unit 304 in the time domain and n0 is preconfigured by the system or indicated by the BS 102. At least one sidelink channel can be divided in the time domain according to the available number (N) of symbols in a time slot for sidelink communications, wherein the at least one sidelink channel resource unit 304 each comprises a number ($n_0$) of symbols. In the time slot, a number (M) of sidelink channel resource units 304 can be divided in the time domain, wherein $M = \lceil N/n_0 \rceil$ or $\lfloor N/n_0 \rfloor$, M, N and n0 are non-negative integers. M−1 sidelink channel resource units 304 each comprises no symbols in the time domain and 1 sidelink channel resource unit 304 comprises [N−n0×(M−1)] symbols in the time domain. In some embodiments, positions of the at least one sidelink channel in the time slot can be determined according one of the method presented in detail below.

Figure 7:
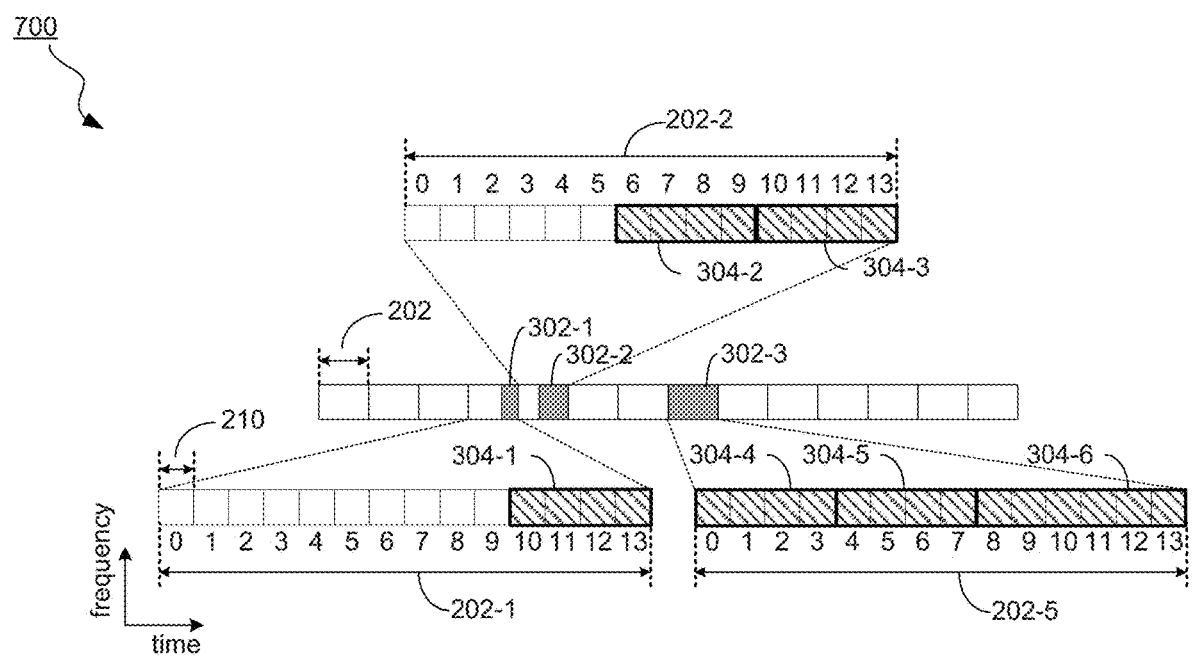
FIG. 7 illustrates a schematics of a radio frame structure with a plurality of sidelink resource pools, in accordance with some embodiments of the present disclosure.

FIG. 7 illustrates a schematics of a radio frame structure 700 with sidelink resource pool 302, in accordance with some embodiments of the present disclosure. It should be noted FIG. 7 is for illustration purposes and is not intended to be limiting. A sidelink resource pool 302 may comprise any numbers of slots and RBs in a sidelink resource pool 302 at any positions.

In the illustrated embodiments, in the radio frame structure 700 the sidelink resource pool 302 comprises 3 slots, i.e., 202-1, 202-2 and 202-5. The 3 slots in sidelink resource pool 302 each may comprise different numbers of symbols for sidelink communications, as shown in 302-1, 302-2, and 302-3. In some embodiments, the UE 104 can determine the number (i.e., n) of first resource units (e.g., symbols) in a sidelink channel resource unit 304 according to the number (N) of symbols in a corresponding resource pool 302 and a predefined rule.

In the illustrated embodiments, the minimum number of symbols in a sidelink channel resource unit is 4, i.e., n0=4. In the illustrated embodiments, when in slot 202-1, it comprises 4 symbols for sidelink communications, the 4 symbols can be used for a first sidelink channel resource unit 304-1; when in slot 202-2, it comprises 8 symbols for sidelink communications, the 8 symbols can be divided into 2 sidelink channel resource units 304-2/304-3, wherein the 2 sidelink channel resource units 304-2/304-3 each comprises 4 symbols in the time domain; and when in slot 202-5, it comprises 14 symbols for sidelink communications, the 14 symbols can be divided into 3 sidelink channel resource units 304-4/304-5/304-6, wherein a first and a second sidelink channel resource units 304-4/304-5 each comprises 4 symbols in the time domain and wherein a third sidelink channel resource unit 304-6 comprises 6 symbols in the time domain.

Further, the 4 symbols of the first resource unit 304-1 occupies the symbols 10-13 in the first time slot 202-1; the 8 symbols of the resource units 304-2/304-3 occupies the symbols 6-13 in the second time slot 202-2; and the 14 symbols of the resource units 304-4/304-5/304-6 occupies symbols 0-13 in the fifth time slot 202-5. In some embodiments, the relative positions of the 3 sidelink channel resource units 304-4/304-5/304-6 are preconfigured by the system. In some embodiments, the position of the symbols in a sidelink channel resource unit in a time slot can be determined according one of the method presented in detail below.

This method, in which a configuration of resource unit for at least one of sidelink channels is determined according to available sidelink resources (e.g., available symbols in a time slot) for sidelink communications allows for improved channel transmission performance, improves resource utilization and can also prevent interference between different sidelink channels and increase sidelink communication efficiency.

In some embodiments, a configuration of a sidelink channel resource unit 304 for a sidelink channel can be determined according to a number of available resource element (RE) in the respective sidelink channel resource unit 304. In some embodiments, the sidelink channel resource unit 304 comprises a plurality of REs, wherein the plurality of REs comprises at least one effective RE and at least one non-effective RE. In some embodiments, the effective RE is used for mapping sidelink information (e.g., sidelink control and data information) and the non-effective RE can be used for one of the following: used for mapping reference signals (RS), used as automatic gain control (AGC), and used as guard period (GP). In some embodiments, since the sidelink channel resource unit 304 for the respective sidelink channel, e.g., PSCCH, PSBCH and PSDCH, requires a constant number of resources for steady information on the sidelink channel, a minimum threshold number ($K_0$) of effective REs in each of the sidelink channel resource unit 304 can be fixed. In some embodiments, the number of effective REs in the plurality of REs in each of the sidelink channel resource unit 304 is K0 and the total number of REs is K, wherein $K \geq K_0$, K and $K_0$ are non-negative integers.

In some embodiments, a RS, an AGC, and a GP each can occupies at least one symbol in the time domain. In some embodiments, the RS can be one of the following: a Demodulation Reference Signal (DMRS), a Phase-Tracking Reference Signal (PTRS), a Channel-State Information Reference Signal (CSI-RS), and a Sounding Reference Signal (SRS).

In some embodiments, for a sidelink channel resource unit, when the REs on one symbol in the time domain are used as non-effective REs, or when the REs on one subcarrier in the frequency domain are used as non-effective REs, a number of effective REs of the sidelink channel resource unit can be determined as the product of a first number of effective symbols in the time domain and a second number of effective subcarriers in the frequency domain. In some embodiments, the value of K0 can be one of the following: preconfigured by the system and indicated by the BS 102. In some embodiments, the configuration of a sidelink channel resource unit for respective sidelink channel can be determined according to the value of K0 and a number of non-effective REs.

Specifically, in one embodiment, when a number (n) of first resource units (e.g., symbols) in the time domain or a number (n) of effective first resource units in the time domain is determined according to the illustrated embodiments discussed above, the number (k) of second resource units in the frequency domain can be determined by rounding up or rounding down the value of K0/(12×n), $$k = \left\lfloor \frac{K_0}{n \times 12} \right\rfloor \text{ or } \left\lceil \frac{K_0}{n \times 12} \right\rceil,$$

wherein k is the number of RBs and the RBs each comprises 12 subcarriers. Therefore, when n is the number of effective resource units (e.g., symbols) in the time domain for mapping sidelink control and/or data information, the total number of effective REs in each of the sidelink channel resource units is 12×n×k.

Similarly, in another embodiment, when a number (k) of second resource units (e.g., RBs) in the frequency domain is determined, the number (n) of first resource units (e.g., symbols) in the time domain or the number (n) of effective resource units in the time domain can be determined by rounding up or rounding down the value of K0/(12×k), $$n = \left\lfloor \frac{K_0}{n \times 12} \right\rfloor \text{ or } \left\lceil \frac{K_0}{n \times 12} \right\rceil,$$

wherein k is the number of RBs and the RBs each comprises 12 subcarriers. Therefore, when n is the number of effective first resource units (e.g., symbols) in the time domain for mapping sidelink control and/or data information, the total number of symbols in each of the sidelink channel resource unit 304 equals to a summation of the number (n) of effective symbols and the number of non-effective symbols. Further, the total number of effective REs in each of the at least one sidelink channel resource units is 12×n×k.

In some other embodiments, when a number (n) of first resource units (e.g., symbols) in the time domain or effective first resource units in the time domain is determined according to the illustrated embodiments discussed above and also when there is the number of non-effective REs in a sidelink channel resource unit is M, the number (k) of second resource units in the frequency domain a sidelink channel resource unit can be determined by rounding up or rounding down the value of (K0+M)/(12×n), $$k = \left\lfloor \frac{K_0 + M}{n \times 12} \right\rfloor \text{ or } \left\lceil \frac{K_0 + M}{n \times 12} \right\rceil,$$

wherein k is the number of RBs and the RBs each comprises 12 subcarriers. Therefore, when n is the number of effective resource units (e.g., symbols) in the time domain for mapping sidelink control and/or data information, the total number of effective REs in each of the sidelink channel resource unit 304 is 12×n×k−M.

Similarly, in some other embodiments, when a number (k) of second resource units (e.g., RBs) in the frequency domain is preconfigured by the system or indicated by the BS 102, and when there is the number of non-effective REs is M, the number (n) of first resource units (e.g., symbols) in the time domain or effective first resource units in the time domain can be determined by rounding up or rounding down the value of (K0+M)/(k×12), $$n = \left\lfloor \frac{K_0 + M}{n \times 12} \right\rfloor \text{ or } \left\lceil \frac{K_0 + M}{n \times 12} \right\rceil.$$

Therefore, when n is the number of effective first resource units (e.g., symbols) in the time domain for mapping sidelink control and/or data information, the total number of symbols in each of the at least one sidelink channel resource unit equals to a summation of the number (n) of effective symbols and the number of non-effective symbols. Further, the total number of effective REs in each of the at least one sidelink channel resource units is 12×n×k−M.

For example, an available sidelink resource set is determined according to a preconfigured sidelink BWP, which comprises all the RBs in the frequency domain in the BWP and all the time slots in the time domain in the BWP. DMRS pattern of a PSCCH in the available sidelink resource set is indicated by the BS 102 and the number (i.e, K) of effective REs equals to 240 in each a respective PSCCH resource unit. When the PSCCH resource unit comprises 5 symbols and one of the 5 symbols is for DMRS, a number (n) of effective first resource units (e.g., symbols) in the time domain is 4. A number (k) of RBs in each of the PSCCH resource unit can be determined by rounding up the K/(n×12), resulting a k value of 5. Similarly, when the PSCCH resource unit comprises 4 RBs in the frequency domain and when there are 2 symbols in the time domain for DMRS. A number (n) of effective symbols in one PSCCH resource unit is determined by rounding up the value of K/(k×12), resulting an n value of 5. Since there are 2 symbols for DRMS, the at least one PSCCH resource unit each comprises 7 symbols in the time domain.

In some embodiments, a configuration of a sidelink channel resource unit for at least one sidelink channel can be determined according to a configuration table. In some embodiments, the sidelink channel pattern table is predefined by the system or configured by a BS 102. In some embodiments, the sidelink channel pattern table comprises a plurality of configurations, wherein the configurations of the at least one sidelink channel resource unit each comprises a number (n) of first resource units in the time domain and a number (k) of second resource units in the frequency domain. In some embodiments, the plurality of configurations each corresponds to an index. In some embodiments, one of a plurality of sidelink channel pattern tables can be configured by the BS 102, which further indicates the index in the one of the plurality sidelink channel pattern table to the UE 104 so as to determine the corresponding configuration of the at least one sidelink channel resource unit for the at least one respective sidelink channel. In some embodiments, the same index in the sidelink channel pattern table can be used for the indication of configurations of different sidelink channels.

Figure 8:
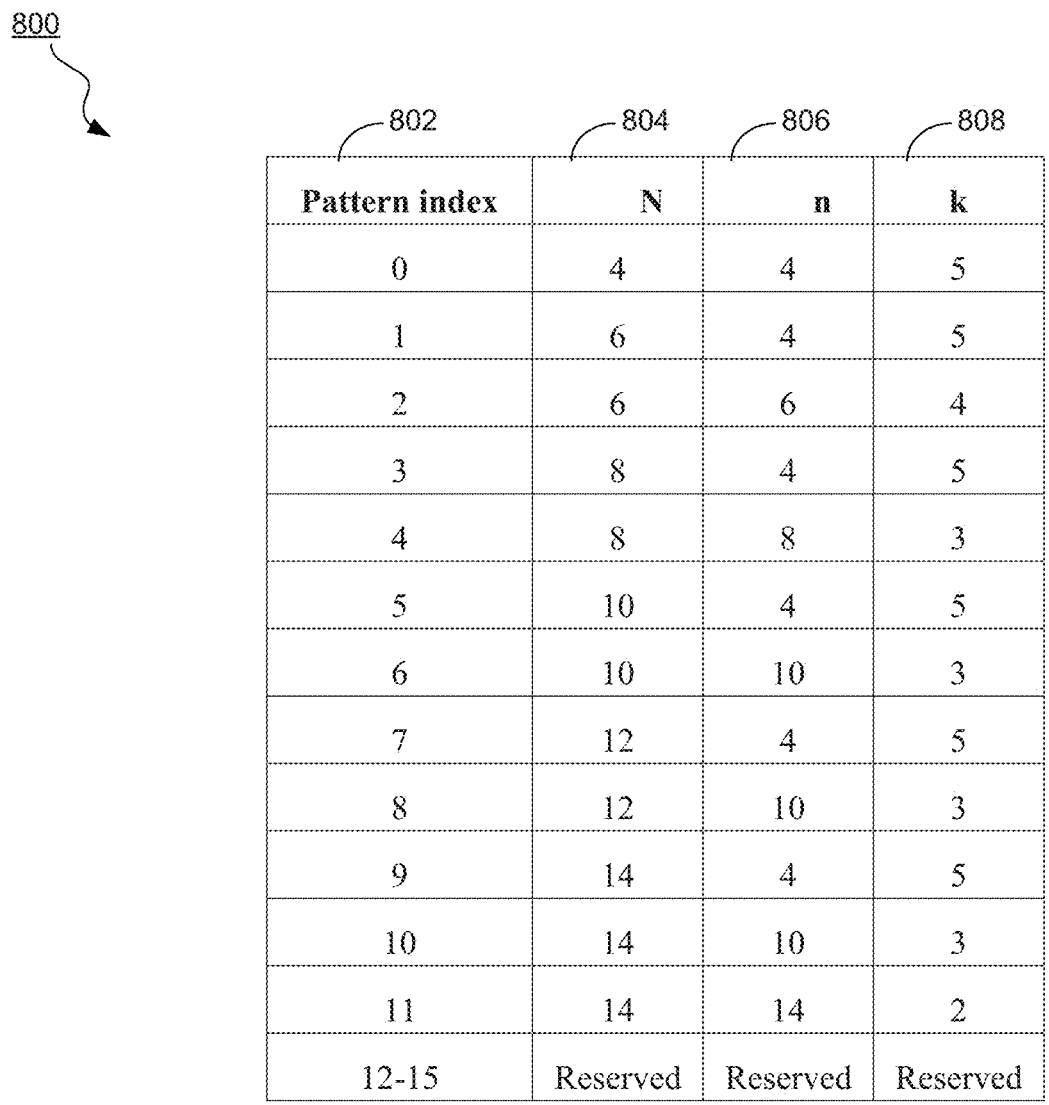
FIG. 8 illustrates a sidelink channel pattern table indicating a plurality of configurations of at least one sidelink channel resource units, in accordance with some embodiments of the present disclosure.

FIG. 8 illustrates a sidelink channel pattern table 800 indicating a plurality of configurations of at least one sidelink channel resource units, in accordance with some embodiments of the present disclosure. In the illustrated embodiment, the table 800 comprises 4 columns, a pattern index 802, a number (N) 804 of available resources in the time domain, a number (n) 806 of first resource units in the time domain in a sidelink channel resource unit, and a number (k) 808 of second resource units in the frequency domain in the sidelink channel resource unit. The pattern index 802 comprises 16 indices. Specifically, in table 800, at a pattern index of 0, N=4, n=4 and k=5; at a pattern index of 1, N=6, n=4 and k=5; at a pattern index of 2, N=6, n=6 and k=4; at a pattern index of 3, N=8, n=4 and k=5; at a pattern index of 4, N=8, n=8 and k=3; at a pattern index of 5, N=10, n=4 and k=5; at a pattern index of 6, N=10, n=10 and k=3; at a pattern index of 7, N=12, n=4 and k=5; at a pattern index of 8, N=12, n=10 and k=3; at a pattern index of 9, N=14, n=4 and k=5; at a pattern index of 10, N=14, n=10 and k=3; at a pattern index of 11, N=14, n=14 and k=2; and at a pattern index of 12-15, the N, n and k values can be reserved.

In some embodiments, the sidelink channel pattern table 800 is predefined by the system. In some embodiments, the sidelink channel pattern table 800 is for a PSCCH resource unit. In some embodiments, a BS 102 can further indicate an index through a higher layer signaling and/or a physical layer signaling to a UE 104. According to the received index and the sidelink channel pattern table, the UE 104 can further determine the number of available sidelink resources for sidelink communications and the n and/or k values of the PSCCH resource unit.

Figure 9:
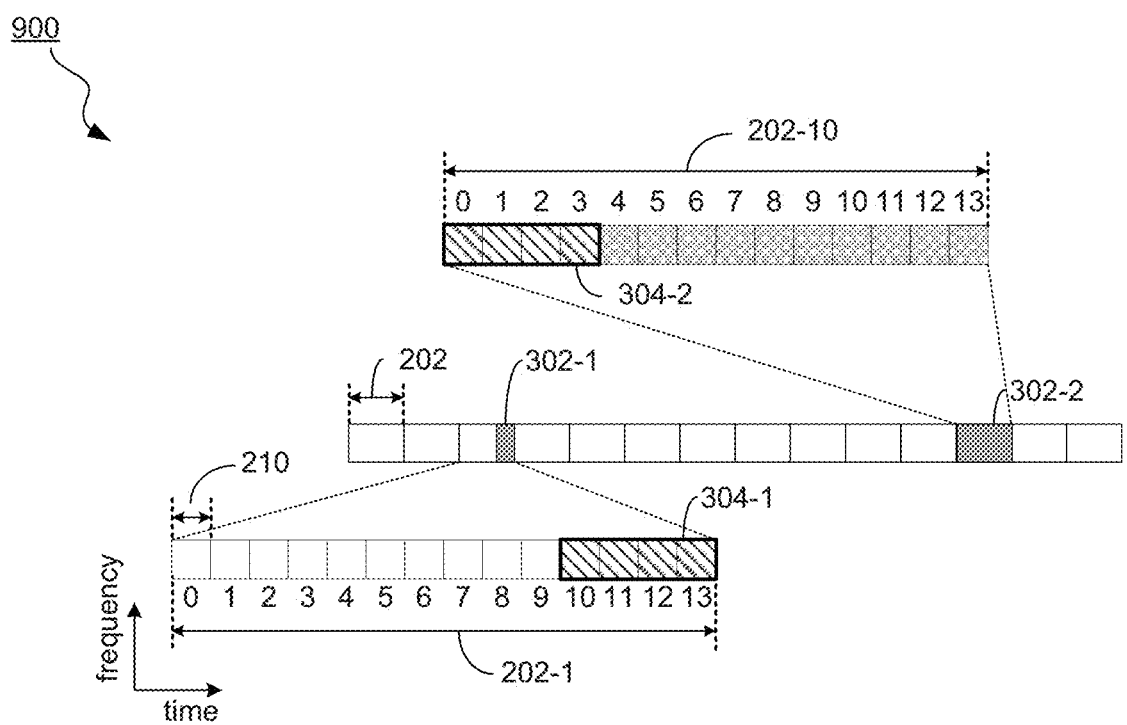
FIG. 9 illustrates a schematics of a radio frame structure with a plurality of sidelink resource pools, in accordance with some embodiments of the present disclosure.

FIG. 9 illustrates a schematics of a radio frame structure 900 with a sidelink resource pool 302, in accordance with some embodiments of the present disclosure. It should be noted FIG. 9 is for illustration purposes and is not intended to be limiting. Numbers and positions of the sidelink resource pool 302 can be indicated by the BS 102 through a higher layer signaling. It should be noted a sidelink resource pool 302 may comprises any numbers of sidelink channel resource units, wherein the sidelink channel resource units can comprise any numbers of first resource units (e.g., symbols) in the time domain at any positions, and a time slot may comprise 12 or 14 symbols, which are within the scope of this invention.

In the illustrated embodiments, in the radio frame structure 900 the sidelink resource pool 302 comprises 2 slots, i.e., 202-1 and 202-10. The 2 slots included in sidelink resource pool 302 each may comprise different numbers of available symbols for sidelink communications. In the illustrated embodiment, the first slot 202-1 comprises 4 available symbols for sidelink communications; and the second slot 202-10 comprises 14 available symbols for sidelink communications.

In the illustrated embodiment, the BS 102 indicates a plurality of indices, in which the plurality of indices each corresponds to a time slot logically chronologically in the sidelink resource pool. In some embodiments, the UE 104 can determine a plurality of configurations of PSCCH of respective slots corresponding to the plurality of indices according to a sidelink channel pattern table 800. Specifically, the first time slot 202-1 corresponds to an index 0, in which the number of available symbols in the first time slot 202-1 is 4, a first PSCCH resource unit 304-1 in the first time slot occupies 4 symbols in the time domain and 5 RBs in the frequency domain. Similarly, the tenth time slot 202-10 corresponds to index 9 in table 800, in which the number of available symbols in the tenth time slot 202-10 is 14, a second PSCCH resource unit 304-2 in the tenth time slot 202-10 occupies 4 symbols in the time domain and 5 RBs in the frequency domain.

In the illustrated embodiment, the 4 symbols of the first PSSCH resource unit 304-1 occupies symbols 10-13 in the first time slot 202-1; and the 4 symbols of the second PSSCH resource unit 304-2 occupies symbols 0-3 in the tenth time slot 202-10. In some other embodiments, the symbols in a resource pool in a time slot are continuous. In some embodiments, positions of available symbols in a time slot and positions of the sidelink resource unit 304-1/304-2 in a time slot can be determined using one of the method discussed in detail below.

Figure 10:
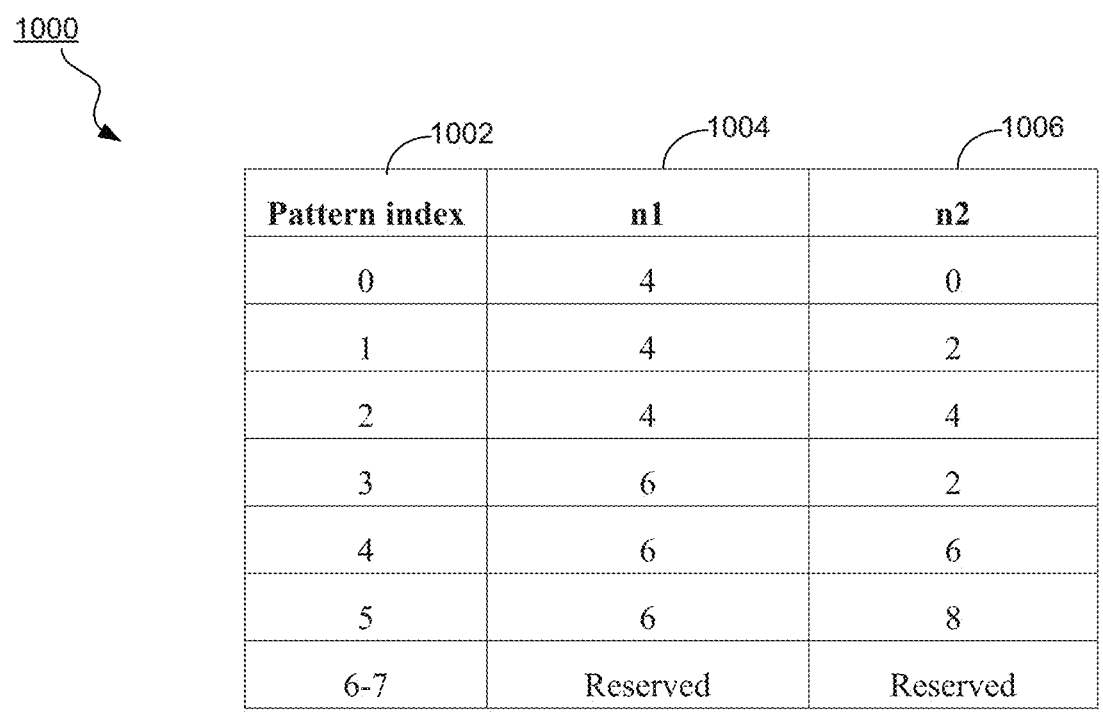
FIG. 10 illustrates a sidelink channel pattern table indicating a plurality of configurations of at least two sidelink channel resource units in a time slot, in accordance with some embodiments of the present disclosure.

FIG. 10 illustrates a sidelink channel pattern table 1000 indicating a plurality of configurations of at least two sidelink channel resource units in a time slot, in accordance with some embodiments of the present disclosure. In the illustrated embodiment, the table 1000 comprises 3 columns: a pattern index 1002, a first number (n1) 1004 of first resource units in the time domain in a first sidelink channel (e.g., PSCCH) resource unit, and a second number (n2) 1006 of first resource units in the time domain in a second sidelink channel (e.g., PSSCH) resource unit. The pattern index column 1002 comprises 8 indices. Specifically, in table 1000, at a pattern index of 0, n1=4 and n2=0; at a pattern index of 1, n1=4 and n2=2; at a pattern index of 2, n1=4 and n2=4; at a pattern index of 3, n1=6 and n2=2; at a pattern index of 4, n1=6 and n2=6; at a pattern index of 5, n1=6 and n2=8; at a pattern index of 6 and 7, the n1 and n2 values can be reserved. In the illustrated embodiments, the number of available symbols in a time slot can be also determined by a summation of the corresponding values of n1 and n2 in the same time slot. Specifically, at a pattern index of 0, N=4 in a time slot; at a pattern index of 1, N=6 in a time slot; at a pattern index of 2, N=8 in a time slot; at a pattern index of 3, N=8 in a time slot; at a pattern index of 4, N=12 in a time slot; at a pattern index of 5, N=14 in a time slot; at pattern indices of 5 and 6, N can be determined by n1 and n2, which are reserved.

In some embodiments, the sidelink channel pattern table 1000 is pre-configured by the system, wherein the sidelink channel pattern table 1000 comprises a plurality (i.e., 8) of configurations of at least two sidelink channel resource units. The plurality of configurations each corresponds to an index, which can be used to indicate the UE 104 the configuration of the at least two sidelink channel resource unit, numbers (i.e., n1 and n2) of symbols in the time domain in the corresponding PSCCH and the PSSCH resource units. The index can be indicated by the BS 102 to the UE 104 through a higher layer signaling and/or a physical layer signaling.

In some embodiments, a sidelink channel pattern table can further indicate a respective property of available symbols in a time slot. For example, the sidelink channel pattern table can indicate a symbol in a time slot is one of the following: a symbol of a first resource unit in the time domain in a sidelink channel resource unit, a symbol for carrying a reference signal, a symbol for carrying AGC, and a symbol used as a GP.

In some embodiments, a number (n) of first resource units in the time domain in a sidelink channel resource unit can be pre-configured by the system, while a number (k) of second resource units in the frequency domain in the sidelink channel resource unit can be determined according to a SCS of the sidelink channel. For example, a PSCCH resource unit comprises 4 symbols in the time domain (i.e., n=4), which is pre-configured by the system. A PSCCH resource unit also comprises k RBs in the frequency domain, wherein the k value can be determined by a SCS of the PSCCH.

Figure 11:
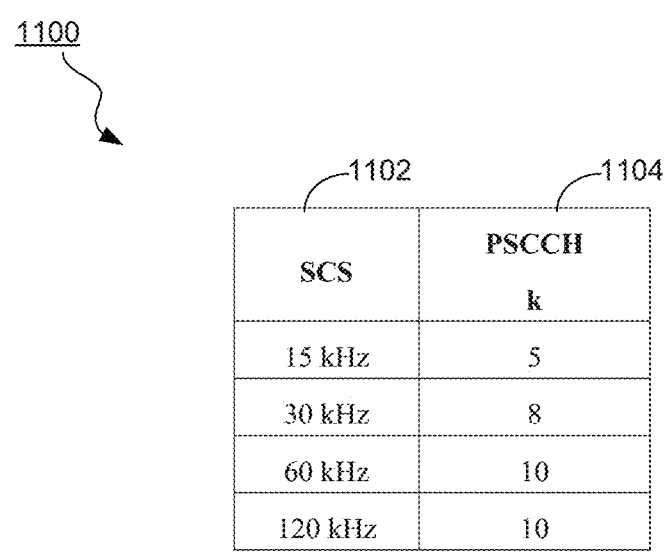
FIG. 11 illustrates a table showing a mapping relationship between a SCS for sidelink communications and k values in a sidelink channel resource unit for a sidelink channel, in accordance with some embodiments of the present disclosure.

FIG. 11 illustrates a table 1100 showing a mapping relationship between a SCS for sidelink communications and k values in a sidelink channel resource unit for a sidelink channel, in accordance with some embodiments of the present disclosure. In the illustrated embodiment, the table 1100 comprises 4 SCS values 1102, i.e. 15 kHz, 30 kHz, 60 kHz and 120 kHz and 4 k values 1104, i.e., 5, 8, 10, and 10. Although only 4 SCS values 1102 and 4 k values 1104 are shown in FIG. 11, it should be noted any numbers of SCS values with any values for any numbers of sidelink channels can be included which are within the scope of this invention.

In the illustrated embodiment, at a SCS value of 15 kHz, the PSCCH resource unit comprises 5 RBs in the frequency domain, at a SCS value of 30 kHz, the PSCCH resource unit comprises 8 RBs in the frequency domain; at a SCS value of 60 kHz, the PSCCH resource unit comprises 10 RBs in the frequency domain, and at a SCS value of 120 kHz, the PSCCH resource unit comprises 10 RBS in the frequency domain.

In some embodiments, aforementioned embodiments can be combined to provide effective method for determining at least one sidelink channel resource units. In some embodiments, a number (k) of second resource units in the frequency domain in a sidelink channel resource unit can be pre-configured by the system, while a number (n) of first resource units in the time domain in the sidelink channel resource unit can be determined according to a number of available sidelink resources for sidelink communications. For example, a PSCCH resource unit comprises 5 RBs in the frequency domain (i.e., k=5), which is preconfigured by the system. A PSCCH resource unit also comprises n symbols in the time domain, wherein the n value can be determined by the number (i.e., N) of available symbols within a time slot for sidelink communications. For example, when N equals to 8, the PSCCH resource unit comprises 6 symbols in the time domain according to a predefined mapping relationship. In some embodiments, the mapping relationship comprises: when $N\leq 4$, $n=N$; when $4<N\leq 6$, $n=4$; when $6<N\leq 10$, $n=6$; and when $N<10$, $n=8$.

In some embodiments, a sidelink resource pool is configured by a BS 102. The BS 102 further configures a PSCCH resource unit comprising n symbols in the time domain, and the PSCCH resource unit each comprising a minimum number (K0) of available REs. The PSCCH resource unit each comprises a symbol for DMRS, which occupies all the subcarriers in the frequency domain in the PSCCH resource unit. The UE 104 can further determine the number (k) of second resource units in the frequency domain in each of the PSCCH resource unit according to the above configurations. For example, When n=5 and $K_O$=240 are configured by the BS 102, since a PSCCH resource unit also comprises 1 symbol for DMRS, the PSCCH resource unit comprises 4 effective symbols in the time domain. The k value can be determined by rounding up a value of $K_O/(n \times 12)$, which equals to 5. Therefore, the PSCCH resource unit each comprises 5 symbols in the time domain, 4 effective symbols in the time domain for sidelink communications, and 5 RBs in the frequency domain.

In some embodiments, the position of first resource units (e.g., symbols) in a sidelink channel resource unit is determined by a position of a starting symbol (e.g., N) in a time slot and the number (n) of the first resource units in the sidelink channel resource unit, wherein $1 \leq N \leq 14$ or $0 \leq N \leq 13$. In some embodiments, the first resource units in the sidelink channel resource unit is continuous. In some embodiments, the position of first resource units (e.g., symbols) in a sidelink channel resource unit is determined by a position of a starting symbol (e.g., N) of available sidelink resources in a time slot and the number (n) of the first resource units in the sidelink channel resource unit, wherein $1 \leq N \leq 14$ or $0 \leq N \leq 13$.

In some embodiments, the N and n values can be one of the following: pre-configured by the system to a UE 104 and indicated through a signaling. In some embodiments, the signaling can be transmitted from the BS 102 to the UE 104 as a higher layer signaling or a physical layer signaling, e.g., a system broadcast message, a radio resource control (RRC) message, a downlink control information (DCI), etc. In some other embodiments, the signaling can be also transmitted from a UE 104 in sidelink communications in a form of a higher layer signaling or a physical layer signaling, e.g., a sidelink broadcast message, an RRC message, a sidelink control information (SCI), etc.

In some embodiments, positions of the respective starting symbols in respective sidelink channel resource units for respective sidelink channels can be defined independently. In some embodiments, the positions of the respective starting symbols for different respective sidelink channel resource units can be the same or different. In some embodiments, the time slot is one of the time slot in a sidelink resource set. There is at least one time slot in a sidelink resource pool or an available sidelink resource set. At least one symbol in the at least one time slot is available symbols for sidelink communications.

Figure 12:
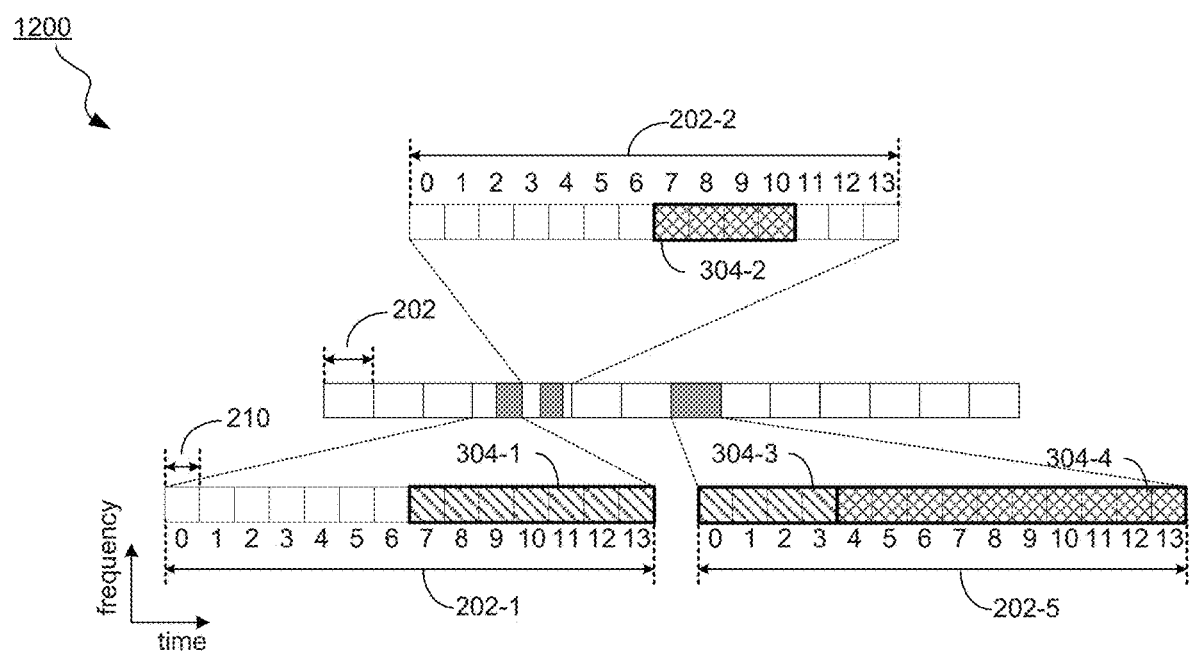
FIG. 12 illustrates a schematics of a radio frame structure with a plurality of sidelink channel resource units, in accordance with some embodiments of the present disclosure.

FIG. 12 illustrates a schematics of a radio frame structure 1200 with a plurality of sidelink channel resource units 304, in accordance with some embodiments of the present disclosure. It should be noted FIG. 12 is for illustration purposes and is not intended to be limiting. In some embodiments, numbers and positions of a plurality of time slots 202 that contains resources for sidelink communications can be preconfigured or indicated by the BS 102 through a higher layer signaling. It should be noted a radio frame structure 1200 may comprises any numbers of time slots 202 that contains resources for sidelink communications at any positions, and the plurality of time slots 202 may further comprises any numbers of sidelink channel resource units, wherein the sidelink channel resource units can comprise any numbers of first resource units (e.g., symbols) in the time domain at any positions, and a time slot may comprise 12 or 14 symbols, which are within the scope of this invention.

In the illustrated embodiments, the radio frame structure 1200 comprises 4 sidelink channel resource units for 2 sidelink channels (e.g., PSCCH and PSSCH) in 3 respective time slots 202. In some embodiments, the 3 time slots 202 each comprises 14 symbols with normal CP. In the illustrated embodiments, a first PSCCH resource unit 304-1 is in a first time slot 202-1; a first PSSCH resource unit 304-2 is in a second time slot 202-2; and a second PSCCH resource unit 304-3 and a second PSSCH resource unit 304-4 are in a fifth time slot 202-5 The 4 sidelink channel resource units (i.e., 304-1, 304-2, 304-3, and 304-4) each may comprise different numbers of first resource units (symbols), which can be determined by one of the methods discussed above. In the illustrated embodiment, the first PSCCH resource unit 304-1 comprises 7 first resource units in the time domain; the first PSSCH resource unit 304-2 comprises 4 first resource units in the time domain; the second PSCCH resource unit 304-3 comprises 4 first resource units in the time domain; and the second PSSCH resource unit 304-4 comprises 10 first resource units in the time domain. In some other embodiments, the symbols in a resource pool in a time slot are continuous. In some embodiments, numbers of symbols the time domain in a sidelink channel resource unit 304 can be determined using one of the method discussed in detail above.

In some embodiments, when the starting symbol of the first PSCCH resource unit 304-1 in the first time slot 202-1 is 7 (i.e., N=7), the first PSCCH resource unit 304-1 occupies symbols 7-13 of the first time slot. When the starting symbol of the first PSSCH resource unit 304-2 in the second time slot 202-2 is also 7 (i.e., N=7), the first PSSCH resource unit 304-2 occupies symbols 7-10 of the second time slot 202-2. When the starting symbol of the second PSSCH resource unit 304-3 is 0 and the starting symbol of the second PSCCH resource unit 304-4 is 4, the second PSSCH resource unit 304-3 occupies symbols 0-3 and the second PSCCH resource unit 304-4 occupies symbols 4-13 in the fourth time slot 202-4.

Figure 13:
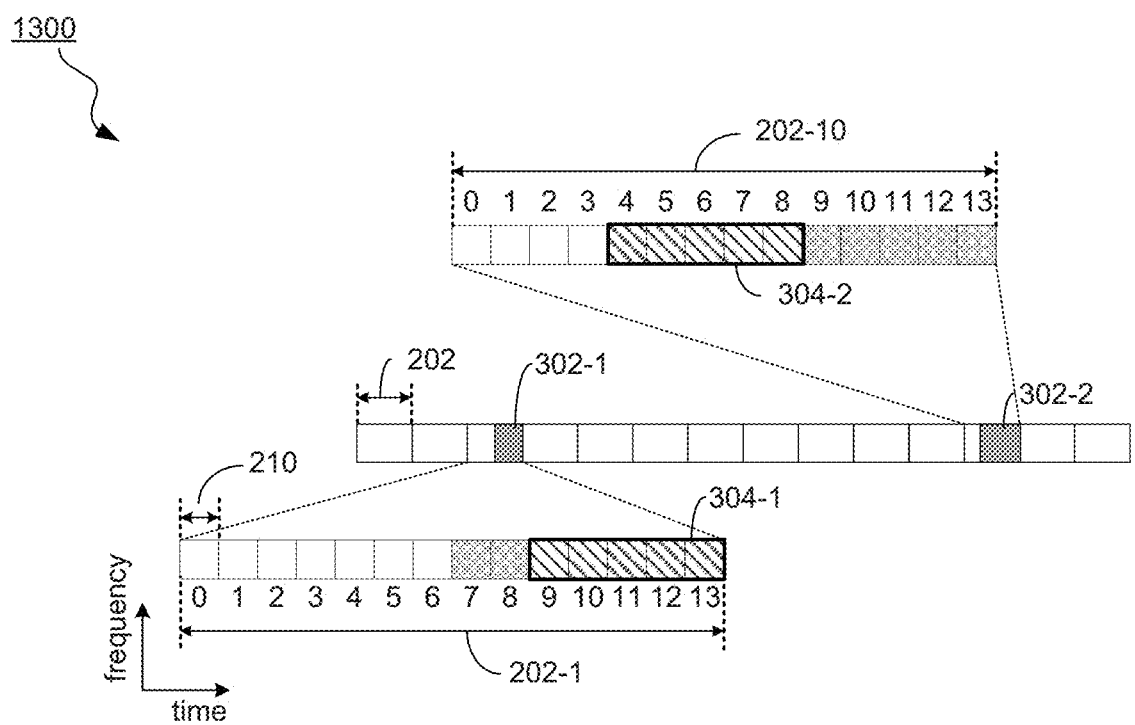
FIG. 13 illustrates a schematics of a radio frame structure with a plurality of available sidelink resource set, in accordance with some embodiments of the present disclosure.

FIG. 13 illustrates a schematics of a radio frame structure 1300 with an available sidelink resource set 302, in accordance with some embodiments of the present disclosure. It should be noted FIG. 13 is for illustration purposes and is not intended to be limiting. In some embodiments, numbers and positions of the available sidelink resource set 302 in respective time slots 202 for sidelink communications can be preconfigured or indicated by the BS 102 through a higher layer signaling. It should be noted a radio frame structure 1300 may comprises any numbers of time slots 202 that contained in the available sidelink resource set 302 for sidelink communications at any positions. The plurality of time slots 202 wherein the available sidelink resource set 302 may comprises any numbers of sidelink channel resource units 304. The sidelink channel resource units 304 each can comprise any numbers of first resource units (e.g., symbols) in the time domain at any positions, and a time slot may comprise 12 or 14 symbols, which are within the scope of this invention.

In the illustrated embodiments, in the radio frame structure 1300 the available sidelink resource set 302 comprises 2 slots, i.e., 202-1 and 202-10, and each of the slots contains a sidelink channel resource unit 304 for a sidelink channel (e.g., PSCCH). In some embodiments, the 2 time slots 202 each comprises 14 symbols with normal CP. In the illustrated embodiments, the positions of the available sidelink resource set 302 in respective time slots are preconfigured by the system or configured by the BS 102 through a higher layer signaling. In the illustrated embodiments, the symbols 7-13 in the first time slot 202-1 are used for sidelink communication; and the symbols 4-13 in the tenth time slot 202-10 are available sidelink resource. In the first time slot 202-1, the first PSCCH resource unit 304-1 starts at the third available symbol (N=2) of sidelink communication within the slot 202-1, which occupies 5 symbols (n=5) in the time domain, i.e. the first PSCCH resource unit 304-1 occupies symbols 9-13 in the first time slot 202-1; and the second PSCCH resource unit 304-2 starts at the first available symbol (N=0) of sidelink communication, i.e., the second PSCCH resource unit 304-2 occupies symbols 4-8 in the tenth time slot 202-10, wherein N is the position of the starting symbol of a sidelink channel resource unit 304 in an available sidelink resource set 302. The 2 sidelink channel resource units 304 (i.e., 304-1 and 304-2) each may comprise different numbers of first resource units (symbols), which can be determined by one of the methods discussed above.

In some embodiments, a time slot may comprise a plurality of sidelink channel resource units for a sidelink channel, when a summation of numbers of first resource units in the time domain of the plurality of sidelink channel resource units are equal to or smaller than the number of symbols in the time slot, i.e., $\Sigma n_i \leq 14$ or $\Sigma n_i \leq 12$, wherein $i \geq 1$ and is a positive integer. The starting symbol of each of the plurality of sidelink channel resource units is defined by $N+i \times n_i$, wherein N is a position of the first symbol in the time slot that is used for sidelink communication, ni is the number of first resource units in the i-th sidelink channel resource unit, and i is a non-negative integer.

In some embodiments, the N and $n_i$ values can be one of the following: pre-configured by the system to a UE 104 and indicated through a signaling. In some embodiments, the signaling can be transmitted from the BS 102 to the UE 104 as a higher layer signaling or a physical layer signaling, e.g., a system broadcast message, a radio resource control (RRC) message, a downlink control information (DCI), etc. In some other embodiments, the signaling can be also transmitted from a UE 104 in sidelink communications in a form of a higher layer signaling or a physical layer signaling, e.g., a sidelink broadcast message, an RRC message, a sidelink control information (SCI), etc.

When the plurality of sidelink channel resource units each comprises n first resource units in the time domain, $n_0 = (N_0 - N) \bmod n$, wherein No is the total number of symbols in a time slot, i.e., 14 or 12, N is the position of the first symbol in the time slot that is used for sidelink communication, n is the number of first resource units in the sidelink channel resource units, the time slot may comprises one sidelink channel resource unit that comprises no first resource units in the time domain.

Figure 14:
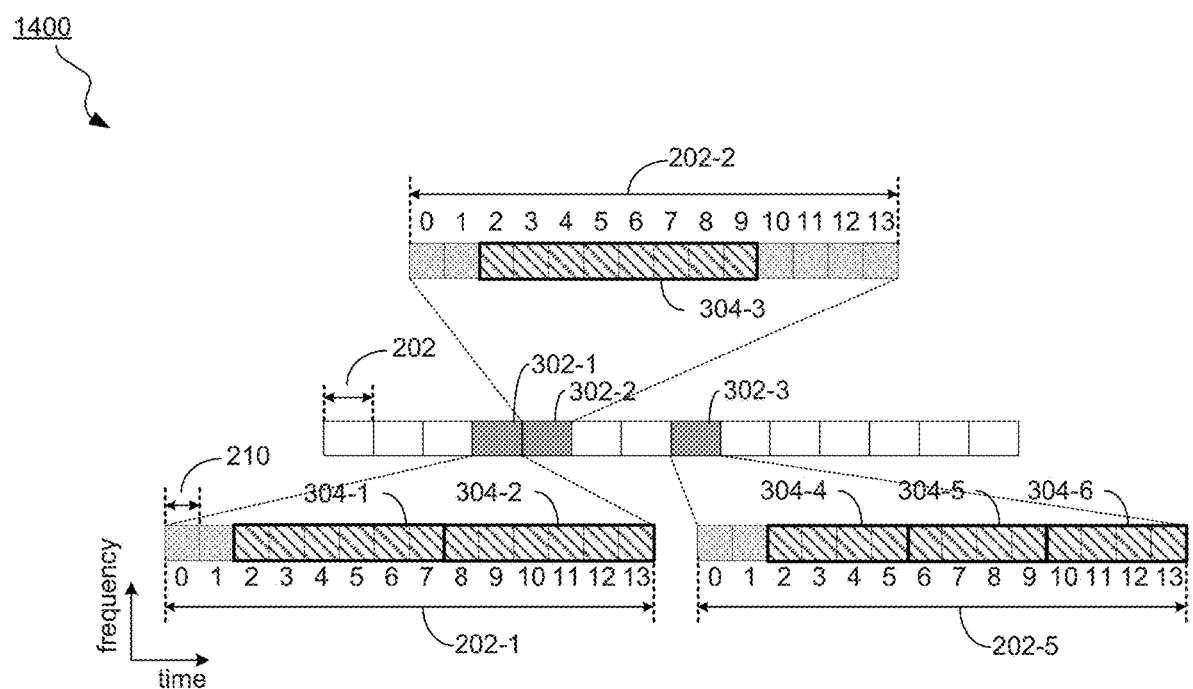
FIG. 14 illustrates a schematics of a radio frame structure with a plurality of available sidelink resource set, in accordance with some embodiments of the present disclosure.

FIG. 14 illustrates a schematics of a radio frame structure 1400 with an available sidelink resource set 302, in accordance with some embodiments of the present disclosure. It should be noted FIG. 14 is for illustration purposes and is not intended to be limiting. In some embodiments, numbers and positions of the plurality of time slots 202 for sidelink communications can be preconfigured or indicated by the BS 102 through a higher layer signaling. It should be noted a radio frame structure 1400 may comprises any numbers of time slots 202 that contained within the available sidelink resource sets 302 at any positions. The plurality of time slots 202 may further comprises any numbers of sidelink channel resource units 304. The sidelink channel resource units 304 each can comprise any numbers of first resource units (e.g., symbols) in the time domain at any positions, and a time slot may comprise 12 or 14 symbols, which are within the scope of this invention.

In the illustrated embodiment of FIG. 14, all the symbols in 3 time slots are available symbols for sidelink communications, i.e., 302-1, 302-2 and 302-3. Each of the slots 202 comprises at least one sidelink channel resource unit 304.

In the illustrated embodiment, the first time slot 202-1 comprises 2 PSCCH resource units 304, wherein a first PSCCH resource unit 304-1 starts at symbol 2 which occupies symbols 2-7 and a second PSCCH resource unit 304-2 occupies symbols 8-13 of the first time slot 202-1. The second time slot 202-2 comprises a third PSCCH resource unit 304-3 which starts at symbol 2 and occupies symbols 2-9 of the second time slot 202-2. Similarly, the fifth time slot 202-5 comprises 3 PSCCH resource units 304, wherein a fourth PSCCH resource unit 304-4 starts at symbol 2 and occupies symbols 2-5; a fifth PSCCH resource unit 304-5 occupies symbols 6-9; and a sixth PSCCH resource unit 304-6 occupies symbols 10-13 of the fifth time slot 202-5.

In some embodiments, a time slot may comprise a plurality of sidelink channel resource units for a plurality of respective sidelink channels, when a summation of numbers of first resource units in the time domain of the plurality of sidelink channel resource units are equal to or smaller than the number of symbols in the time slot, i.e., $\Sigma n_i \leq 14$ or $\Sigma n_i \leq 12$, wherein $i \geq 1$ and i is a positive integer. The starting symbol of each of the plurality of sidelink channel resource units is defined by $N+i \times n_i$, wherein N is a position of the first symbol in a available sidelink resource set that is used for sidelink communication, ni is the number of first resource units in the i-th sidelink channel resource unit, and i is a non-negative integer. The position of the available sidelink resource set in a time slot is preconfigured by the system.

In some embodiments, the N and $n_i$ values can be one of the following: pre-configured by the system to a UE 104 and indicated through a signaling. In some embodiments, the signaling can be transmitted from the BS 102 to the UE 104 as a higher layer signaling or a physical layer signaling, e.g., a system broadcast message, a radio resource control (RRC) message, a downlink control information (DCI), etc. In some other embodiments, the signaling can be also transmitted from a UE 104 in sidelink communications in a form of a higher layer signaling or a physical layer signaling, e.g., a sidelink broadcast message, an RRC message, a sidelink control information (SCI), etc.

Figure 15:
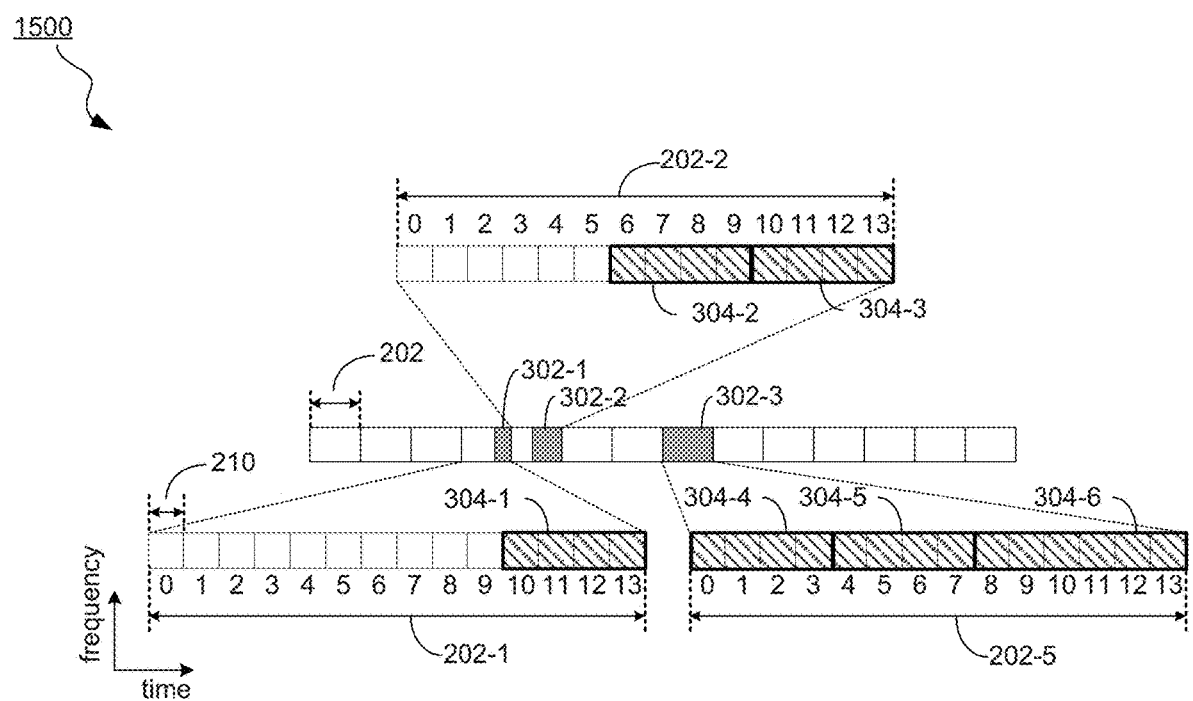
FIG. 15 illustrates a schematics of a radio frame structure with a plurality of available sidelink resource set, in accordance with some embodiments of the present disclosure.

FIG. 15 illustrates a schematics of a radio frame structure 1500 with an available sidelink resource set 302, in accordance with some embodiments of the present disclosure. It should be noted FIG. 15 is for illustration purposes and is not intended to be limiting. In some embodiments, numbers and positions of the plurality of time slots 202 for sidelink communications can be preconfigured or indicated by the BS 102 through a higher layer signaling. It should be noted a radio frame structure 1500 may comprises any numbers of time slots 202 that contained within the available sidelink resource set 302 at any positions. The plurality of time slots 202 may further comprises any numbers of sidelink channel resource units 304. The sidelink channel resource units 304 each can comprise any numbers of first resource units (e.g., symbols) in the time domain at any positions, and a time slot may comprise 12 or 14 symbols, which are within the scope of this invention.

In the illustrated embodiment of FIG. 15, 4 symbols in a first time slot 202-1, 8 symbols in a second time slot 202-2, and 14 symbols in a fifth time slot 202-5 in 3 time slots are available symbols for sidelink communications.

In the illustrated embodiment, the first time slot 202-1 comprises a first PSCCH resource units 304-1, wherein the first PSCCH resource unit 304-1 starts at symbol 10 and occupies symbols 10-13 of the first time slot 202-1. A second PSCCH resource unit 304-2 occupies symbols 6-9 of the second time slot 202-2 and a third PSCCH resource unit 304-3 occupies symbols 10-13 of the second time slot 202-2. Similarly, the fifth time slot 202-5 comprises 3 PSCCH resource units 304, wherein a fourth PSCCH resource unit 304-4 occupies symbols 0-3; a fifth PSCCH resource unit 304-5 occupies symbols 4-7; and, since the last 6 symbols cannot be divisible by 4, a sixth PSCCH resource unit 304-6 comprising 6 symbols occupies symbols 8-13 of the fifth time slot 202-5.

In some embodiments, a configuration of at least one sidelink channel resource unit for a respective sidelink channel can be determined by a respective sidelink subcarrier spacing (SCS). In some embodiments, on available resources for sidelink communications, a respective sidelink-specific SCS is configured. Specifically, in a sidelink resource pool, a sidelink-specific SCS can be configured. Alternatively, in some embodiments, when a resource is shared between the sidelink communications and the cellular communications or when a resource is used for multiple processes (e.g., multiplexing), a SCS in the cellular communications can be also configured as a SCS in sidelink communications. In some other embodiments, a SCS in sidelink communications can be also configured on a sidelink-specific resource or a sidelink-specific bandwidth part (BWP).

In some embodiments, the at least one sidelink channel resource unit for a sidelink channel each is configured with a first number (n) of first resource units in the time domain and a second number (k) of second resource units in the frequency domain, wherein a first resource unit in the time domain can be one of the following: a symbol and a time slot and wherein a second resource unit in the frequency domain can be a resource block (RB), and wherein n and k are non-negative integers. In some embodiments, a mapping relationship between the SCS in sidelink communications, and a position (i.e., N value) of a starting symbol of a sidelink channel resource unit in a time slot or in an available sidelink resource set for a sidelink channel can be preconfigured by the system or configured by the BS 102. In some embodiments, positions of starting symbols in the at least one sidelink channel resource unit for different sidelink channels can be configured independently. In some embodiments, N values for different respective sidelink channels can be the same or different. In some embodiments, a mapping relationship between the SCS value and the N value can be 1-to-1, i.e., a plurality of SCS values each corresponds to 1 N value, wherein the N value can be directly used to determine the position of the corresponding sidelink channel resource unit. In some other embodiments, the plurality of SCS values each corresponds to a plurality of N values and the position of the corresponding side channel resource unit can be determined according additional conditions, which are discussed in detail below.

Figure 16:
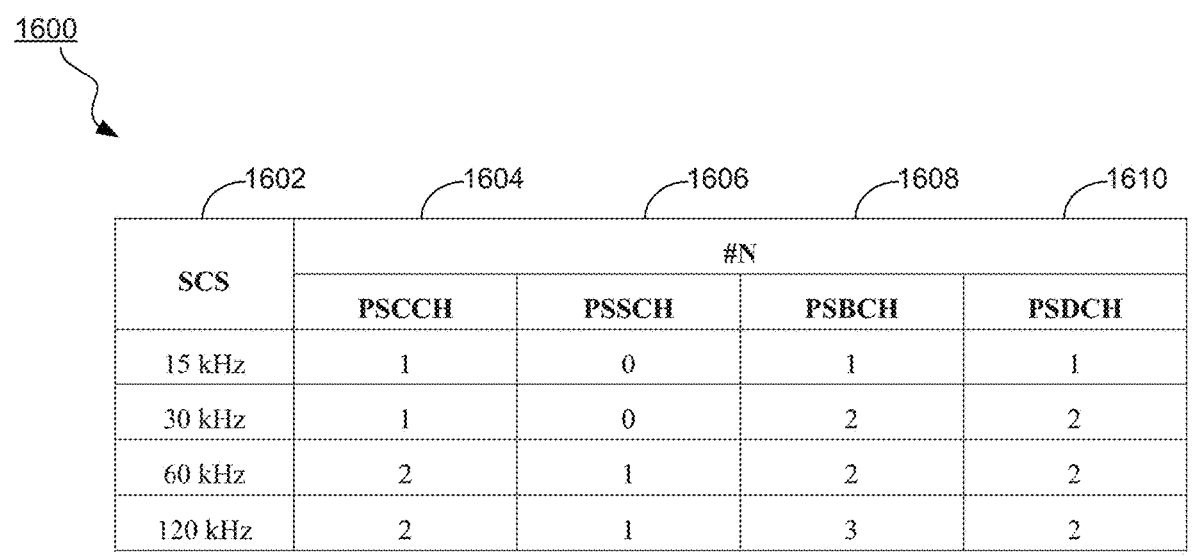
FIG. 16 illustrates a table showing a mapping relationship between a SCS in sidelink communications and N values of a sidelink channel resource unit for a sidelink channel, in accordance with some embodiments of the present disclosure.

FIG. 16 illustrates a table 1600 showing a mapping relationship between a SCS in sidelink communications and N values of a sidelink channel resource unit for a sidelink channel, in accordance with some embodiments of the present disclosure. In some embodiments, the N value is a position of a starting symbol of a sidelink channel resource unit in one of the following: a time slot and an available sidelink resource set. In the illustrated embodiment, the table 1600 comprises 4 SCS values 1602, i.e. 15 kHz, 30 kHz, 60 kHz and 120 kHz, and 4 N values for sidelink channel resource units of 4 sidelink channels, i.e., a PSCCH 1604, a PSSCH 1606, a PSBCH 1608 and a PSDCH 1610. Although only 4 SCS values 1602 and 4 sidelink channels are shown in FIG. 16, it should be noted any numbers of SCS values with any values for any numbers of sidelink channels can be included which are within the scope of this invention.

In the illustrated embodiment, at a SCS value of 15 kHz, a PSCCH resource unit 1604 starts at N=1; a PSSCH resource unit 1606 starts at N=0; a PSBCH resource unit 1608 starts at N=1; and a PSDCH resource unit 1610 starts at N=1. At a SCS value of 30 kHz, a PSCCH resource unit 1604 starts at N=1; a PSSCH resource unit 1606 starts at N=0; a PSBCH resource unit 1608 starts at N=2; and a PSDCH resource unit 1610 starts at N=2. At a SCS value of 60 kHz, a PSCCH resource unit 1604 starts at N=2; a PSSCH resource unit 1606 starts at N=1; a PSBCH resource unit 1608 starts at N=2; and a PSDCH resource unit 1610 starts at N=2. At a SCS value of 120 kHz, a PSCCH resource unit 1604 starts at N=2; a PSSCH resource unit 1606 starts at N=1; a PSBCH resource unit 1608 starts at N=3; and a PSDCH resource unit 1610 starts at N=2.

In some embodiments, when a transmission of sidelink signals on a sidelink channel is performed by a UE 104, the UE 104 can further determine the position of first resource units in the time domain of a sidelink channel resource unit according to the SCS of sidelink communications using table 1600. For example, the UE 104 can determine a PSCCH resource unit which starts at N=1 of a time slot. The number of first resource units (symbols) in the PSCCH resource unit can be determined according one of the methods discussed in detail above. For example, based on table 400, when a sidelink SCS is 15 kHz, the PSCCH resource unit comprises 4 symbols in the time domain. In some embodiments, the PSCCH resource unit occupying symbols 1-4 in a time slot is selected by the UE 104 for receiving and transmitting the SCI. Similarly, at the same SCS setting (e.g., 15 kHz), the PSSCH resource unit starts at N=0 of a time slot and occupies 8 symbols in the time domain according to table 400, the UE 104 can receive and/or transmit sidelink data on symbols 0-7 of a time slot.

FIG. 17 illustrates a table 1700 showing a mapping relationship between a SCS in sidelink communications and N values of a sidelink channel resource unit for a sidelink channel, in accordance with some embodiments of the present disclosure. In some embodiments, the N value is a position of a starting symbol of a sidelink channel resource unit in one of the following: a time slot and an available sidelink resource set. In the illustrated embodiment, the table 1700 comprises 4 indices 1702 for 2 respective SCS values 1704, i.e. 15 kHz, and 60 kHz, and 8 N values 1706 for sidelink channel resource units. Although only 2 SCS values 1704 and 8 N values 1706 are shown in FIG. 17, it should be noted any numbers of SCS values with any values for any numbers of sidelink channels can be included which are within the scope of this invention.

In the illustrated embodiment, at an index of 0 and a SCS value of 15 kHz, a sidelink channel resource unit 1706 starts at N=0; and at an index of 0 and a SCS value of 60 kHz, a sidelink channel resource unit 1706 starts at N=1. At an index of 1 and a SCS value of 15 kHz, a sidelink channel resource unit 1706 starts at N=1; and at an index of 1 and a SCS value of 60 kHz, a sidelink channel resource unit 1706 starts at N=2. At an index of 2 and a SCS value of 15 kHz, a sidelink channel resource unit 1706 starts at N=2; and at an index of 2 and a SCS value of 60 kHz, a sidelink channel resource unit 1706 starts at N=2. At an index of 3 and a SCS value of 15 kHz, a sidelink channel resource unit 1706 starts at N=4; and at an index of 3 and a SCS value of 60 kHz, a sidelink channel resource unit 1706 starts at N=6.

In some embodiments, when a transmission of sidelink signals on a sidelink channel is performed by a UE 104, the UE 104 can further determine the position of first resource units in the time domain of a sidelink channel resource unit according to the SCS of sidelink communications using table 1700 and an index value. For example, the UE 104 receives an index of 0 in an RRC message from the BS 102 and based on the SCS value of 15 kHz, the UE 104 can determine a PSCCH resource unit which starts at N=0 of an available sidelink resource set. The number of first resource units (symbols) in the PSCCH resource unit can be determined according one of the methods discussed in detail above. For example, based on table 400, when a sidelink SCS is 15 kHz, the PSCCH resource unit comprises 4 symbols in the time domain. In some embodiments, the PSCCH resource unit occupying symbols 0-3 in the available sidelink resource set is selected by the UE 104 for receiving or transmitting the SCI. Similarly, at the same SCS setting (e.g., 15 kHz), when an index of 3 is received in the RRC message from the BS 102, the PSSCH resource unit starts at N=4 of an available sidelink resource set and occupies 8 symbols in the time domain according to table 400, the UE 104 can receive or transmit sidelink data on symbols 3-10 of the available sidelink resource set.

In some embodiments, the position of second resource units (e.g., RBs) in the frequency domain in a sidelink channel resource unit can be determined based on a position of a starting RB in an available sidelink resource set in the frequency domain. In some embodiments, a number of RBs (i.e., k value) is determined according to one of the methods discussed above. In some embodiments, the position of a starting RB in an available sidelink resource set in the frequency domain is one of the following: a RB with a minimum index in the available sidelink resource set (hereinafter "RB index min #"), a RB with a minimum index+K (hereinafter "RB index min #+K"), and a RB with a maximum index (hereinafter "RB index max #"), wherein K is a non-negative integer. In some embodiments, the K value can be preconfigured by the system or indicated by the BS 102 through a higher layer signaling. In some embodiments, the available sidelink resource set in the frequency domain comprises one of the following: at least one RB in a sidelink resource pool or a sidelink resource set and determined by configurations of the sidelink resource pool or the sidelink resource set; at least one RB in a BWP for sidelink communications and determined by the configuration of the BWP; and at least one RB in a BWP of the system and determined by the configuration of the system.

In some embodiments, the position of the RBs in the sidelink channel resource unit is one of the following: [RB index #min+i×k, RB index #min+i×k+k−1], [RB index #min+K+i×k, RB index #min+K+i×k+k−1], and [RB index #max−K−i×k, RB index #max−K−i×k−k+1], wherein i is a non-negative integer. For example, when there are 100 RBs in the BWP for sidelink communications and k=5, the BWP for sidelink communication comprises 20 sidelink channel resource units and each of the 20 sidelink channel resource units comprises 5 RBs in the frequency domain. A first sidelink channel resource unit occupies RBs 0-4, a second sidelink channel resource unit occupies RBs 5-9, . . . , and a twentieth sidelink channel resource unit occupies RBs 95-99.

In some embodiments, the positions of sidelink channel resource units can be determined according to a position configuration table, wherein the position configuration table comprises a plurality of configurations of positions of sidelink channel resource units for respective sidelink channels. Specifically, the position configuration table comprises information of positions of first resource units in the time domain and/or positions of second resource units in the frequency domain. In some embodiments, the plurality of configurations each corresponds to an index, the UE 104 when receiving an index from the BS 102, can further determine the position of a sidelink channel resource unit in the time and/or frequency domain according to the position configuration table. In some embodiments, the plurality of configurations each can be used for determining positions of a plurality of sidelink channels.

In some embodiments, the index can be indicated by the BS 102 to the UE 104 through a higher layer signaling. In some embodiments, the signaling can be transmitted from the BS 102 to the UE 104 as a higher layer signaling or a physical layer signaling, e.g., a system broadcast message, a radio resource control (RRC) message, a downlink control information (DCI), etc. In some other embodiments, the signaling can be also transmitted from a UE 104 in sidelink communications in a form of a higher layer signaling or a physical layer signaling, e.g., a sidelink broadcast message, an RRC message, a sidelink control information (SCI), etc.

FIG. 18 illustrates a table 1800 indicating a plurality of position configurations of sidelink channel resource units in the time domain for 2 sidelink channels, in accordance with some embodiments of the present disclosure. In some embodiments, the plurality of position configurations each comprises an N value, wherein the N value is a position of a starting symbol of a sidelink channel resource unit in one of the following: a time slot and an available sidelink resource set. In the illustrated embodiment, the table 1800 comprises 8 indices 1802, N values for 2 sidelink channels, i.e., N1 of a PSCCH resource unit 1804 and N2 of a PSSCH resource unit 1806. Although only 8 indices and 8 N values for 2 sidelink channels are shown in FIG. 18, it should be noted any numbers of position configurations with any N values for any numbers of sidelink channels can be included which are within the scope of this invention.

In the illustrated embodiment, at an index of 0, N1 of a PSCCH resource unit 1804 is 0 and N2 of a PSSCH resource unit 1806 is 0; at an index of 1, N1 of a PSCCH resource unit 1804 is 0 and N2 of a PSSCH resource unit 1806 is 4; at an index of 2, N1 of a PSCCH resource unit 1804 is 2 and N2 of a PSSCH resource unit 1806 is 2; at an index of 3, N1 of a PSCCH resource unit 1804 is 2 and N2 of a PSSCH resource unit 1806 is 6; at an index of 4, only N2 is defined, and N2 of a PSSCH resource unit 1806 is 7; at an index of 5, only N1 is defined, and N1 of a PSCCH resource unit 1804 is 10; and at in index of 6 and 7, N1 and N2 values are reserved.

In some embodiments, when a transmission of sidelink signals on a sidelink channel is performed by a UE 104, the UE 104 can further determine the position of first resource units in the time domain of a sidelink channel resource unit according to a position configuration table 1800. For example, the UE 104 can determine a PSCCH resource unit which starts at N=0 of a time slot. The number of first resource units (symbols) in the PSCCH resource unit can be determined according one of the methods discussed in detail above. For example, based on table 1000, when an index of 1 is received by the UE 104, the PSCCH resource unit comprises 4 symbols in the time domain. In some embodiments, the PSCCH resource unit occupying symbols 0-3 in a time slot is selected by the UE 104 for receiving and transmitting the SCI. Similarly, the same index value can be used to determine the number of first resource units (symbols) in the time domain in a PSSCH, the PSSCH resource unit starts at N=4 of a time slot and occupies 2 symbols in the time slot according to table 1000, the UE 104 can receive or transmit sidelink data on symbols 4-5 of the time slot. In some other embodiments, when N values in table 1800 is a position of a starting symbol of a sidelink channel resource unit in an available sidelink resource set, the positions of sidelink channel resource units can be determined according to the position configuration of the available sidelink resource sets in a time slot.

Figure 19:
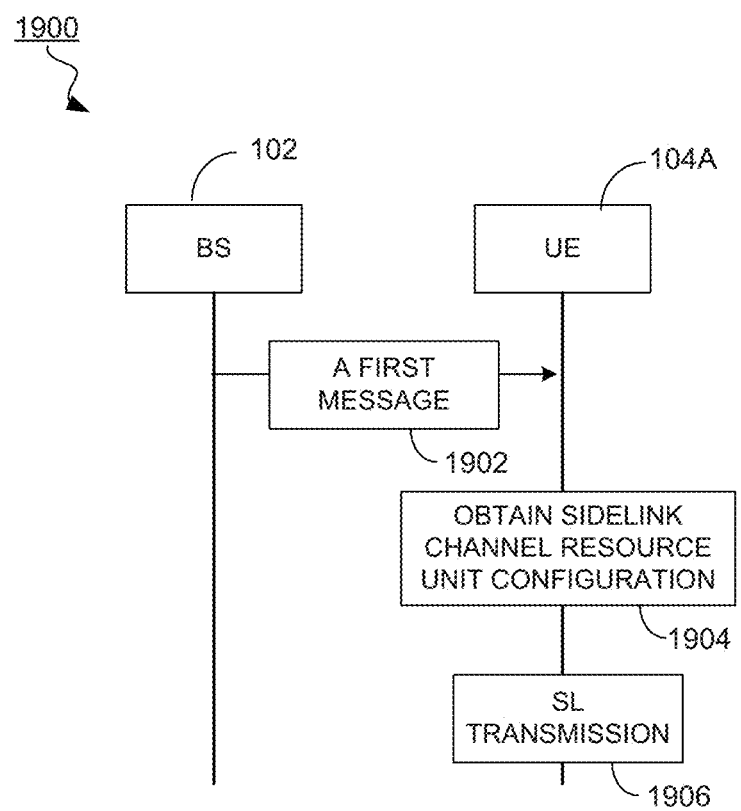
FIG. 19 illustrates a method for configuring a sidelink channel resource unit for sidelink communications, in accordance with some embodiments of the present disclosure.

FIG. 19 illustrates a method 1900 for configuring a sidelink channel resource unit for sidelink communications, in accordance with some embodiments of the present disclosure. It is understood that additional operations may be provided before, during, and after the method 1900 of FIG. 19, and that some operations may be omitted or reordered. The communication system in the illustrated embodiment comprises a BS 102, UE 104.

The method 1900 starts with operation 1902 in which a first message is transmitted from the BS 102 to the UEs 104 according to some embodiments. In some embodiments, the first message comprises a configuration of a sidelink channel resource unit. In some embodiments, the configuration of a sidelink channel resource unit comprises a number of first resource units in the time domain and second resource units in the frequency domain. The configuration further comprises positions of the first resource units in the time domain and/or the second resource units in the frequency domain. In some embodiments, the configuration of the numbers of first resource units in the time domain and the second resource units in the frequency domain can be one of the following: pre-configured by the system, configured by the BS 102, determined by a respective sidelink subcarrier spacing (SCS), an available sidelink resource set, a number of available sidelink resource elements, and determined by a configuration table, as discussed in detail above. In some embodiments, the configuration of the positions of first resource units in the time domain and the second resource units in the frequency domain can be one of the following: a starting position of the first and the second resource units, determined by the respective sidelink subcarrier spacing (SCS), and determined by a position configuration table, as discussed in detail above. In some embodiments, the configurations of the numbers and the positions of the sidelink channel resource units are transmitted by the BS 102 to the UE 104 through a RRC signal, wherein the RRC signal can be one of the following: a system broadcast message and a UE-specific RRC signal.

The method 1900 continues with operation 1904 in which the UE 104 determines the numbers and positions of the sidelink channel resource units for respective channels according to the received configuration for sidelink communications received in the RRC signal.

The method 1900 continues with operation 1906 in which the UE 104 performs sidelink communications on the determined sidelink channel resource units. In some embodiments, configurations of sidelink channel resource units for different sidelink channels can be determined. In some embodiments, a sidelink channel can be at least one of the following: a Physical Sidelink Control Channel (PSCCH), a Physical Sidelink Shared Channel (PSSCH), a Physical Sidelink Broadcast Channel (PSBCH), and a Physical Sidelink Discovery Channel (PSDCH). Specifically, a PSCCH resource is used to carry sidelink control information (SCI), wherein the SCI comprises at least one of the following: sidelink scheduling control information, sidelink feedback control information (e.g., ACK/NACK), and channel measurement feedback information (e.g., Channel State Information (CSI)); a PSSCH resource is used to carry sidelink data; a PSBCH resource is used to carry sidelink broadcast information; and a PSDCH resource is used to carry a sidelink discovery signal.

In some embodiments, a configuration of a first sidelink channel resource unit for a respective first sidelink channel can be determined according to a configuration of a second sidelink channel resource unit for a respective second sidelink channel. In some embodiments, there are a plurality of sidelink channels for sidelink communications and different sidelink channels may be correlated to other sidelink channels. In some embodiments, any two of the plurality of sidelink channels can be grouped together as a correlated sidelink channel couple, wherein the correlated sidelink channel couple comprises a first sidelink channel and a second sidelink channel. In some embodiments, a correlated sidelink channel couple comprises one of the following sidelink channel groups: PSCCH/PSSCH, PSSCH/PSCCH, PSBCH/PSCCH, and PSDCH/PSCCH.

In some embodiments, a configuration of a first sidelink channel resource unit of the first sidelink channel of the correlated sidelink channel couple can be determined based on a configuration of a second sidelink channel resource unit of the second sidelink channel of the correlated sidelink channel couple. In one embodiment, the configuration (n2 and/or k2) of the second sidelink channel resource unit of the second sidelink channel of the correlated sidelink channel couple is determined according to the configuration (n1 and/or k1) of the first sidelink channel resource unit of the first sidelink channel of the correlated sidelink channel couple, i.e., n1=n2 and k1=k2. In another embodiment, the number (n) of first resource units in the time domain in the first sidelink channel resource unit of the first sidelink channel of the correlated sidelink channel couple equals to the number (n2) of first resource units in the time domain in the second sidelink channel resource unit of the second sidelink channel of the correlated sidelink channel couple. The number (k1) of second resource units in the frequency domain in the first sidelink channel resource unit of the first sidelink channel of the correlated sidelink channel couple can be determined according to other embodiments in the present disclosure. Yet, in another embodiment, the number (k) of the second resource units in the frequency domain in the first sidelink channel resource unit of the first sidelink channel of the correlated sidelink channel couple equals to the number (k2) of the second resource units in the frequency domain in the second sidelink channel resource unit of the second sidelink channel of the correlated sidelink channel couple. The number (n1) of the first resource units in the time domain in the first sidelink channel resource unit of the first sidelink channel of the correlated sidelink channel couple can be determined according to other embodiments in the present disclosure.

In some embodiments, the configuration (n and/or k values) of the second sidelink channel resource unit of the second sidelink channel of the correlated sidelink channel couple can be determined based on the configuration (n and/or k values) of the first sidelink channel resource unit of the first sidelink channel of the correlated sidelink channel couple and a predefined relationship. In some embodiments, a predefined relationship can be obtained according to a predefined relationship table. In some embodiments, a predefined relationship table can be indicated by a predefined rule. For example, when the number of available symbols in a time slot for sidelink communication is N, n2=N−n1.

Figure 20:
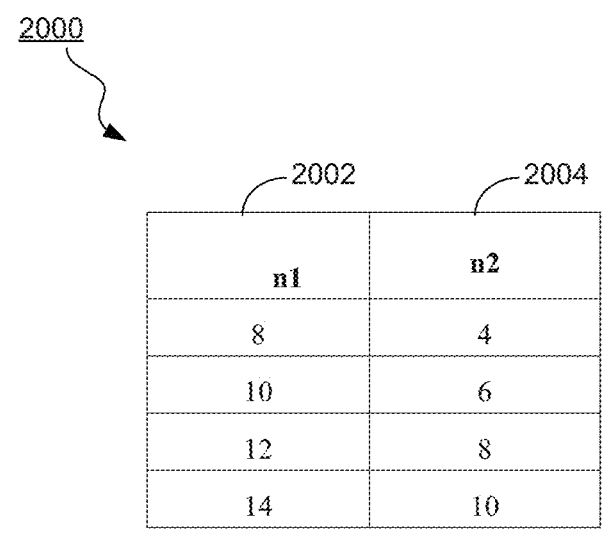

FIG. 20 illustrates a table 2000 showing a mapping relationship between n1 and n2 in two corresponding sidelink channel resource units for two respective sidelink channels in a correlated sidelink channel couple, in accordance with some embodiments of the present disclosure. Although n1 in the first column 2002 and n2 in the second column 2004 each comprises 4 values in table 2000, it should be noted that n1 and n2 may comprise any number of values and are within the scope of this invention, wherein n1 and n2 are non-negative integers. In some embodiments, (n1, n2)<14 for a time slot with normal CP, and (n1,n2)<12 for a time slot with extended CP. In the illustrated embodiment of FIG. 8, the 4 n1 values each corresponds to a respective n2 value. For example, when n1=8, n2=4; when n1=10, n2=6; when n1=12, n2=8; and when n1=14, n2=10.

Figure 21:
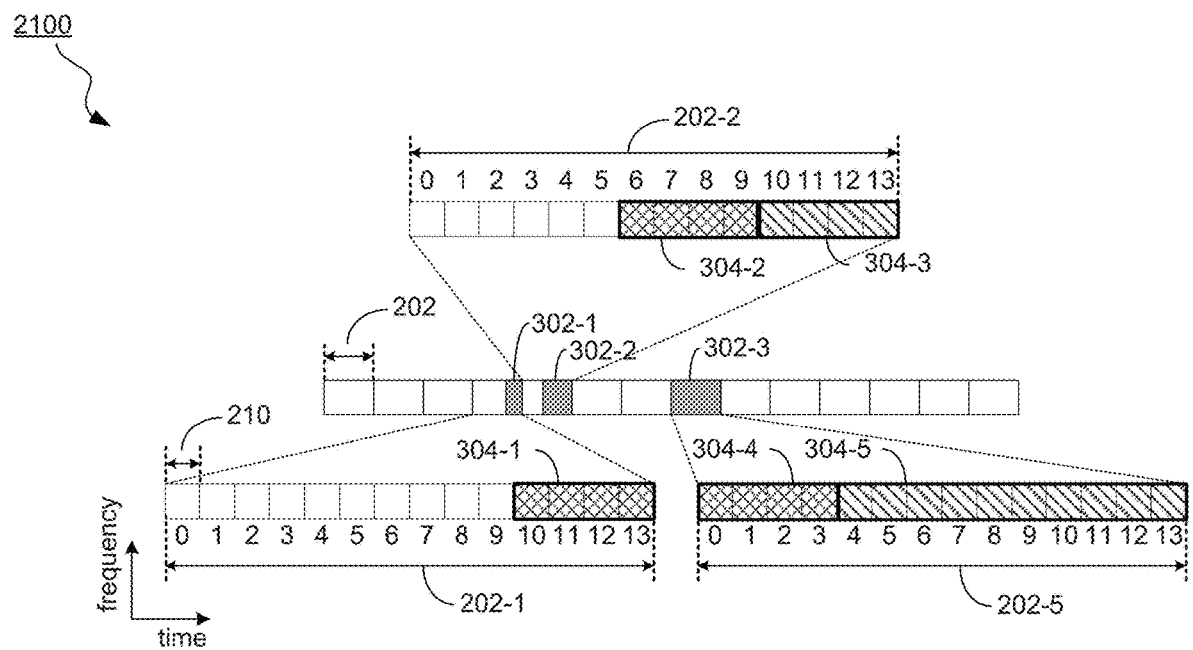
FIG. 21 illustrates a schematics of a radio frame structure with a plurality of sidelink resource pools, in accordance with some embodiments of the present disclosure.

FIG. 21 illustrates a schematics of a radio frame structure 2100 with a sidelink resource pool 302, in accordance with some embodiments of the present disclosure. It should be noted FIG. 21 is for illustration purposes and is not intended to be limiting. The number and positions of the resource pool 302 is indicated by the BS 102 through a higher layer signaling. A number (N) of available symbols in a time slot for sidelink communications is also indicated by the higher layer signaling. The higher layer signal from the BS 102 also indicates a correlated sidelink channel couple, i.e., comprising a PSCCH and PSSCH. Further, the higher layer signaling from the BS 102 indicates a relationship between the configuration (n2) of the PSCCH resource unit and the configuration (n1) of the PSSCH resource unit. In the illustrated embodiment, n1=N−n2. It should be noted a radio frame structure 2100 may comprise different numbers of first resource units (e.g., symbols) in the time domain at any positions, and a time slot may comprise 12 or 14 symbols, which are within the scope of this invention.

In the illustrated embodiments, the sidelink resource pool 302 comprises 3 slots, i.e., 202-1, 202-2 and 202-5. In some embodiments, each of the time slot 202 comprises 14 symbols with normal CP. The 3 slots 202 each may comprise different numbers of symbols for sidelink communications, as shown 302-1, 302-2, and 302-3. In the illustrated embodiment, the first slot 202-1 comprises 4 symbols for sidelink communications; the second slot 202-2 comprises 8 symbols for sidelink communications; and the fifth slot 202-5 comprises 14 symbols for sidelink communications. Further, a PSCCH resource unit comprises 4 (n1) symbols in the time domain and 5 RBs in the frequency domain. In some embodiments, the UE 104 can determine n2 based on N and n1.

In the illustrated embodiments, since the first slot 302-1 comprises 4 symbols and a first PSCCH resource unit 304-1 occupies 4 symbols in the time domain in the first time slot 202-1, the first slot 202-1 does not comprise any symbol (n2=0) for a PSSCH. Similarly, the second slot 302-2 comprises a second PSCCH resource unit 304-2 comprising 4 symbols in the time domain in the second time slot 202-2 and a first PSSCH resource unit 304-3 comprising 4 (n2=4) symbols in the time domain; and the third slot 302-3 comprises a third PSCCH resource unit 304-4 comprising 4 symbols in the time domain in the fifth time slot 202-5 and a second PSSCH resource unit 304-5 comprising 10 (n2=10) symbols in the time domain.

Further, the 4 symbols of the first PSCCH resource unit 304-1 occupies the symbols 10-13 in the first time slot 202-1; the 4 symbols of the second PSCCH resource units 304-2 and the 4 symbols of the first PSSCH resource unit 304-3 occupies the symbols 6-13 in the second time slot 202-2; and the 4 symbols of the third PSCCH resource unit 304-4 and the second PSSCH resource unit 304-5 occupies symbols 0-13 in the fifth time slot 202-5. In some embodiments, the position of the symbols in a resource unit in a time slot can be determined by one of the methods discussed in detail below.

This method, in which a configuration of the first resource unit for the first sidelink channel is determined according to the second resource unit for the second sidelink channel in a correlated sidelink channel couple allows multiplexing on available resources in the time domain. This method is particularly beneficial when respective signals are required to be transmitted at different time to meet requirement in transmission delay and complexity when the UE receives and processes a sidelink signal.

In some embodiments, the configuration of the second sidelink channel resource unit of the second sidelink channel of the correlated sidelink channel couple can be determined based on an indication on the first sidelink channel of the correlated sidelink channel couple. For example, the first sidelink channel carries indication information, which can be used to indicate a number (n2) of first resource units in the time domain and/or a number (k2) of second resource units in the frequency domain in the second sidelink channel resource unit In some other embodiments, the configuration of the second sidelink channel resource unit of the second sidelink channel of the correlated sidelink channel couple can be determined based on positions of resources in the time and/or frequency domain for the first sidelink channel according to a predefined rule. For example, when a correlated sidelink channel couple is predefined by the system, a first sidelink channel is PSSCH and a second sidelink channel is PSCCH. In some embodiments, when the first resource unit (e.g., symbol) in the time domain in the PSSCH resource units is included in the first t1 symbols in a time slot, the PSCCH resource unit comprises n1 first resource units (e.g., symbols) in the time domain. In some other embodiments, when the first resource unit (e.g., symbol) in the time domain of the PSSCH is included in the last t2 symbols in a time slot, the PSCCH resource unit comprises n2 first resource units (e.g., symbols) in the time domain.

Figure 22:
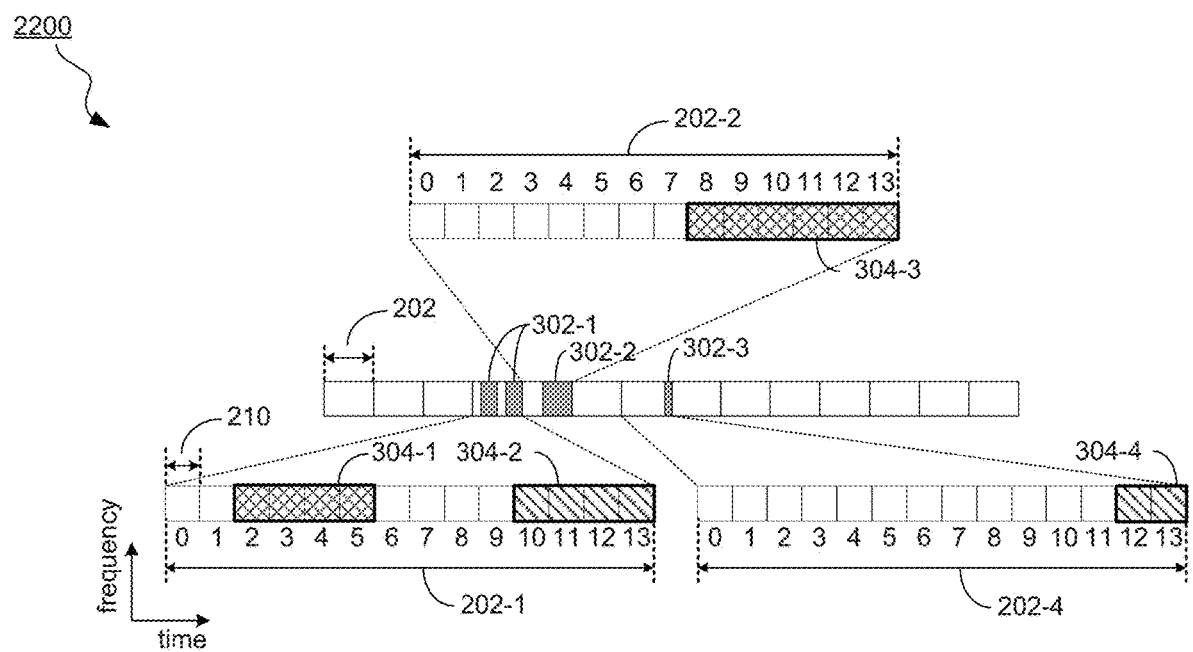
FIG. 22 illustrates a schematics of a radio frame structure with a plurality of sidelink resource pools, in accordance with some embodiments of the present disclosure.

FIG. 22 illustrates a schematics of a radio frame structure 2200 with a sidelink resource pool 302, in accordance with some embodiments of the present disclosure. It should be noted FIG. 22 is for illustration purposes and is not intended to be limiting. The number and positions of the sidelink resource pool 302 is indicated by the BS 102 through a higher layer signaling. It should be noted a radio frame structure 2200 may comprise different numbers of first resource units (e.g., symbols) in the time domain at any positions, and a time slot may comprise 12 or 14 symbols, which are within the scope of this invention.

In the illustrated embodiments, the sidelink resource pool 302 comprises 3 slots 202, i.e., 202-1, 202-2, and 202-4. The 3 slots 202 each may comprise different numbers of symbols for sidelink communications, as shown 302-1, 302-2, and 302-3. In the illustrated embodiment, the first slot 202-1 comprises 8 symbols for sidelink communications; the second slot 202-2 comprises 6 symbols for sidelink communications; and the fourth slot 202-4 comprises 2 symbols for sidelink communications.

In the illustrated embodiment, based on a predefined rule by the system, in which when t1=8, n1=4; and when t2=6, n2=2, since a PSCCH resource unit 304-1 occupies symbols 2-5 in the first time slot 202-1, a PSSCH resource unit 304-2 comprises 4 symbols in the time domain in the first time slot 202-1. Since a PSCCH resource unit 304-3 occupies symbols 8-13 in the second time slot 202-2, a PSSCH resource unit 304-4 comprises 2 symbols in the time domain in the fourth time slot 202-4. In some embodiments, the first and the second PSCCH resource units 304-1/304-3 are used to transmit feedback information A/N of the respective signals on the corresponding first and second PSSCH 304-2/304-4.

In the illustrated embodiment, the first PSSCH resource unit 304-1 occupies symbols 2-5 in the first time slot s0; the first PSCCH resource unit 304-2 occupies symbols 10-13 in the first time slot s0; the second PSSCH resource unit 304-3 occupies symbols 8-13 in the second time slot s1; and the second PSCCH resource unit 304-4 occupies symbols 12-13 in the fourth time slot s3. In some embodiments, the position of the symbols in a resource unit in a time slot is preconfigured by the system or configured by the BS 102.

In some embodiments, a position (e.g., a position of a starting symbol in a time slot) of a first resource unit in the time domain in the second sidelink channel resource unit of the second sidelink channel of the correlated sidelink channel couple can be determined according to a position of a first resource unit in the time domain in the first sidelink channel resource unit of the first sidelink channel of the correlated sidelink channel couple. In some embodiments, when the first sidelink channel resource unit starts at symbol N1 in a time slot and occupies n1 first resource units (e.g., symbols) in the time domain, the second sidelink channel resource unit starts at symbol N1+n1 and occupies n2 symbols in the respective time slot. In some embodiments, when the first sidelink channel resource unit starts at symbol N1 in a time slot and occupies n1 first resource units (e.g., symbols) in the time domain, the second sidelink channel resource unit starts at symbol N1 and occupies n2 symbols in the same time slot occupying different RBs. In some embodiments, the position of the second sidelink channel resource unit of the second sidelink channel of the correlated sidelink channel couple can be determined based on indication information on the first sidelink channel of the correlated sidelink channel couple. In some embodiments, the indication information can be implicit or explicit. In some embodiments, the indication information comprises a position of a starting symbol of the second sidelink channel resource unit in one time slot and a position of the time slot. For example, the first sidelink channel of a correlated sidelink channel couple comprises sidelink control information (SCI), wherein the SCI comprises information of the positions of the sidelink channel resource unit of the second sidelink channel of the correlated sidelink channel couple. In some embodiments, the information comprises at least one of the following: a position of the starting symbol of the sidelink channel resource unit of the second channel in a time slot (#N) and the position of the time slot.

Figure 23:
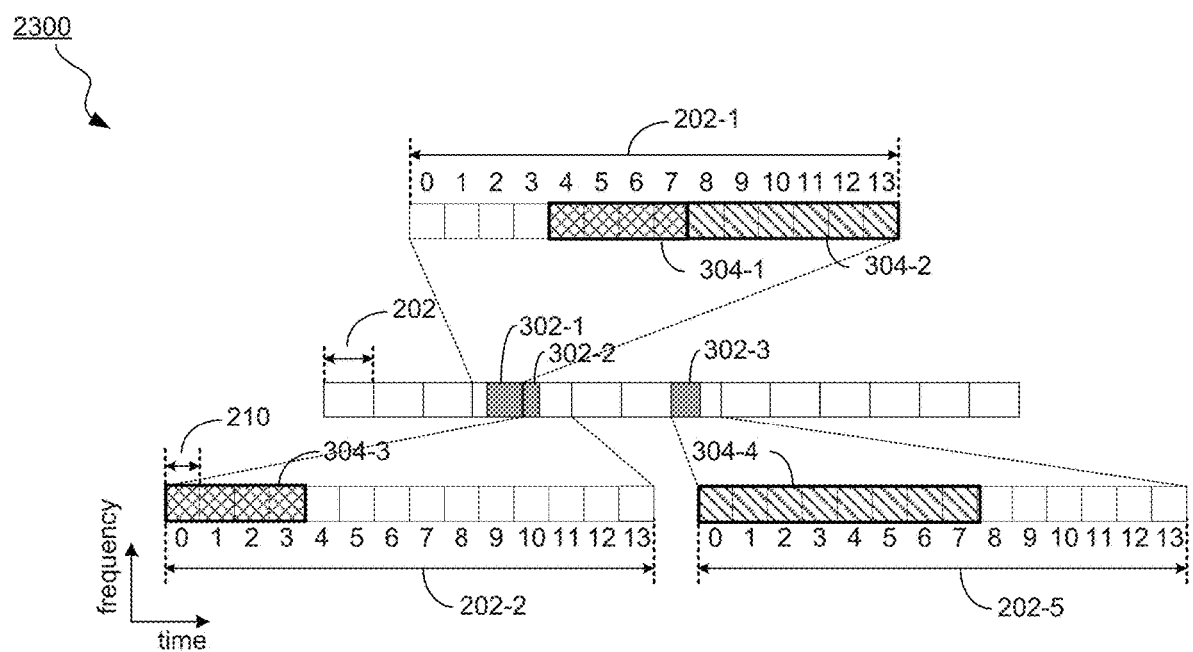
FIG. 23 illustrates a schematics of a radio frame structure with a plurality of sidelink resource pools, in accordance with some embodiments of the present disclosure.

FIG. 23 illustrates a schematics of a radio frame structure 2300 with a sidelink resource pool 302, in accordance with some embodiments of the present disclosure. It should be noted FIG. 23 is for illustration purposes and is not intended to be limiting. The number and positions of the sidelink resource pool 302 is indicated by the BS 102 through a higher layer signaling.

In the illustrated embodiments, the sidelink resource pool 302 comprises 3 slots, i.e., 202-1, 202-2 and 202-5. In some embodiments, each of the time slot 202 comprises 14 symbols with normal CP. The 3 slots 202 each may comprise different numbers of symbols for sidelink communications, as shown 302-1, 302-2, and 302-3. In the illustrated embodiment, the first slot 202-1 comprises 10 symbols for sidelink communications; the second slot 202-2 comprises 4 symbols for sidelink communications; and the fifth slot 202-5 comprises 8 symbols for sidelink communications.

In the illustrated embodiment, when N1 of a first sidelink channel (e.g., PSCCH) resource unit 304-1 is 4, occupies 4 symbols in the first time slot 202-1, and a second sidelink channel (e.g., PSSCH) resource unit 304-2 a first correlated sidelink channel couple occupies 6 symbols in the first time slot 202-1, the first PSCCH resource unit 304-1 a first correlated sidelink channel couple occupies symbols 4-7 in slot 202-1 and the first PSSCH resource unit 304-2 a first correlated sidelink channel couple occupies symbols 8-13 of the first time slot 202-1. In the illustrated embodiment, when N1 of a second PSCCH resource unit 304-3 in a second correlated sidelink channel couple is 0 and occupies 4 symbols in the second time slot 202-2, N2 of a second PSSCH resource unit 304-4 in a second correlated sidelink channel couple equals N1, and the second PSSCH resource unit 304-4 occupies symbols 0-7 in the fifth time slot 202-5. In some other embodiments, the second PSSCH resource unit 304-4 in a second correlated sidelink channel couple can be in the same time slot (e.g., second time slot 202-2) and occupies different RBs in the frequency domain from the RBs occupied by the second PSCCH resource unit 304-3.

Figure 24:
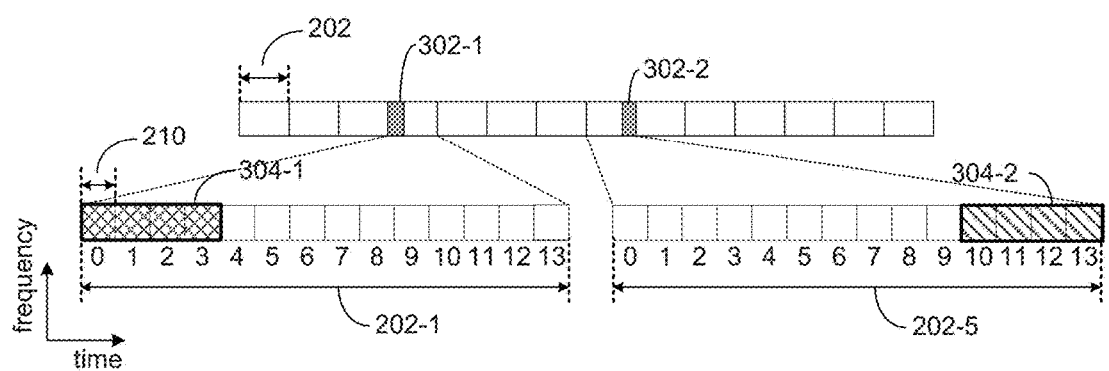
FIG. 24 illustrates a schematics of a radio frame structure with a plurality of sidelink resource pools, in accordance with some embodiments of the present disclosure.

FIG. 24 illustrates a schematics of a radio frame structure 2400 with a sidelink resource pool 302, in accordance with some embodiments of the present disclosure. It should be noted FIG. 24 is for illustration purposes and is not intended to be limiting. The number and positions of the resource pool 302 is indicated by the BS 102 through a higher layer signaling.

In some embodiments, the sidelink channel resource unit of the first sidelink channel in a correlated sidelink channel couple and the sidelink channel resource unit of the second sidelink channel can be on different time slots. The time slots that contain the sidelink channel resource units for the correlated sidelink channel couple can be configure by the system. For example, the sidelink channel resource unit of the first sidelink channel in the correlated sidelink channel couple is in the time slot #s and the sidelink channel resource unit of the second sidelink channel in the correlated sidelink channel couple is in the time slot #s+Ns, and the starting symbol is symbol N, wherein N is a position of the starting symbol of the sidelink channel resource unit in a time slot of the second sidelink channel in the correlated sidelink channel couple. In the illustrated embodiments, the sidelink channel resource unit of the first sidelink channel (e.g., PSSCH) in the correlated sidelink channel couple occupies symbols 0-3 in the first time slot 202-1, the sidelink channel resource unit of the second sidelink channel (e.g., PSCCH) in the correlated sidelink channel couple occupies symbols 10-13 in the fifth time slot 202-5, i.e. Ns=4, N=10. In some embodiments, the PSCCH resource unit 304-2 in the fifth time slot 202-5 is used to transmit reception status confirm after receiving sidelink data on the respective PSSCH resource unit 304-1 received in the first time slot 202-1.

In some embodiments, positions of second resource units in the frequency domain in the second sidelink channel resource unit of the second sidelink channel of the correlated sidelink channel couple can be determined according to positions of second resource units in the frequency domain in the first sidelink channel resource unit of the first sidelink channel of the correlated sidelink channel couple. In some embodiments, the first and the second sidelink channel resource units occupies the same RBs. In some embodiments, the position of the starting RB (e.g., a RB with a minimum RB index) in the frequency domain of the first sidelink channel resource unit of the first sidelink channel is the same as the position of the starting RB in the frequency domain of the second sidelink channel resource unit of the second sidelink channel. In some embodiments, the starting position of the second sidelink channel resource unit in the frequency domain is a summation of the maximum RB index in the first sidelink channel resource unit and 1, i.e., RB index #k1+1, wherein RB index k1 is the maximum RB index in the first sidelink channel resource unit of the first sidelink channel. In some embodiments, when the numbers of RBs is determined using one of the methods discussed above, positions of the second sidelink channel resource unit can be determined.

Figure 25:
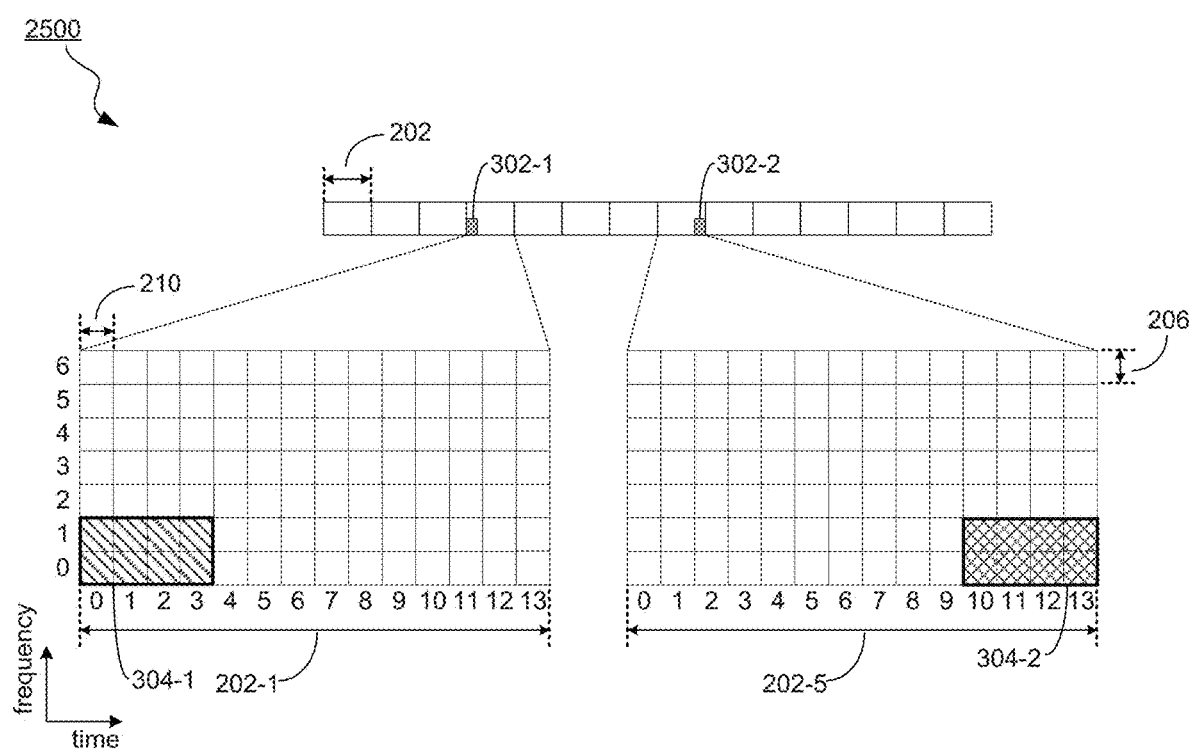
FIG. 25 illustrates a schematics of a radio frame structure with a plurality of sidelink resource pools, in accordance with some embodiments of the present disclosure.

FIG. 25 illustrates a schematics of a radio frame structure 2500 with a sidelink resource pool 302, in accordance with some embodiments of the present disclosure. It should be noted FIG. 25 is for illustration purposes and is not intended to be limiting. The number and positions of the resource pool 302 is indicated by the BS 102 through a higher layer signaling.

In the illustrated embodiments, the sidelink resource pool 302 comprises 2 slots 202, i.e., 202-1 and 202-5. In the illustrated embodiment, the first slot 202-1 comprises 4 symbols for sidelink communications; and the fifth slot 202-5 comprises 4 symbols for sidelink communications.

In some embodiments, a first sidelink channel in a correlated sidelink channel couple is PSCCH and a second sidelink channel in the correlated sidelink channel couple is PSSCH. The relationship of the two sidelink channel resource units in the frequency domain of the two sidelink channel is preconfigured by the system. In some embodiments, the PSCCH resource unit 304-1 is in the first time slot 202-1 (i.e., #s=0) and the PSSCH resource unit 304-2 is in #s+Ns time slot, i.e., the fifth time slot 202-5, when Ns=5 is preconfigured by the system. Further, the PSCCH resource unit 304-1 occupies the same RBs as the PSSCH resource unit 304-2. In the illustrated embodiments, the PSSCH resource unit 304-1 occupies symbols 0-3 in the first time slot 202-1 and RBs 0-1 in the BWP; and the PSCCH resource unit 304-2 occupies symbols 10-13 in the fifth time slot 202-5 and RBs 0-1 in the BWP.

Figure 26:
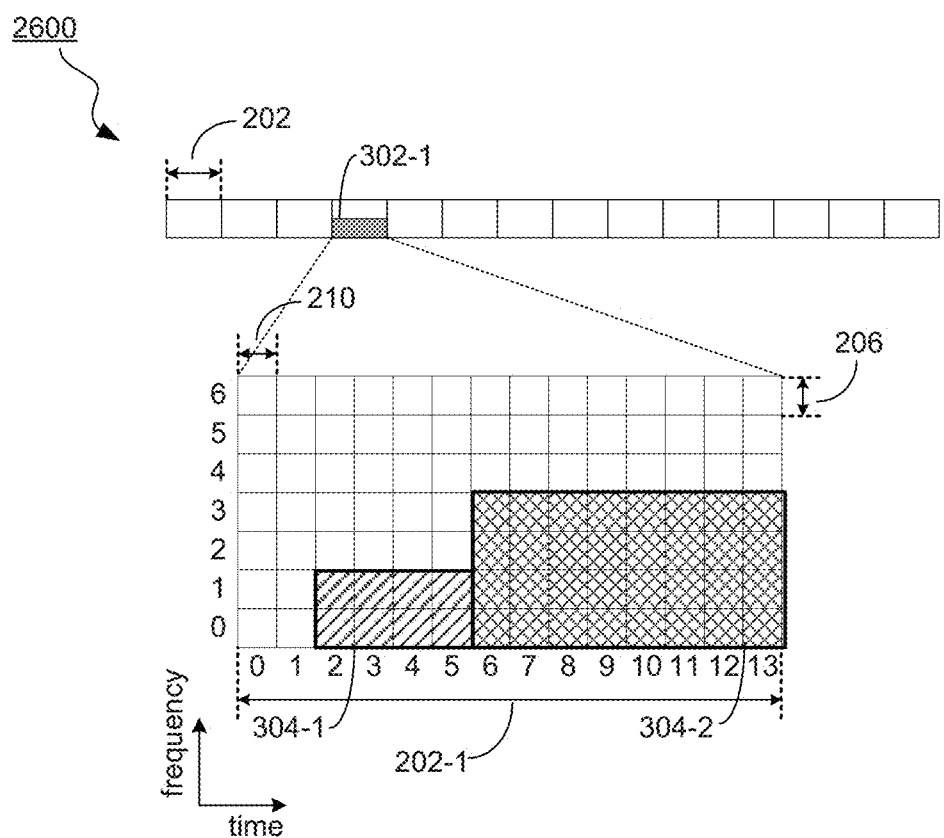
FIG. 26 illustrates a schematics of a radio frame structure with a plurality of sidelink resource pools, in accordance with some embodiments of the present disclosure.

FIG. 26 illustrates a schematics of a radio frame structure 2600 with a sidelink resource pools 302, in accordance with some embodiments of the present disclosure. It should be noted FIG. 26 is for illustration purposes and is not intended to be limiting. The number and positions of the resource pool 302 is indicated by the BS 102 through a higher layer signaling.

In the illustrated embodiments, the sidelink resource pool 302 comprises 1 slot 202. In some embodiments, the time slot 202 comprises 14 symbols with normal CP. The sidelink resource pool 302 comprises 2 sidelink channel resource units 304-1 and 304-2 for two different sidelink channels In some embodiments, a first sidelink channel in a correlated sidelink channel couple is PSCCH and a second sidelink channel in the correlated sidelink channel couple is PSSCH. The relationship of the two sidelink channel resource units in the frequency domain of the two sidelink channel is preconfigured by the system. In some embodiments, the PSCCH resource unit 304-1 is in the first time slot 202-1 occupying symbols 2-5 and the PSSCH resource unit 304-2 is in the same times lot occupying symbols 6-13. Further, the PSCCH resource unit 304-1 starts with the same RBs as the PSSCH resource unit 304-2, i.e., K=0. In the illustrated embodiments, the PSSCH resource unit 304-1 occupies symbols 2-5 in the first time slot 202-1 and RBs 0-1 in the BWP; and the PSCCH resource unit 304-2 occupies symbols 6-13 in the first time slot 202-1 and RBs 0-3 in the BWP.

FIG. 27 illustrates a table 2700 indicating a plurality of configurations of sidelink channel resource units in the time and frequency domain for a PSSCH, in accordance with some embodiments of the present disclosure. In some embodiments, the plurality of configurations each comprises an N value, a K value, a number second resource units (k) in the frequency domain in a sidelink channel resource unit. In some embodiments, the N value is a position of a starting symbol of a sidelink channel resource unit in one of the following: a time slot and an available sidelink resource set; the K value is a position of a starting RB of a sidelink channel resource unit. In the illustrated embodiment, the table 2700 comprises 16 indices 2702, 16 N values 2704, 16 K values 2706, and 16 k values 2708. It should be noted any numbers of position configurations with any N, K, and k values for any numbers of sidelink channels can be included which are within the scope of this invention.

In the illustrated embodiment, at an index of 0, N is N1, K is K1+k1, and k is 8; at an index of 1, N is N1+n1, K is K1, and k is 8; at an index of 2, N is N1, K is K1+k1, and k is 10; at an index of 3, N is N1+n1, K is K1, and k is 10; at an index of 4, N is 0, K is K1+k1, and k is 8; at an index of 5, N is 4, K is K1+k1, and k is 12; at an index of 6, N is 7, K is K1, and k is 8; and at an index of 7-15, N, K and k values are reserved, wherein N1 is the starting position of a first sidelink channel in time domain, K1 is the starting position of the first sidelink channel in frequency domain, n1 is the first number of the first units of the first sidelink channel in time domain, and k1 is the second number of the second unit of the first sidelink channel in frequency domain.

Figure 28:
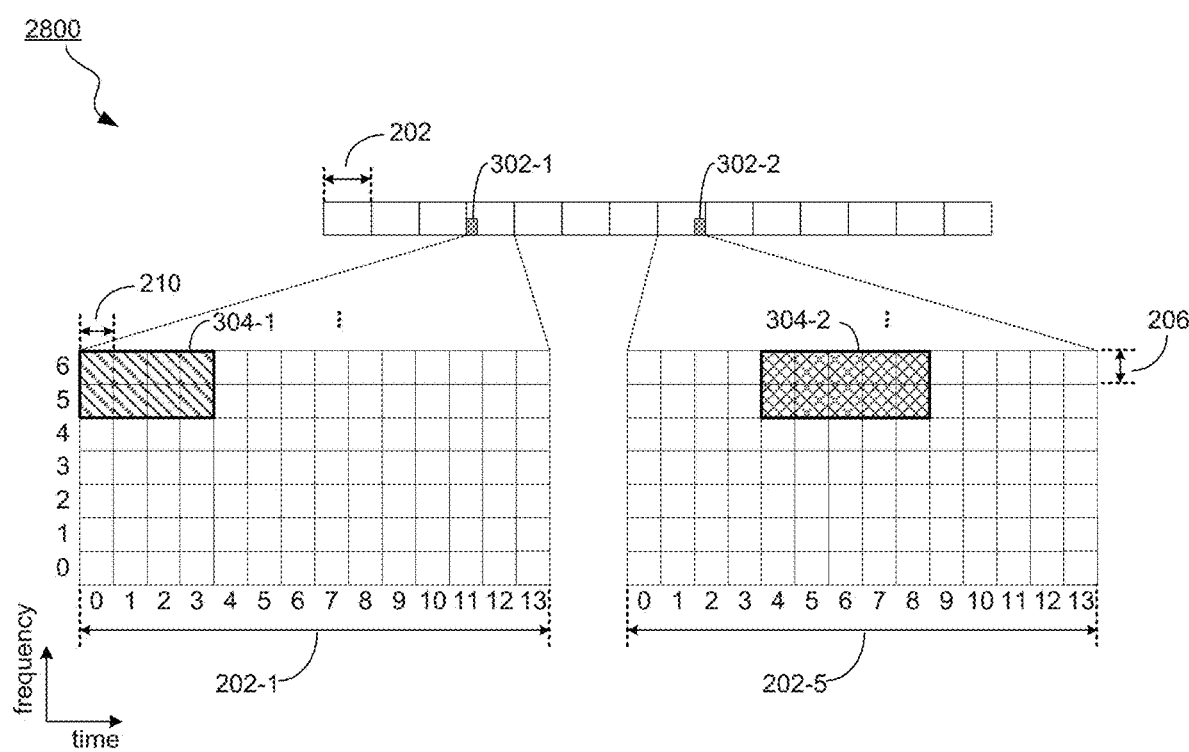
FIG. 28 illustrates a schematics of a radio frame structure with a plurality of sidelink resource pools, in accordance with some embodiments of the present disclosure.

FIG. 28 illustrates a schematics of a radio frame structure 2800 with a sidelink resource pool 302, in accordance with some embodiments of the present disclosure. It should be noted FIG. 28 is for illustration purposes and is not intended to be limiting. The number and positions of the resource pool 302 is indicated by the BS 102 through a higher layer signaling.

In the illustrated embodiments, the sidelink resource pool 302 comprises 2 slots 202, i.e., 202-1 and 202-5 The 2 slots 202 each comprises 1 sidelink channel resource units 304 for two different sidelink channels in a correlated sidelink channel couple.

In some embodiments, the PSCCH resource units in a first time slot 202-1 for carrying the SCI occupies symbols 0-4 in the time domain, i.e., N1=0 and n1=4 and RBs 5-6 in the frequency domain, i.e., K1=5. When the SCI further indicates an index of 1, the PSSCH resource unit 304-2 starts at symbol 4 (#N2=N1+n1) in the time slot and RB 5 (#K2=5) in the frequency domain. The PSSCH resource unit further occupies 8 RBs (k2=8) in the frequency domain and a number (n2=5) of symbols in the time domain, wherein the number of symbols in the time domain can be preconfigured by the system. In some embodiments, when the first UE 104-A indicates an index in the SCI on a PSCCH resource unit to the second UE 104-B, the second UE 104-B can determine a position of a PSSCH resource unit in the time and frequency domain according to the received index, a position configuration table, and position information of the PSCCH resource unit.

Figure 29:
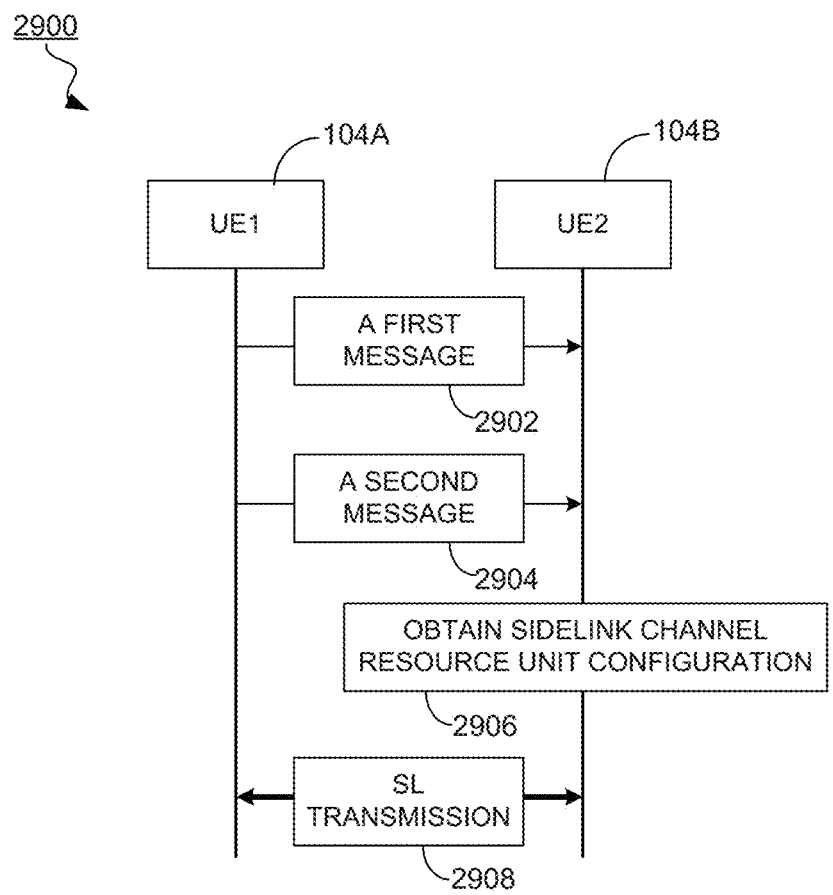
FIG. 29 illustrates a method for configuring a sidelink channel resource unit for sidelink communications, in accordance with some embodiments of the present disclosure.

FIG. 29 illustrates a method 2900 for configuring a sidelink channel resource unit for sidelink communications, in accordance with some embodiments of the present disclosure. It is understood that additional operations may be provided before, during, and after the method 2900 of FIG. 29, and that some operations may be omitted or reordered. The communication system in the illustrated embodiment comprises a first UE 104-A and a second UE 104-B. In the illustrated embodiments, a first UE 104-A and a second UE 104-B are in one of at least one serving cell covered by the BS 102 (not shown).

The method 2900 starts with operation 2902 in which a first message is transmitted from the first UE 104-A to the second UE 104-B according to some embodiments. In some embodiments, the first message is a sidelink broadcast message. In some embodiments, the first message indicates a first sidelink channel and a second sidelink channel in a correlated sidelink channel couple. The first message further comprises a relationship between the number of resource units in the time and frequency domain of the first and the second sidelink channels in the correlated sidelink channel couple. In some embodiments, the configuration (n and/or k values) of the second sidelink channel resource unit of the second sidelink channel of the correlated sidelink channel couple can be determined based on the configuration (n and/or k values) of the first sidelink channel resource unit of the first sidelink channel of the correlated sidelink channel couple and a predefined relationship. In some embodiments, the configuration of the second sidelink channel resource unit of the second sidelink channel of the correlated sidelink channel couple can be determined based on an indication on the first sidelink channel of the correlated sidelink channel couple.

In some embodiments, the first message further comprises the position relationship between the first and the second sidelink channels in the correlated sidelink channel couple, wherein the position relationship comprises one of the following: the first and the second sidelink channel resource units occupies the same RBs; the position of the starting RB (e.g., a RB with a minimum RB index) in the frequency domain of the first sidelink channel resource unit of the first sidelink channel is the same as the position of the starting RB in the frequency domain of the second sidelink channel resource unit of the second sidelink channel; the starting position of the second sidelink channel resource unit in the frequency domain is a summation of the maximum RB index in the first sidelink channel resource unit and 1, i.e., RB index #k1+1, wherein RB index k1 is the maximum RB index in the first sidelink channel resource unit. In some embodiments, the position relationship further comprises one of the following: when the first sidelink channel resource unit starts at symbol N1 in a time slot and occupies n first resource units (e.g., symbols) in the time domain, the second sidelink channel resource unit starts at symbol N1+n1 and occupies n2 symbols in the respective time slot; when the first sidelink channel resource unit starts at symbol N1 in a time slot and occupies n first resource units (e.g., symbols) in the time domain, the second sidelink channel resource unit starts at symbol N1 and occupies n2 symbols in the same time slot.

The method 2900 continues with operation 2904 in which a second message is transmitted from the first UE 104-A to the second UE 104-B according to some embodiments. In some embodiments, the second message is transmitted on the first sidelink channel resource unit. In some embodiments, the second message is transmitted to the UE 104-B so as to determine the configuration (e.g., number and position) of the first sidelink channel resource unit. In some embodiments, the second message is a sidelink signal on the first sidelink channel resource unit. For example, the first sidelink channel of a correlated sidelink channel couple comprises sidelink control information (SCI), wherein the SCI comprises information of the positions of the sidelink channel resource unit of the second sidelink channel of the correlated sidelink channel couple. In some embodiments, the information comprises at least one of the following: a position of the starting symbol of the sidelink channel resource unit of the second channel in a time slot (#N) and the position of the time slot.

The method 2900 continues with operation 2906 in which the second UE 104-B determines the numbers and positions of the sidelink channel resource units for the second sidelink channel according to the configuration of the sidelink channel resource units for the first sidelink channel in the correlated sidelink channel couple.

The method 2900 continues with operation 2908 in which the first and the second UE 104-1/104-2 performs sidelink communications on the determined sidelink channel resource units. In some embodiments, configurations of sidelink channel resource units for different sidelink channels can be determined. In some embodiments, a sidelink channel can be at least one of the following: a Physical Sidelink Control Channel (PSCCH), a Physical Sidelink Shared Channel (PSSCH), a Physical Sidelink Broadcast Channel (PSBCH), and a Physical Sidelink Discovery Channel (PSDCH). Specifically, a PSCCH resource is used to carry sidelink control information (SCI), wherein the SCI comprises at least one of the following: sidelink scheduling control information, sidelink feedback control information (e.g., ACK/NACK), and channel measurement feedback information (e.g., Channel State Information (CSI)); a PSSCH resource is used to carry sidelink data; a PSBCH resource is used to carry sidelink broadcast information; and a PSDCH resource is used to carry a sidelink discovery signal.

In some embodiments, a configuration of at least one sidelink channel resource unit for at least one respective sidelink channel can be determined according to a sidelink channel pattern table. In some other embodiments, a sidelink channel pattern table can also indicate a number of symbols in the time domain and a number of RBs in the frequency domain in a time slot that can be used for sidelink communications. In this case, the sidelink channel pattern table can be also used to indicate the configuration of available resources for sidelink communications.

Figure 30:
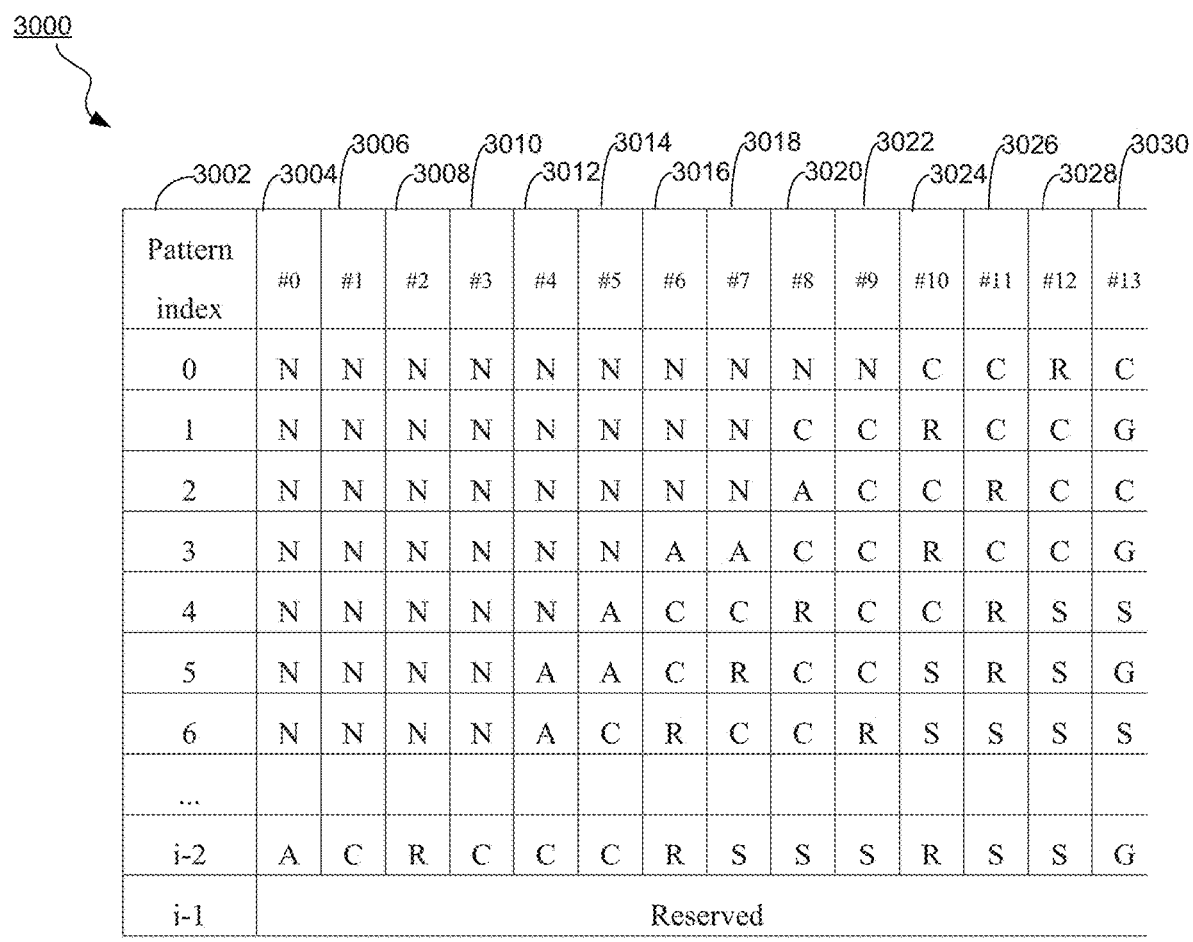
FIG. 30 illustrates a sidelink channel resource pattern table indicating a plurality of configurations of at least one sidelink channel resource unit in a time slot, in accordance with some embodiments of the present disclosure.

FIG. 30 illustrates a sidelink channel resource pattern table 3000 indicating a plurality of configurations of at least one sidelink channel resource unit in a time slot, in accordance with some embodiments of the present disclosure. In the illustrated embodiment, the table 3000 comprises 15 columns, a pattern index 3002, a second column 3004 to a fourteenth column 3030 representing 14 symbols in a time slot with normal CP. Further, the table 3000 comprises i indices corresponding to i configurations of the at least one sidelink channel in a time slot. The i configurations of a time slot each comprises 14 symbols and their corresponding properties, wherein i is a positive integer. In some embodiments, the 14 symbols in a time slot comprises at least one of the following: a symbol in a PSCCH resource unit ("C"), a symbol in a PSSCH resource unit ("S"), a symbol for AGC ("A"), a symbol used as a GP ("G"), a symbol for RS ("R"), and a symbol for non-sidelink communications ("N").

In some embodiments, the sidelink channel pattern table 3000 is pre-configured by the system. The plurality of configurations each corresponds to an index, which can be used to indicate the configuration of the at least one sidelink channel resource unit, a position of the at least one sidelink channel resource unit in the time slot, properties of each symbols in the time slot, and configurations of symbols for DMRS and AGC. The index can be indicated by the BS 102 to the UE 104 through a higher layer signaling and/or a physical layer signaling.

Figure 31:
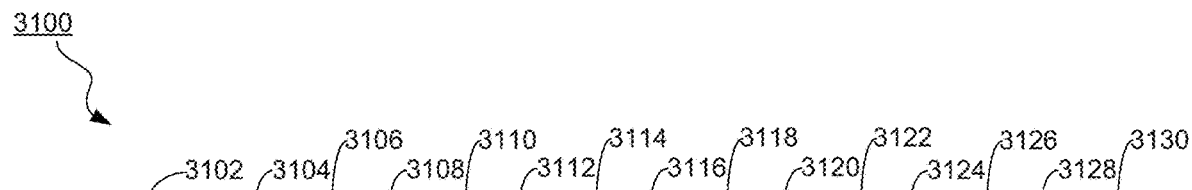
FIG. 31 illustrates a sidelink channel resource pattern table indicating a plurality of configurations of at least one sidelink channel resource unit in a time slot, in accordance with some embodiments of the present disclosure.

FIG. 31 illustrates a sidelink channel resource pattern table 3100 indicating a plurality of configurations of at least one sidelink channel resource unit in a time slot, in accordance with some embodiments of the present disclosure. In the illustrated embodiment, the table 3100 comprises 15 columns, a pattern index 3102, a second column 3104 to a fourteenth column 3130 representing 14 symbols in a time slot with normal CP. Further, the table 3100 comprises i indices corresponding to i configurations of the at least one sidelink channel in a time slot. The i configurations of a time slot each comprises 14 symbols and their corresponding properties wherein i is a positive integer. In some embodiments, the 14 symbols in a time slot each is one of the following: non-sidelink symbols (N), and Sf, wherein Sf represents a symbol in a sidelink channel resource unit #f, wherein f is a non-negative integer.

For example, at an index of 0, a first sidelink channel resource unit s0 occupies symbols 10-13 in a time slot and symbols 0-9 are symbols for non-sidelink communications; at an index of 1, a first sidelink channel resource unit s0 occupies symbols 8-13 in a time slot and symbols 0-7 are symbols for non-sidelink communications; at an index of 2, a first sidelink channel resource unit s0 occupies symbols 8-10, a second sidelink channel resource unit occupies symbols 11-13, and symbols 0-7 in a time slot are symbols for non-sidelink communications; at an index of 3, a first sidelink channel resource unit s0 occupies symbols 6-8, a second sidelink channel resource unit occupies symbols 8-13, and symbols 0-5 in a time slot are symbols for non-sidelink communications; at an index of 4, a first sidelink channel resource unit s0 occupies symbols 5-8, a second sidelink channel resource unit occupies symbols 9-11, and symbols 0-4 and 12-13 in a time slot are symbols for non-sidelink communications; at an index of 5, a first sidelink channel resource unit s0 occupies symbols 4-7, a second sidelink channel resource unit occupies symbols 10-13, and symbols 0-3 and 8-9 in a time slot are symbols for non-sidelink communications; at an index of 6, a first sidelink channel resource unit s0 occupies symbols 4-7, a second sidelink channel resource unit occupies symbols 8-11, a third sidelink channel resource unit occupies symbols 12-13, and symbols 0-3 in a time slot are symbols for non-sidelink communications; at an index of i−2, a first sidelink channel resource unit s0 occupies symbols 0-3, a second sidelink channel resource unit occupies symbols 4-7, and a third sidelink channel resource unit occupies symbols 8-13 in a time slot; and at an index of i−1, all the symbols are reserved.

In some embodiments, the sidelink channel pattern table 3100 is pre-configured by the system. The plurality of configurations each corresponds to an index, which can be used to indicate the number of symbols the at least one sidelink channel resource unit, a position of the at least one sidelink channel resource unit in the time slot, and a number of the at least one sidelink channel resource units in a time slot.

In some embodiments, the index can be indicated by the BS 102 to the UE 104 through DCI. For example, when an index of 0 was received by the UE 104 from the BS 102, the UE 104 can determine a time slot comprises 1 sidelink channel resource unit, which comprises 4 available symbols for sidelink communications. The sidelink channel resource unit occupying symbols 10-13 is for a sidelink channel. The UE 104 can further perform sidelink communications according to the configured sidelink channel resource units and the corresponding sidelink channel for transmitting or receiving sidelink signals on symbols 10-13 in a time slot.

Figure 32:
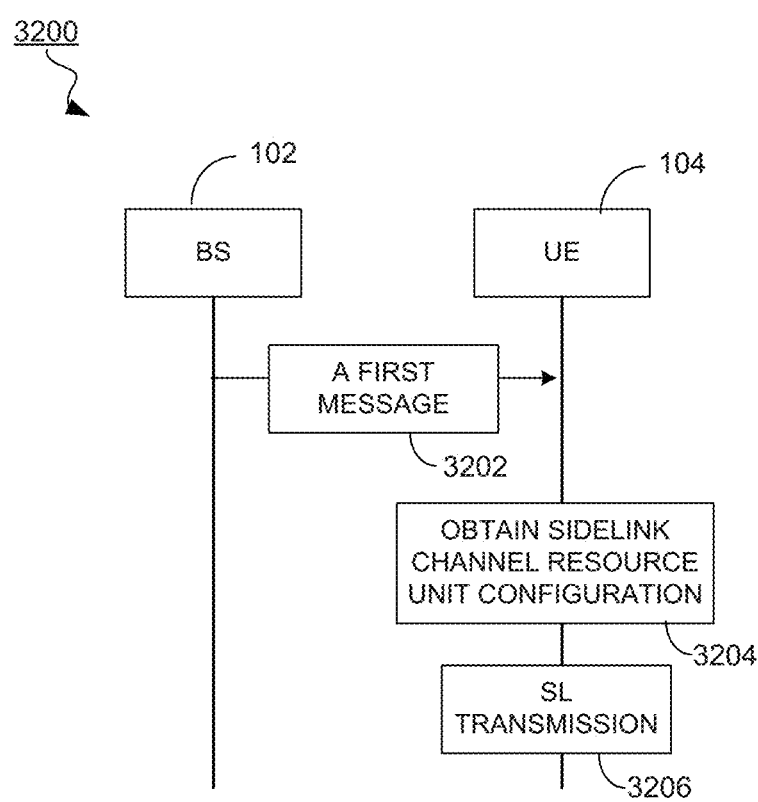
FIG. 32 illustrates a method for configuring a sidelink channel resource unit for sidelink communications, in accordance with some embodiments of the present disclosure.

FIG. 32 illustrates a method 3200 for configuring a number and position of a sidelink channel resource unit for sidelink communications, in accordance with some embodiments of the present disclosure. It is understood that additional operations may be provided before, during, and after the method 3200 of FIG. 32, and that some operations may be omitted or reordered. The communication system in the illustrated embodiment comprises a BS 102, a UE 104.

The method 3200 starts with operation 3202 in which a first message is transmitted from the BS 102 to the UE 104 according to some embodiments. In some embodiments, the first message comprises downlink control information (DCI). In some embodiments, the first message comprises at least one pattern index for indication of a configuration of at least one corresponding sidelink channel resource unit in a time slot.

The method 3200 continues with operation 3204 in which the UE 104 determine the at least one configuration of the at least one sidelink channel resource units in the time domain for the second sidelink channel according to the configuration of the sidelink channel resource units for the at least one corresponding sidelink channel.

The method 3200 continues with operation 3206 in which the UE 104 perform sidelink communications on the at least one sidelink channel resource units. In some embodiments, the at least one configuration of the at least one sidelink channel resource units for different sidelink channels can be determined. In some embodiments, a sidelink channel can be at least one of the following: a Physical Sidelink Control Channel (PSCCH), a Physical Sidelink Shared Channel (PSSCH), a Physical Sidelink Broadcast Channel (PSBCH), and a Physical Sidelink Discovery Channel (PSDCH). Specifically, a PSCCH resource is used to carry sidelink control information (SCI), wherein the SCI comprises at least one of the following: sidelink scheduling control information, sidelink feedback control information (e.g., ACK/NACK), and channel measurement feedback information (e.g., Channel State Information (CSI)); a PSSCH resource is used to carry sidelink data; a PSBCH resource is used to carry sidelink broadcast information; and a PSDCH resource is used to carry a sidelink discovery signal.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication device, comprising:
   determining a sidelink channel resource unit of a sidelink channel according to a sidelink channel resource pattern table; and
   performing sidelink communications on the sidelink channel resource unit,
   wherein:
      the sidelink channel resource pattern table comprises a plurality of sidelink channel resource configuration patterns, one of which indicates a configuration of the sidelink channel resource unit,
      the configuration of the sidelink channel resource unit comprises a plurality of symbols in a time slot, and
      the plurality of symbols in the time slot comprise a symbol for an automatic gain control (AGC).

2. The method of claim 1, wherein the sidelink channel comprises at least one of the following: a Physical Sidelink Control Channel (PSCCH), a Physical Sidelink Shared Channel (PSSCH), a Physical Sidelink Broadcast Channel (PSBCH), and a Physical Sidelink Discovery Channel (PSDCH).

3. The method of claim 1, wherein the sidelink channel resource pattern table is one of the following: pre-configured by the system, and configured by a wireless communication node.

4. The method of claim 1, wherein the plurality of sidelink channel resource configuration patterns each is used to indicate a configuration of at least one sidelink channel resource unit of at least one sidelink channel.

5. The method of claim 4, wherein the configuration of the sidelink channel resource unit comprises at least one of following: a first number of first resource units in the time domain, a second number of second resource units in the frequency domain, a first starting position in the time domain, and a second starting position in the frequency domain, wherein the first starting position in the time domain is one of the following in a time slot, a starting symbol and a starting available symbol for sidelink communications, and wherein the second starting position in the frequency domain is one of the following: a starting resource block (RB) and a starting available RB for sidelink communications.

6. The method of claim 4, wherein the configuration of the at least one sidelink channel resource unit comprises: a symbol type for each of the first resource units in the time domain of the at least one respective sidelink channel resource unit, wherein the symbol type for each of the first resource units is one of following: an effective sidelink channel resource symbol, a reference signal (RS) symbol, a guard period (GP) symbol, a reserved symbol, and a non-sidelink symbol.

7. The method of claim 1, wherein the performing further comprises:
indicating a pattern index of the sidelink channel resource pattern table, wherein the pattern index corresponds to one of the plurality of sidelink channel resource configuration patterns.

8. A method performed by a wireless communication node, comprising:
indicating a sidelink channel resource pattern table to a wireless communication devices; and
wherein:
the sidelink channel resource pattern table comprises a plurality of sidelink channel resource configuration patterns, one of which indicates a configuration of the sidelink channel resource unit,
the configuration of the sidelink channel resource unit comprises a plurality of symbols in a time slot, and
the plurality of symbols in the time slot comprise a symbol for an automatic gain control (AGC).

9. The method of claim 8, wherein the sidelink channel comprises at least one of the following: a Physical Sidelink Control Channel (PSCCH), a Physical Sidelink Shared Channel (PSSCH), a Physical Sidelink Broadcast Channel (PSBCH), and a Physical Sidelink Discovery Channel (PSDCH).

10. The method of claim 8, wherein the sidelink channel resource pattern table is one of the following: pre-configured by the system, and configured by a wireless communication node.

11. The method of claim 8, wherein the plurality of sidelink channel resource configuration patterns each is used to indicate a configuration of at least one sidelink channel resource unit of at least one sidelink channel.

12. The method of claim 11, wherein the configuration of the sidelink channel resource unit comprises at least one of following: a first number of first resource units in the time domain, a second number of second resource units in the frequency domain, a first starting position in the time domain, and a second starting position in the frequency domain, wherein the first starting position in the time domain is one of the following in a time slot, a starting symbol and a starting available symbol for sidelink communications, and wherein the second starting position in the frequency domain is one of the following: a starting resource block (RB) and a starting available RB for sidelink communications.

13. The method of claim 11, wherein the configuration of the at least one sidelink channel resource unit comprises: a symbol type for each of the first resource units in the time domain of the at least one respective sidelink channel resource unit, wherein the symbol type for each of the first resource units is one of following: an effective sidelink channel resource symbol, a reference signal (RS) symbol, a guard period (GP) symbol, a reserved symbol, and a non-sidelink symbol.

14. The method of claim 8, wherein indicating further comprises:
indicating a pattern index of the sidelink channel resource pattern table to the wireless communication device.

15. A computing device comprising at least one processor and a memory coupled to the processor, the at least one processor configured to carry out the method of claim 1.

16. A non-transitory computer-readable medium having stored thereon computer-executable instructions for carrying out the method of claim 1.

17. A computing device comprising at least one processor and a memory coupled to the processor, the at least one processor configured to carry out the method of claim 2.

18. A computing device comprising at least one processor and a memory coupled to the processor, the at least one processor configured to carry out the method of claim 8.

19. A computing device comprising at least one processor and a memory coupled to the processor, the at least one processor configured to carry out the method of claim 9.

20. A non-transitory computer-readable medium having stored thereon computer-executable instructions for carrying out the method of claim 8.

* * * * *